(12) United States Patent
Kurata et al.

(10) Patent No.: US 10,740,057 B2
(45) Date of Patent: Aug. 11, 2020

(54) INFORMATION PROCESSING DEVICE, INFORMATION PROCESSING METHOD, AND COMPUTER PROGRAM

(71) Applicant: Sony Corporation, Tokyo (JP)

(72) Inventors: Masatomo Kurata, Tokyo (JP); Masanori Katsu, Tokyo (JP); Takashi Ogata, Tokyo (JP); Yasutaka Fukumoto, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/254,482

(22) Filed: Sep. 1, 2016

(65) Prior Publication Data

US 2016/0371044 A1 Dec. 22, 2016

Related U.S. Application Data

(63) Continuation of application No. 15/173,793, filed on Jun. 6, 2016, which is a continuation of application
(Continued)

(30) Foreign Application Priority Data

Jun. 13, 2011 (JP) .................. 2011-131130

(51) Int. Cl.
*G06F 3/00* (2006.01)
*G06F 3/14* (2006.01)
(Continued)

(52) U.S. Cl.
CPC .............. *G06F 3/14* (2013.01); *G06F 3/0346* (2013.01); *G06F 3/0481* (2013.01);
(Continued)

(58) Field of Classification Search
CPC ..... H04W 4/02; H04W 40/244; H04W 4/005; H04W 4/028; H04L 67/22; H04L 67/18; H04L 41/22; G06F 3/0346; G06F 3/0481
See application file for complete search history.

(56) References Cited

U.S. PATENT DOCUMENTS 7,274,375 B1 9/2007 David
8,180,778 B1 * 5/2012 Pedersen ............. G06F 17/3089
707/739

(Continued)

FOREIGN PATENT DOCUMENTS

CN 101860561 A 10/2010
EP 0834840 A1 4/1998
(Continued)

OTHER PUBLICATIONS

Japanese Office Action for JP Application No. 2015-199168, dated Aug. 9, 2016.
(Continued)

*Primary Examiner* — Augustine K. Obisesan
(74) *Attorney, Agent, or Firm* — Lerner, David, Littenberg, Krumholz & Mentlik, LLP

(57) ABSTRACT

An information processing device according to the present technology includes an action recognition unit that recognizes an operation action of a user based on sensor information, and an action representation generation unit that analyzes operation action data showing the operation action of the user recognized by the action recognition unit to generate an action segment represented by a meaning and content of the operation action from the operation action data.

34 Claims, 45 Drawing Sheets

Related U.S. Application Data

No. 14/123,886, filed as application No. PCT/JP2012/064564 on Jun. 6, 2012, now abandoned.

(51) Int. Cl.

| | |
|---|---|
| G06F 16/25 | (2019.01) |
| G06F 16/28 | (2019.01) |
| H04W 4/029 | (2018.01) |
| G06Q 10/06 | (2012.01) |
| G06F 16/9537 | (2019.01) |
| G06F 3/0482 | (2013.01) |
| G06T 13/00 | (2011.01) |
| G06F 3/0346 | (2013.01) |
| G06F 3/0481 | (2013.01) |
| G06F 3/0484 | (2013.01) |
| G06Q 10/10 | (2012.01) |
| G07C 1/10 | (2006.01) |
| H04L 29/08 | (2006.01) |
| H04M 1/725 | (2006.01) |

(52) U.S. Cl.
CPC ........ *G06F 3/0482* (2013.01); *G06F 3/04817* (2013.01); *G06F 3/04842* (2013.01); *G06F 3/04847* (2013.01); *G06F 16/252* (2019.01); *G06F 16/284* (2019.01); *G06F 16/287* (2019.01); *G06F 16/9537* (2019.01); *G06Q 10/06* (2013.01); *G06Q 10/1095* (2013.01); *G06T 13/00* (2013.01); *H04W 4/029* (2018.02); *G07C 1/10* (2013.01); *H04L 67/18* (2013.01); *H04L 67/22* (2013.01); *H04M 1/72569* (2013.01)

(56) References Cited

U.S. PATENT DOCUMENTS

| | | | |
|---|---|---|---|
| 8,438,127 B2 | 5/2013 | Kurata et al. | |
| 8,566,272 B2 | 10/2013 | Fukumoto et al. | |
| 2002/0171673 A1 | 11/2002 | Brown et al. | |
| 2003/0142146 A1* | 7/2003 | Al-Azzawe | G06F 11/328 |
| | | | 715/854 |
| 2003/0154116 A1 | 8/2003 | Lofton | |
| 2004/0153970 A1 | 8/2004 | Shinoda et al. | |
| 2005/0157908 A1 | 7/2005 | Matsugu et al. | |
| 2005/0254687 A1 | 11/2005 | Asama et al. | |
| 2006/0020174 A1* | 1/2006 | Matsumura | A61B 5/1118 |
| | | | 600/300 |
| 2006/0095868 A1 | 5/2006 | Sawada et al. | |
| 2006/0284979 A1 | 12/2006 | Clarkson | |
| 2007/0143071 A1 | 6/2007 | Delargy | |
| 2007/0271376 A1* | 11/2007 | Yach | G06Q 10/107 |
| | | | 709/224 |
| 2007/0299631 A1 | 12/2007 | Macbeth et al. | |
| 2007/0300185 A1 | 12/2007 | Macbeth et al. | |
| 2008/0144937 A1 | 6/2008 | Lim et al. | |
| 2008/0157961 A1 | 7/2008 | Park et al. | |
| 2009/0070060 A1 | 3/2009 | Bang et al. | |
| 2009/0134968 A1* | 5/2009 | Girgensohn | G08B 13/19613 |
| | | | 340/3.1 |
| 2009/0150357 A1* | 6/2009 | Iizuka | A63F 13/10 |
| 2009/0234761 A1 | 9/2009 | Taylor et al. | |
| 2009/0271800 A1 | 10/2009 | Deshpande et al. | |
| 2010/0001857 A1* | 1/2010 | Doi | H04M 1/72572 |
| | | | 340/539.13 |
| 2010/0146433 A1 | 6/2010 | Murata et al. | |
| 2010/0174674 A1 | 7/2010 | Unuma et al. | |
| 2010/0318293 A1* | 12/2010 | Brush | G01C 21/165 |
| | | | 701/431 |
| 2011/0022443 A1 | 1/2011 | Partridge et al. | |
| 2011/0081634 A1 | 4/2011 | Kurata et al. | |
| 2011/0137836 A1* | 6/2011 | Kuriyama | A61B 5/1118 |
| | | | 706/12 |
| 2011/0161085 A1 | 6/2011 | Boda et al. | |
| 2011/0276396 A1* | 11/2011 | Rathod | G06F 17/30867 |
| | | | 705/14.49 |
| 2012/0007920 A1 | 1/2012 | Takahashi | |
| 2012/0052880 A1* | 3/2012 | Hymel | H04W 4/21 |
| | | | 455/456.3 |
| 2012/0150777 A1 | 6/2012 | Setoguchi et al. | |
| 2012/0166285 A1 | 6/2012 | Shapiro et al. | |
| 2012/0209521 A1* | 8/2012 | Sakazaki | G01C 21/3679 |
| | | | 701/520 |
| 2012/0229505 A1 | 9/2012 | Kuga | |
| 2012/0251079 A1* | 10/2012 | Meschter | G06F 19/00 |
| | | | 386/278 |
| 2013/0073971 A1 | 3/2013 | Huang et al. | |
| 2013/0073995 A1 | 3/2013 | Piantino et al. | |
| 2013/0147971 A1 | 6/2013 | Flynn, III et al. | |
| 2013/0304685 A1 | 11/2013 | Kurata et al. | |
| 2013/0325396 A1* | 12/2013 | Yuen | A61B 5/1112 |
| | | | 702/160 |

FOREIGN PATENT DOCUMENTS

| | | | | |
|---|---|---|---|---|
| EP | 2523090 A2 * | 11/2012 | | G06F 9/4443 |
| JP | H10113343 A | 5/1998 | | |
| JP | 2001357309 A | 12/2001 | | |
| JP | 2003030375 A | 1/2003 | | |
| JP | S03069525 A1 | 8/2003 | | |
| JP | 2003296782 A | 10/2003 | | |
| JP | 2004078420 A | 3/2004 | | |
| JP | 2004318503 A | 11/2004 | | |
| JP | 200681129 A | 3/2006 | | |
| JP | 2006065535 A | 3/2006 | | |
| JP | 2007094678 A | 4/2007 | | |
| JP | 2008-003655 A | 1/2008 | | |
| JP | 2008146248 A | 6/2008 | | |
| JP | 2008242734 A | 10/2008 | | |
| JP | 2009039466 A | 2/2009 | | |
| JP | 2009075843 A | 4/2009 | | |
| JP | 2010134802 A | 6/2010 | | |
| JP | 2010-146223 A | 7/2010 | | |
| JP | 2010146221 A | 7/2010 | | |
| JP | 2010-198595 A | 9/2010 | | |
| JP | 2010267207 A | 11/2010 | | |
| JP | 2011-081431 A | 4/2011 | | |
| JP | 2011096209 A | 5/2011 | | |
| JP | 2011134294 A | 7/2011 | | |
| KR | 20120069490 A * | 6/2012 | | |
| WO | 2009099128 A1 | 8/2009 | | |
| WO | 2010032579 A1 | 3/2010 | | |
| WO | 2010047337 A1 | 4/2010 | | |
| WO | 2011065113 A1 | 6/2011 | | |
| WO | 2012008264 A1 | 1/2012 | | |

OTHER PUBLICATIONS

Japenese Office Action for Japanese Application No. JP2016105111 dated Feb. 28, 2017.
European Office Action for Application No. 12800044.5, dated Jul. 17, 2017.
Japanese Office Action for Application No. JP 2016-105111, dated Jul. 25, 2017.
Japanese Office Action for Application No. JP 2016-198774, dated Jul. 25, 2017.
Chinese Office Action for Application No. 2012800280158 dated Dec. 1, 2016.
Chinese Office Action for Application No. 201280028015.8 dated Apr. 25, 2016.
Extended European Search Report for EP Application No. 12800044.5, dated Nov. 6, 2014.
Japanese Office Action for Application No. 2011-131130 dated Apr. 5, 2016.
Japanese Office Action for JP Application No. 2011-131130, dated Sep. 1, 2015.
Kazuya Okada et al., "Proposal of a Method for Extracting Points of Interest from User's Trajectory" Multi Media Communication and Dispersion Treatment (DPS)) Research Report of Information

(56) References Cited

OTHER PUBLICATIONS

Processing Society of Japan, Sep. 18, 2008, 2008 (91(2008-DPS-136)), pp. 89-94 (English Abstract provided herewith.).

Masakatsu Ito et al. "An Action History Mining System for Personalization of Location-aware Services", Workshop with regard to Seventh Programming and Application System (SPA2004), Japan, Mar. 2004, <URL:http://www.niya.net/thesis/Ito_spa2004.pdf> (English Abstract provided herewith.).

Masakatsu Ito et al., "Visualization of Position Tracking Data Reflecting User's Activity", Multi Media, Dispersion, Collaboration and Mobile (DICOM 02003) Symposium, Jul. 2003, pp. 477-480, <URL:http://www.niya.net/thesis/niya_docomo03.pdf> (English Abstract provided herewith.).

Naoki Kishimoto et al., "A study on the User Techniques for Community Time and Space Life-Log", Technical Research Report of the Institute of Electronics, Information and Communication Engineers, (Corporate Juridical Person), Jan. 14, 2010, vol. 109, No. 379, pp. 1-6 (English Abstract provided herewith.).

Japanese Office Action for Application No. 2016-105111 dated May 30, 2017.

Japanese Office Action for Application No. JP2016101289 dated Apr. 18, 2017.

Japanese Office Action for Application No. JP 2015-199168 dated Jan. 17, 2017.

Japanese Office Action for Application No. JP 2016-101289 dated Jan. 31, 2017.

Japanese Office Action for Application No. JP 2016-101289, dated Aug. 1, 2017.

Notification of First Office Action for CHinese Application 201610430249.5 dated Jan. 17, 2019.

Notification of First Office Action for CHinese Application 201610429428.7 dated Feb. 3, 2019.

Notification of First Office Action for CHinese Application 201610459812.1 dated Feb. 3, 2019.

Notification of First Office Action for CHinese Application 201610586114.8 dated Feb. 12, 2019.

* cited by examiner

FIG. 1
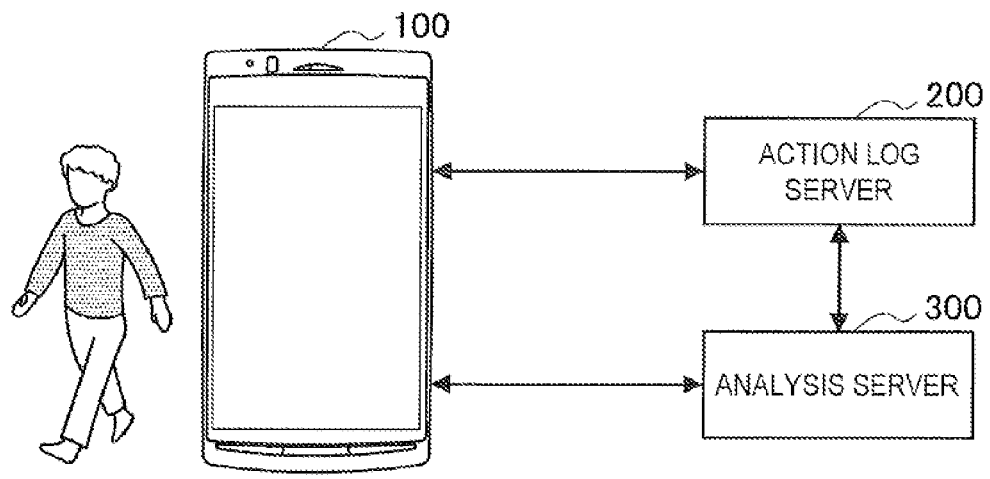
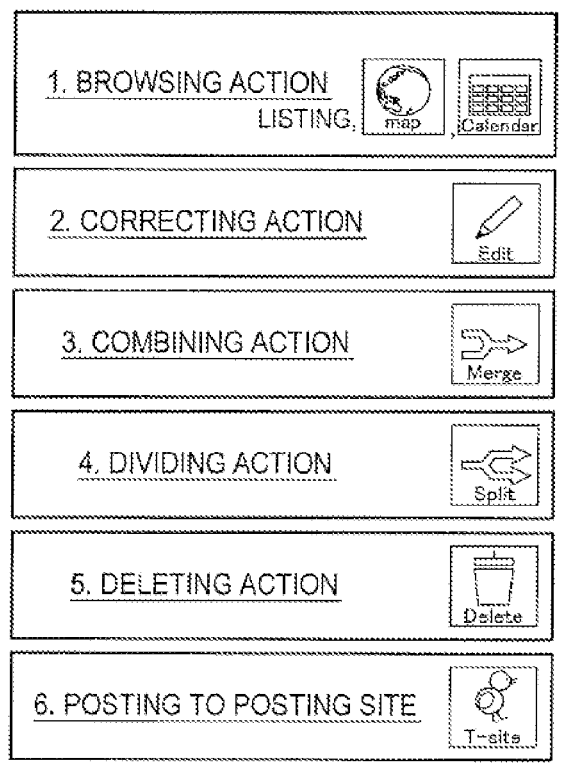

FIG. 5
- RECOGNITION RESULT BY OPERATION ACTION RECOGNITION UNIT
 (OPERATION ACTION DATA)
| ACTION MODEL X | HAD MEAL | ACTION MODEL X |
|---|---|---|
- ANALYSIS RESULT BY LIVING ACTION RECOGNITION UNIT
| ACCEPTED | HAD MEAL | PAID BILL |
|---|---|---|
- GRAIN SIZE 1'
| HAD MEAL |
|---|

FIG. 19

FIG. 21
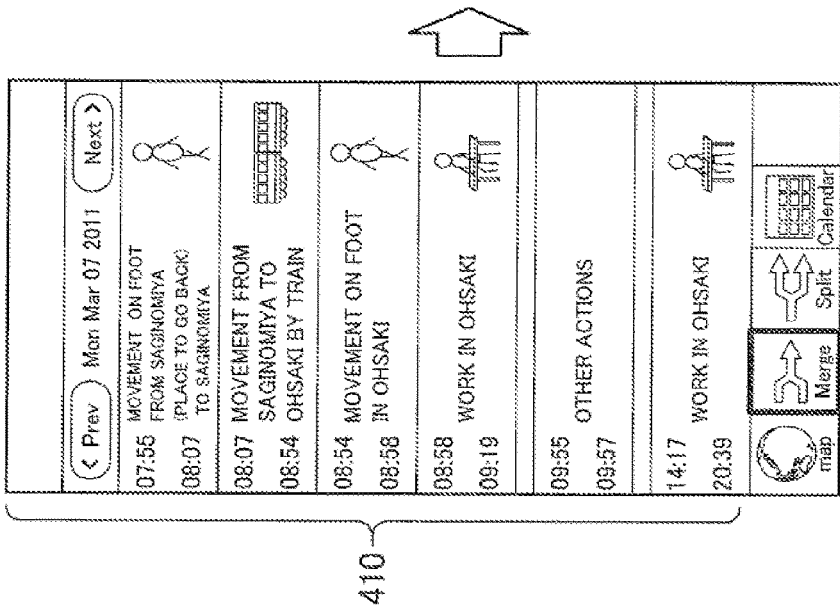
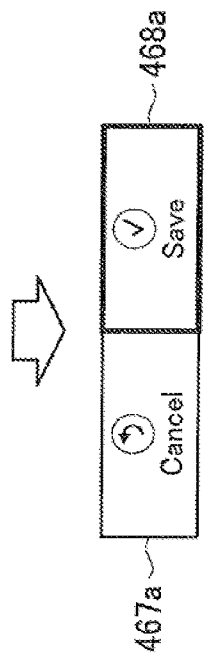
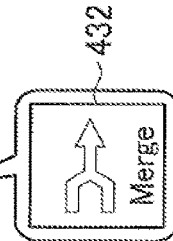

FIG. 25

471 (SMALL — LARGE, GRAIN SIZE 472)

| Time | Activity |
|---|---|
| 8:40–8:46 | WAITING FOR TRAIN IN SAGINOMIYA |
| 8:46–8:55 | MOVEMENT FROM SAGINOMIYA TO TAKADANOBABA BY TRAIN |
| 8:55–9:00 | TRAINS CHANGED IN TAKADANOBABA |
| 9:00–9:20 | MOVEMENT FROM TAKADANOBABA TO OHSAKI BY TRAIN |
| 9:20–9:30 | MOVEMENT ON FOOT IN OHSAKI |
| 9:30–10:55 | DESK WORK IN OHSAKI |
| 10:55–10:58 | MOVEMENT ON FOOT |
| 11:00–11:50 | MEETING IN OHSAKI |
| 11:50–11:59 | MOVEMENT ON FOOT |
| 12:00–12:30 | DESK WORK IN OHSAKI |
| 12:30–13:30 | MEAL IN OHSAKI |
| 13:30–14:00 | WORK IN OHSAKI |

410

(SMALL — LARGE)

| Time | Activity |
|---|---|
| 8:40–9:30 | MOVEMENT FROM SAGINOMIYA TO OHSAKI BY TRAIN |
| 9:30–12:30 | WORK IN OHSAKI |
| 12:30–13:30 | MEAL IN OHSAKI |
| 13:30–14:00 | WORK IN OHSAKI |
| 14:00–14:30 | MOVEMENT FROM OHSAKI TO SHIBUYA |
| 14:30–17:30 | SHOPPING IN SHIBUYA |
| 17:30–18:30 | MEAL IN SHIBUYA |
| 18:30–19:30 | MOVEMENT FROM SHIBUYA TO GOTANDA |
| 19:30–21:30 | WORK AT HOME |
| 21:30–23:30 | HOUSEKEEPING AT HOME |

(SMALL — LARGE)

| Time | Activity |
|---|---|
| 8:40–9:30 | GO TO OFFICE |
| 9:30–14:00 | WORK AT WORKPLACE |
| 14:00–14:30 | MOVEMENT FROM OHSAKI TO SHIBUYA |
| 14:30–19:30 | SHOPPING IN SHIBUYA |
| 19:30–23:30 | WORK AT HOME |

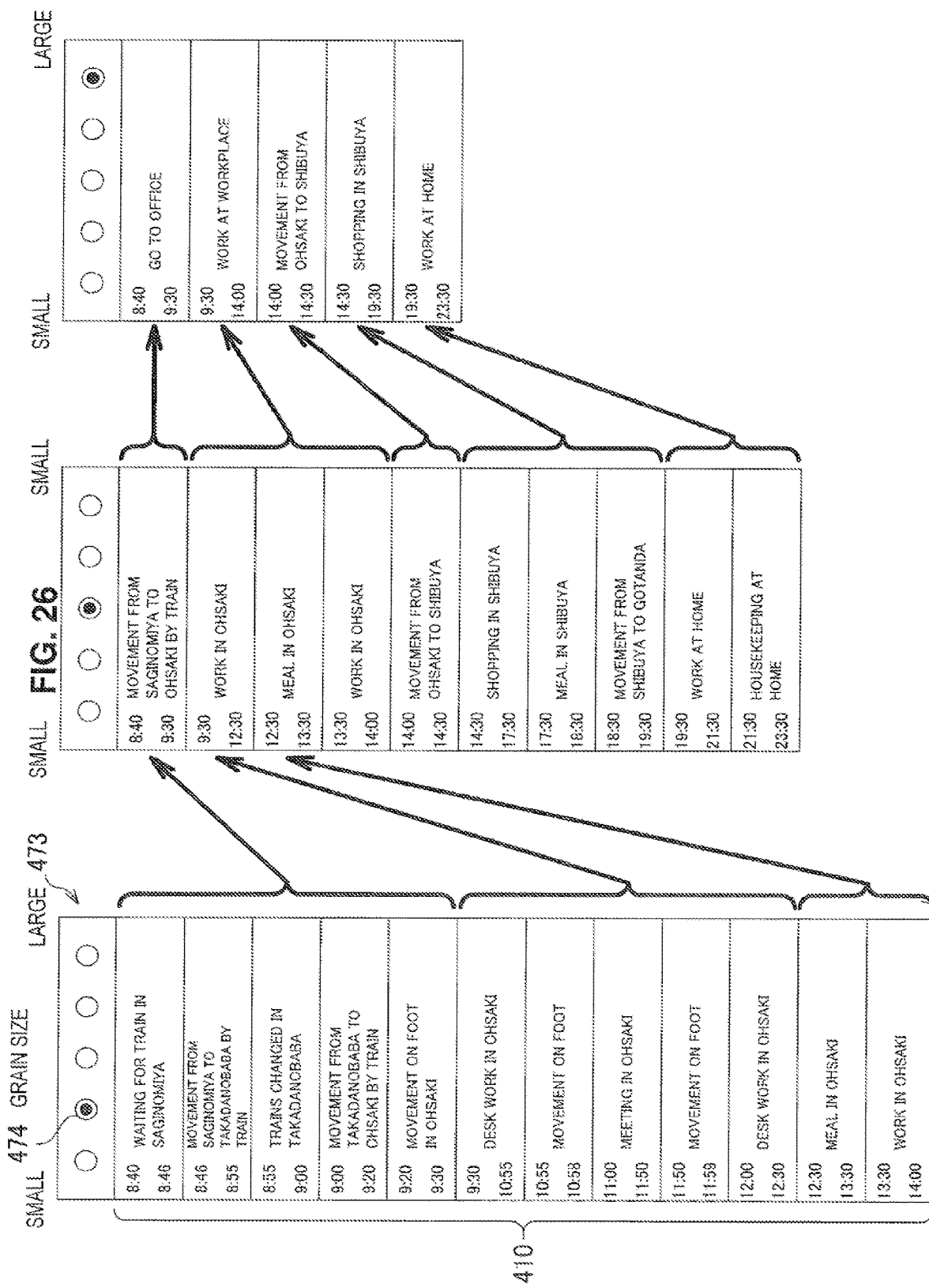

FIG. 36

EACH PROBABILITY DISTRIBUTION

| | | SHOPPING | WORK | MEAL | OTHERS |
|---|---|---|---|---|---|
| WEIGHTING FACTOR DEPENDING ON LOCATION | 1 | 50 | 10 | 10 | 30 |
| | 6 | 10 | 50 | 10 | 30 |
| | 5 | 10 | 10 | 50 | 30 |
| | 4 | 25 | 25 | 25 | 25 |
| | TOTAL | 260 | 460 | 420 | 460 |

FIG. 37

EACH PROBABILITY DISTRIBUTION

| | SHOPPING | WORK | MEAL | OTHERS |
|---|---|---|---|---|
| 1 | 50 | 10 | 10 | 30 |
| 6 | 10 | 50 | 10 | 30 |
| 5 | 10 | 10 | 50 | 30 |
| 4 | 25 | 25 | 25 | 25 |
| TOTAL | 260 | 460 | 420 | 460 |

WEIGHTING FACTOR DEPENDING ON LOCATION

FEEDBACK THAT "WAS IN LOCATION OF FREQUENT SHOPPING"

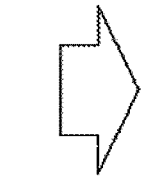

FEEDBACK THAT "WORK" IS WRONG AND "SHOPPING" IS CORRECT

EACH PROBABILITY DISTRIBUTION

| | SHOPPING | WORK | MEAL | OTHERS |
|---|---|---|---|---|
| 11 | 50 | 10 | 10 | 30 |
| 6 | 10 | 50 | 10 | 30 |
| 5 | 10 | 10 | 50 | 30 |
| 4 | 25 | 25 | 25 | 25 |
| TOTAL | 760 | 560 | 520 | 760 |

WEIGHTING FACTOR DEPENDING ON LOCATION

EACH PROBABILITY DISTRIBUTION

| | SHOPPING | WORK | MEAL | OTHERS |
|---|---|---|---|---|
| 1 | 50 | 10 | 10 | 30 |
| 6 | 30 | 30 | 10 | 30 |
| 5 | 10 | 10 | 50 | 30 |
| 4 | 25 | 25 | 25 | 25 |
| TOTAL | 380 | 340 | 420 | 460 |

WEIGHTING FACTOR DEPENDING ON LOCATION

FIG. 39

<BEFORE CORRECTION FEEDBACK REFLECTION>
EACH PROBABILITY DISTRIBUTION

WEIGHTS

|   | 001 | 002 | 003 |
|---|---|---|---|
| 1 | 0 | 30 | 0 |
| 2 | 0 | 10 | 20 |
| 3 | 40 | 20 | 20 |
| 4 | 0 | 10 | 50 |
| 5 | 0 | 50 | 10 |
| 6 | 40 | 10 | 10 |
|   | 360 | 460 | 410 |

⇒

<AFTER CORRECTION FEEDBACK REFLECTION>
EACH PROBABILITY DISTRIBUTION

WEIGHTS

|   | 001 | 002 | 003 |
|---|---|---|---|
| 1 | 0 | 30 | 0 |
| 2 | 0 | 10 | 20 |
| 3 | 40 | 20 | 20 |
| 4 | 0 | 10 | 50 |
| 5 | 0 | 45 | 15 |
| 6 | 30 | 10 | 20 |
|   | 300 | 435 | 465 |

DETCTION RESULTS

G.T.

|   | 001 | 002 | 003 |
|---|---|---|---|
| 001 | 0 | 10 | 5 |
| 002 | 20 | 0 | 5 |
| 003 | 10 | 5 | 0 |

LINE ESTIMATION

FIG. 45
TECHNIQUE FOR SELECTING
STATION NAME
- CHANGE EXPRESSION OF STATION NAME IN
  SHORTEST DISTANCE IN ACCORDANCE
  WITH POSITION PRECISION
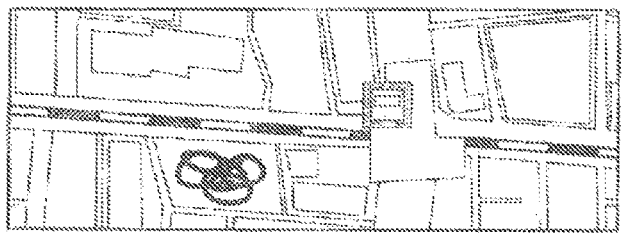
- WHEN MEDIUM/MEANS OF TRANSPORT IS
  NOT MOVEMENT BY TRAIN, PRIORITY IS GIVEN
  TO "STATION NAME" AS LANDMARK AND
  "STATION" IS REMOVED FROM "STATION NAME".
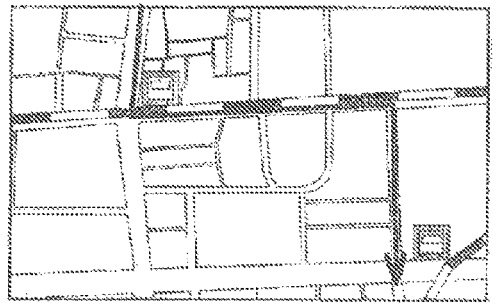

INFORMATION PROCESSING DEVICE, INFORMATION PROCESSING METHOD, AND COMPUTER PROGRAM

CROSS-REFERENCE TO RELATED APPLICATIONS

The present application is a continuation of U.S. patent application Ser. No. 15/173,793, filed on Jun. 6, 2016, which is a continuation of Ser. No. 14/123,886 filed on Dec. 4, 2013, which is a National Stage Filing of PCT Application No. PCT/JP2012/064564 filed on Jun. 6, 2012, which claims benefit to Japanese Patent Application No. 2011-131130 filed on Jun. 13, 2011, the disclosure of which are incorporated herein by reference.

TECHNICAL FIELD

The present disclosure relates to an information processing device that processes a user's action records, an information processing method, and a computer program.

BACKGROUND ART

A technology to recognize a user's operation action from sensor information acquired by using various sensing technologies is proposed. The recognized user's operation action is automatically recorded as an action log and can be represented by various techniques, for example, reproducing the operation action by animation such as an avatar, showing a user's movement locus on a map, or using an index abstracting various operation actions for representation.

CITATION LIST

Patent Literature

Patent Literature 1: JP 2008-3655A

SUMMARY OF INVENTION

Technical Problem

However, when an action log is reproduced by animation such as an avatar using an action recording device like, for example, a motion capture, a very large-scale device will be needed. On the other hand, an action log generated by using a small sensor containing recording device such as a smartphone limits the types of action that can be recorded/recognized and thus, it is difficult to present an action record that is valuable to the user. Therefore, an action log is generally shown as a user's movement locus on a map or displayed as an action record converted to the amount of activity like a health index.

Therefore, a proposal of the representation technique to present an action log recorded by a small sensor containing recording device to the user in a manner that is easy to understand has been sought.

Solution to Problem

According to the present disclosure, there is provided an information processing device including an action recognition unit that recognizes an operation action of a user based on sensor information, and an action representation generation unit that analyzes operation action data showing the operation action of the user recognized by the action recognition unit to generate an action segment represented by a meaning and content of the operation action from the operation action data.

According to the present disclosure, there is provided an information processing device including an action recognition unit that recognizes an operation action of a user based on sensor information, an action representation generation unit that generates an action segment constituting an action log from operation action data showing the operation action of the user recognized by the action recognition unit based on operation action estimation information that decides the operation action, and a feedback adjustment unit that corrects the operation action estimation information based on correction feedback from the user to the action segment generated by the action representation generation unit.

According to the present disclosure, there is provided an information processing method including a step for recognizing an operation action of a user based on sensor information, and a step for analyzing operation action data showing the recognized operation action of the user to generate an action segment represented by a meaning and content of the operation action from the operation action data.

According to the present disclosure, there is provided an information processing method including a step for recognizing an operation action of a user based on sensor information, a step for generating an action segment constituting an action log from operation action data showing the recognized operation action of the user based on operation action estimation information that decides the operation action, and a step for correcting the operation action estimation information based on correction feedback from the user to the action segment.

According to the present disclosure, there is provided a computer program for causing a computer to function as an information processing device including an action recognition unit that recognizes an operation action of a user based on sensor information, and an action representation generation unit that analyzes operation action data showing the operation action of the user recognized by the action recognition unit to generate an action segment represented by a meaning and content of the operation action from the operation action data.

According to the present disclosure, there is provided a computer program for causing a computer to function as an information processing device including an action recognition unit that recognizes an operation action of a user based on sensor information, an action representation generation unit that generates an action segment constituting an action log from operation action data showing the operation action of the user recognized by the action recognition unit based on operation action estimation information that decides the operation action, and a feedback adjustment unit that corrects the operation action estimation information based on correction feedback from the user to the action segment generated by the action representation generation unit.

According to the present disclosure, operation action data showing a user's operation action recognized by an action recognition unit based on sensor information is analyzed by an action representation generation unit to generate an action segment represented by the meaning and content of the operation action from the operation action data. By displaying an action log with the action segment represented by the meaning and content of the operation action, information can be presented to the user in a manner that is easy to understand.

Advantageous Effects of Invention

According to the present disclosure, as described above, a recorded action log can be presented to the user in a manner that is easy to understand.

BRIEF DESCRIPTION OF DRAWINGS

FIG. 1 is an explanatory view showing the configuration of an action log display system according to an embodiment of the present disclosure.

FIG. 5 is an explanatory view showing another example of the case when the action segment is generated from operation action data by the contextual analysis and the display of the action log is changed by changing the segmentation grain size of the action segment.

FIG. 19 is an explanatory view showing a state in which a correction screen to correct the action segment to be corrected is displayed.

FIG. 21 is an explanatory view showing an example of a method of combining action segments.

FIG. 25 is an explanatory view showing a case when display roughness is changed by using a slider.

FIG. 26 is an explanatory view showing a case when the display roughness is changed by using a zoom button.

FIG. 36 is an explanatory view showing operation action estimation information showing a relationship between a weighting factor depending on the location and a probability distribution of each action.

FIG. 37 is an explanatory view providing an overview of reflection processing of correction feedback.

FIG. 39 is an explanatory view illustrating corrections of the operation action estimation information based on the processing in FIG. 38.

FIG. 45 is an explanatory view illustrating station name selection processing.

DESCRIPTION OF EMBODIMENT

Figure 2:
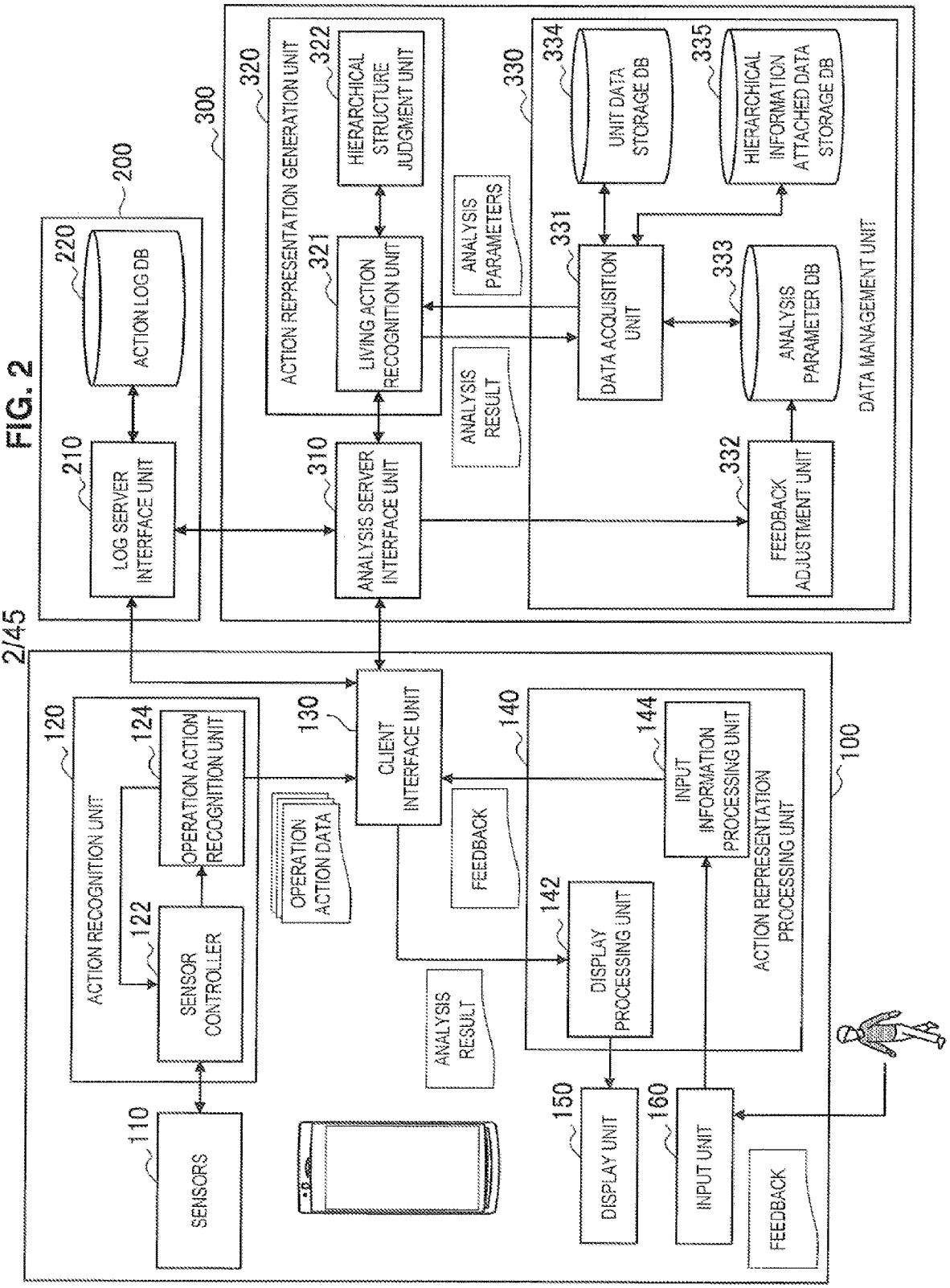
FIG. 2 is a functional block diagram showing a functional configuration of the action log display system according to the embodiment.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be provided in the order shown below:
<1. Overview of Action Log Display System>
<2. Functional Configuration of Action Log Display System>
[2-1. Action Recording Device]
[2-2. Action Log Server]
[2-3. Analysis Server]
<3. Action Segment Generation Processing>
[3-1. Relationship between Operation Action and Meaning/Content thereof]
[3-2. Action Segment Generation Processing]
(Example 1: Generation of an action segment by the contextual analysis)
(Example 2: Generation of an action segment by combining the contextual analysis and the time width)
(Example 3: Generation of an action segment by combining the contextual analysis, the time width, and position changes)
[3-3. Action Recognition Processing]
[3-4. Processing Content of Action Representation Generation Unit]
<4. Action Recording and Display Application>
[4-1. Representation of Action Log Based on Action Segment]
[4-2. Browsing Action]
[4-3. Correcting Action]
[4-4. Combining Actions]
[4-5. Dividing Action]
[4-6. Representation of Action Segment Based on Segmentation Grain Size]
[4-7. Deleting Action]
[4-8. Posting Action]
[4-9. Action Log Acquisition Stop Processing]
[4-10. Updating Display Content]
<5. Reflection Processing of Correction Feedback>
[5-1. Properties of Correction Feedback]
[5-2. Action Recognition Processing]
[5-3. Reflection Processing of Correction Feedback]
(5-3-1. Overview of reflection processing of correction feedback)
(5-3-2. Reflection processing of correction feedback of an action)
(5-3-3. Reflection processing of correction feedback of an action and position information)
<6. Others>
[6-1. Personal Modeling of Action Pattern]
[6-2 Position Display Technique by Moving Medium/Means Determination]
(6-2-1. Line estimation processing)
(6-2-2. Station name selection processing)
<7. Exemplary Hardware Configuration>
<1. Overview of Action Log Display System>

First, an overview of an action log display system according to an embodiment of the present disclosure will be provided with reference to FIG. 1. FIG. 1 is an explanatory view showing an outline configuration of the action log display system according to the present embodiment.

The action log display system according to the present embodiment realizes a representation technique that presents an action log recorded by a recording device 100 containing a small sensor (hereinafter, referred to as an "action recording device") to the user in a manner that is easy to understand. As the action recording device 100, for example, a mobile terminal such as a mobile phone, PDA (Personal Digital Assistant), and smartphone can be used. The action recording device 100 is provided with at least one sensor to sense conditions or an action of a user holding the device. The action recording device 100 estimates an operation action of the user based on sensor information acquired by the sensor and transmits the operation action to an action log server 200 as an action log. In this manner, the action log of the user is accumulated in the action log server 200.

An action log analyzed by the action recording device 100 and stored in the action log server 200 records an operation like, for example, "meal", "movement", and "sleep" together with the action time, position information and the like. An action log display system according to the present embodiment further analyzes an action log representing the operation content by an analysis server 300 to recognize the meaning of action and generates information (action segment) to which the meaning of action is added. The action segment is unit information as an easy-to-understand representation for the user of an action log. Instead of simply presenting an action log to the user, the action segment can present an action log in a manner that conveys the meaning of action.

An action log analyzed by the analysis server 300 and presented to the user can be corrected by the user. In addition, data of the presented action log can be combined, divided, or deleted by generating an action segment. The presented action log can also be posted to a posting site. Thus, by using an action log display system according to the present embodiment, an action log acquired as an operation can be analyzed and presented to the user in an easy-to-understand manner. The configuration and function of an action log display system according to the present embodiment will be described in detail below.

<2. Functional Configuration of Action Log Display System>

FIG. 2 shows the functional configuration of the action log display system according to the present embodiment. The action log display system includes, as described above, the action recording device 100 that records a user's operation action, the action log server 200 that manages an action log recorded by the action recording device 100, and the analysis server 300 that analyzes an action log to generate an action segment.

[2-1. Action Recording Device]

The action recording device 100 includes sensors 110, an action recognition unit 120, a client interface unit 130, an action representation processing unit 140, a display unit 150, and an input unit 160.

The sensors 110 are devices that sense a user's action or conditions and are installed in the action recording device 100. As the sensors 110, for example, an acceleration sensor, gyro sensor, magnetic field sensor, atmospheric pressure sensor, illuminance sensor, temperature sensor, microphone and the like can be used. As the sensors 110, a latitude/longitude acquisition sensor that acquires the latitude/longitude can also be installed. As the latitude/longitude acquisition sensor, for example, not only GPS (Global Positioning System) or WiFi, but also base station information of other communication networks or information such as RFID and images may be used. The sensors 110 output detected information to the action recognition unit 120 as sensor information.

The action recognition unit 120 estimates a user's action based on sensor information. The action recognition unit 120 includes a sensor controller 122 and an operation action recognition unit 124. The sensor controller 122 controls the sensor 110, the CPU or the overall system to cause sensing by the sensor 110 to operate effectively. The sensor controller 122 controls the above devices based on recognition results by the sensor 110 or the operation action recognition unit 124.

The operation action recognition unit 124 recognizes a user's action or conditions by performing signal processing or statistical processing of sensor information. The action recording device 100 holds a correspondence between an action model as information about a user's action obtained as a result of processing sensor information and an operation action in advance. When action parameters are obtained by processing sensor information, the operation action recognition unit 124 identifies an operation action corresponding to the parameters. Then, the operation action recognition unit 124 associates the identified operation action and the action time period, action time, position information and the like and outputs the associated information to the client interface unit 130 as operation action data. The operation action data is uploaded from the client interface unit 130 to the action log server 200.

The client interface unit 130 transmits/receives information between the action recording device 100, and the action log server 200 and the analysis server 300. For example, the client interface unit 130 transmits operation action data input from the action recognition unit 120 to the action log server 200 or outputs an analysis result received from the analysis server 300 to the action representation processing unit 140. Also, the client interface unit 130 transmits feedback information from the user input through the input unit 160 to the analysis server 300.

The action representation processing unit 140 is a functional unit that displays an action log or processes feedback information from the user and includes a display processing unit 142 and an input information processing unit 144. The display processing unit 142 performs processing to display an analysis result by the analysis server 300 input from the client interface unit 130 in the display unit 150. The input information processing unit 144 performs processing to transmit feedback information from the user for an action log input from the input unit 160 to the analysis server 300 via the client interface unit 130.

The display unit 150 is an output device that displays information and can be configured by, for example, a liquid crystal display, organic EL display or the like. For example, an action log processed for display by the display processing unit 142 is displayed in the display unit 150.

The input unit 160 is an input device to input information and, for example, a touch panel, keyboard, hardware button or the like can be used. In the present embodiment, it is assumed that the display surface of the display unit 150 is provided with a touch panel as the input unit 160. In this case, the user can input information by, for example, bringing an operation body such as a finger or touch pen into contact with the display surface of the display unit 150 or moving the operation body brought into contact with the display surface. Information input from the input unit 160 is output to the input information processing unit 144.

[2-2. Action Log Server]

The action log server 200 includes a log server interface unit 210 and an action log DB 220.

The log server interface unit 210 transmits/receives information between the action log server 200, and the action recording device 100 and the analysis server 300. For example, the log server interface unit 210 records operation action data received from the action recording device 100 in the action log DB 220 or acquires operation action data in accordance with a transmission request from the analysis server 300 from the action log DB 220 and transmits the operation action data to the analysis server 300.

The action log DB 220 is a storage unit that stores operation action data of the user acquired by the action recording device 100. In operation action data stored in the action log DB 220, as described above, the operation action identified by the operation action recognition unit 124 and the action time period, action time, position information and the like are associated and stored in the action log DB 220 in, for example, chronological order.

[2-3. Analysis Server]

The analysis server 300 includes an analysis server interface unit 310, an action representation generation unit 320, and a data management unit 330.

The analysis server interface unit 310 transmits/receives information between the analysis server 300, and the action recording device 100 and the action log server 200. For example, the analysis server interface unit 310 receives an analysis instruction (analysis request) of an action log from the action recording device 100 or transmits a transmission request of necessary operation action data in accordance with an analysis request The analysis server interface unit 310 also receives feedback information from the user of an action log from the action recording device 100.

The action representation generation unit 320 analyzes operation action data to understand the meaning thereof and generates an action segment to which the meaning and content is added. The action representation generation unit 320 includes a living action recognition unit 321 and a hierarchical structure judgment unit 322. The living action recognition unit 321 generates an action segment from an action log including operation action data. The living action recognition unit 321 analyses the meaning and content of operation action data arranged in chronological order based on relationships between data and the time period, time and the like of data. Then, the living action recognition unit 321 selects data classified as the most detailed meaning and content of analyzed meaning and content as the action segment. The generated action segment is output to the data management unit 330 and held there.

The hierarchical structure judgment unit 322 judges a hierarchical structure about the meaning and content of an action segment generated by the living action recognition unit 321 and attaches hierarchical information representing a hierarchical relationship of the meaning and content to the action segment. Hierarchical information is hierarchical meaning information attached to an action segment by processing described later. Hierarchical information may be, for example, information using a normalized value as a key or information using ID identifying the level of meaning information as a direct key. An action segment to which hierarchical information is attached is also called a hierarchical information attached action segment. Hierarchical relationships of the meaning and content of action are stored in the data management unit 330. The hierarchical structure judgment unit 322 outputs a hierarchical information attached action segment to the data management unit 330 via the living action recognition unit 321. The function of the action representation generation unit 320 and details of processing content thereby will be described later.

The data management unit 330 manages an action segment generated by the action representation generation unit 320. The data management unit 330 includes a data acquisition unit 331, a feedback adjustment unit 332, an analysis parameter DB 333, a unit data storage DB 334, and a hierarchical information attached data storage DB 335.

The data acquisition unit 331 transmits/receives data to/from the action representation generation unit 320. The data acquisition unit 331 records an action segment transmitted from the action representation generation unit 320 in the unit data storage DB 334 or records a hierarchical information attached action segment in the hierarchical information attached data storage DB 335. The data acquisition unit 331 acquires the specified action segment in accordance with a request from the action representation generation unit 320 from the unit data storage DB 334 or the hierarchical information attached data storage DB 335 and outputs the action segment to the action representation generation unit 320.

The feedback adjustment unit 332 reflects feedback information received from the action recording device 100 in analysis parameters used for analyzing the meaning and content of operation action data. The feedback information represents content of processing such as corrections made by the user on an action log displayed in the display unit 150 of the action recording device 100. The feedback adjustment unit 332 corrects analysis parameters using feedback information so that the meaning and content of a user's action can be recognized more correctly.

The analysis parameter DB 333 is a storage unit that holds analysis parameters used for analyzing the meaning and content of operation action data. In the analysis parameter DB 333, for example, a correspondence between an operation action and the meaning and content is stored as analysis parameters. Information stored in the analysis parameter DB 333 can be referenced by both of the living action recognition unit 321 and the hierarchical structure judgment unit 322. Analysis parameters are updated when necessary based on feedback information from the user.

The unit data storage DB 334 stores an action segment generated by the action representation generation unit 320. The action segment stored in the unit data storage DB 334 is a segment (unit segment) of the minimum unit necessary for recognition.

The hierarchical information attached data storage DB 335 stores an action segment in which hierarchical information is attached to an action segment generated by the action representation generation unit 320. The action segment stored in the hierarchical information attached data storage DB 335 is a hierarchical information attached action segment to which hierarchical information representing a hierarchical structure of the meaning and content of action is attached by the hierarchical structure judgment unit 322. The recording timing of an action segment to which hierarchical information is attached may be, for example, when requested by an application or analysis results of a plurality of segmentation grain sizes may be recorded in advance by the action representation generation unit 320.

That is, the action representation generation unit 320 and the data management unit 330 function as information processing devices that analyze the meaning and content of operation action data generated by the action recording device 100 to present information that is easy for the user to understand.

<3. Action Segment Generation Processing>

In an action log display system according to the present embodiment, the meaning and content of an operation action generated by the action recording device 100 is analyzed by the analysis server 300 to generate an action segment based on the meaning and content of action. Hierarchical information about the meaning and content of action can also be attached to an action segment and the display form of an action log can also be changed easily based on the hierarchical information. First, generation processing of an action segment will be described based on FIGS. 3 to 13.

[3-1. Relationship Between Operation Action and Meaning/Content Thereof]

The action recording device 100 analyzes an operation action, for example, "meal", "movement", or "sleep". The analysis server 300 analyzes content of each operation action more deeply using operation action data containing the operation action. The analysis of the meaning and content of the operation action is conducted by using, for example, as shown in FIG. 3, a context level dictionary.

Figure 3:
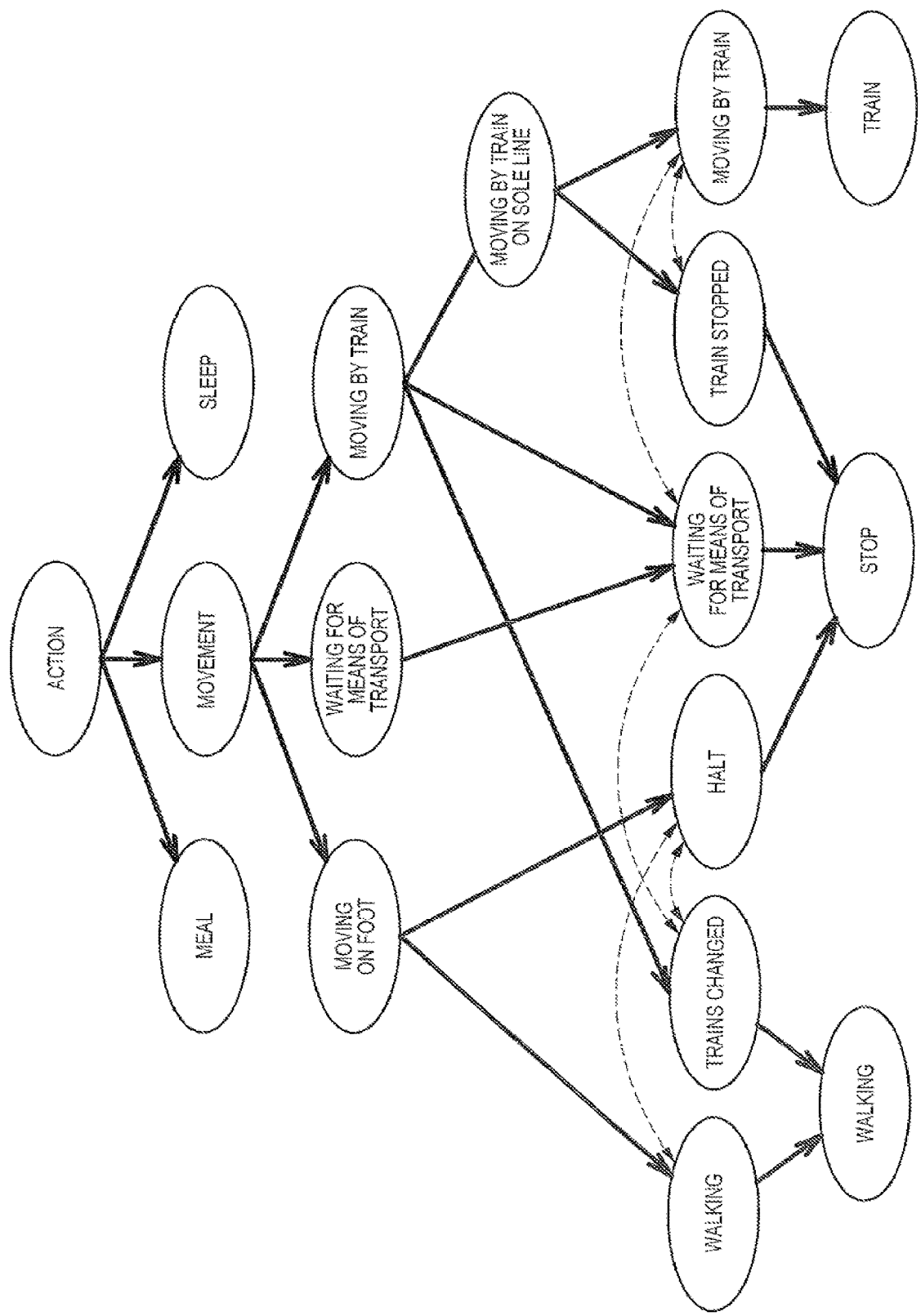
FIG. 3 is an explanatory view showing an example of a context level dictionary.

If, among the operation actions of "meal", "movement", and "sleep", the operation action of "movement" is taken up, As shown in FIG. 3, the meaning and content thereof changes depending on what kind of movement. For example, when "moving on foot", the user can take action of continuing to "walk" or then change to an action of "halting". When, for example, "waiting for means of transport" on the move, action of continuing to "wait for means of transport" can be taken. Further, when, for example, "moving by train", the movement can be made an action of "movement by train on a single line". Further, a state in which a state of "movement by rain" continues or a state of "train stopped" in which the train on which the user moves stops can be assumed. Alternatively, action of "trains changed" after "movement by train" can be taken or a state transition to "waiting for means of transport" can also take place.

Then, a further action of "walking" can be associated with a "walking" action or "changing trains" action and a further action of "stopping" can be associated with a "halting" action, a "waiting for means of transport" state, or a "train stop" state. A "train" as a means of transport can further be associated with a state of "moving by train".

Thus, action meta information at an operation action level could change to, as shown in FIG. 3, a higher level of action meta information depending on the context. An action log display system in the present embodiment can analyze the meaning and content of an action based on the relationship between an operation action and the meaning and content and so can present an action log that is easy for the user to understand. In addition, by attaching the hierarchical relationship as hierarchical information to an action segment regarding the meaning and content of the operation action, the segmentation grain size of an action log described later can easily be changed.

In the present embodiment, the ontology/semantic technology is applied to the recognition of the meaning and content of an operation action to segment the action recognition that judges "context" in an "action" and operation action data. Ontology systematically represents the concept of relations between words and in the present embodiment, for example, as shown in FIG. 3, the concept of relations between actions is systematized. Then, using the systematized concept of relations between actions, the meaning of an action or the relationship of actions is understood by applying the semantic technology and recognition processing of the meaning and content of the operation action is performed based on the understanding. For example, by judging the context using properties that a transition from some action (for example, a meal) to some action (for example, work) is likely to occur accompanying, for example, an operation action of "movement on foot", an action segment fitting to the feeling of the user can be generated.

[3-2. Action Segment Generation Processing]

Example 1: Generation of an Action Segment by the Contextual Analysis

Figure 4:
FIG. 4 is an explanatory view showing a case when an action segment is generated from operation action data by contextual analysis and the display of the action log is changed by changing a segmentation grain size of the action segment.

As a concrete example of generation processing of an action segment using the relationship between the operation action and the meaning and content, generation processing of an action segment by the contextual analysis will be described based on FIGS. 4 and 5. FIG. 4 is an explanatory view showing a case when an action segment is generated from operation action data by the contextual analysis and the display of the action log is changed by changing a segmentation grain size of the action segment. FIG. 5 is an explanatory view showing another example of the case when the action segment is generated from operation action data by the contextual analysis and the display of the action log is changed by changing the segmentation grain size of the action segment.

As shown in FIG. 4, it is assumed that an action log including operation action data is acquired by the operation action recognition unit 124. The operation action data is arranged from left to right in chronological order. The operation action data is an operation action recognized based on sensor information of the sensors 110 and an action log is represented by a simple operation action like "walked", "stopped", and "got on a train". The living action recognition unit 321 recognizes the meaning of each piece of operation action data or the relationship between operation action data using a dictionary as shown in FIG. 3 from such an action log.

For example, a state of short "stopped" of a predetermined time or shorter between operation action data of "got on a train" is estimated to be a "train stopped (at a station)" state. A state of short "walked" of a predetermined time or shorter between operation action data of "got on a train" is estimated to be a "changing trains" action. Further, "stopped" of operation action data immediately before operation action data of "got on a train" is estimated to be a state of "waited for a train".

By using the action time of operation action data, the action can be estimated more appropriately. Regarding an action of "movement by train", for example, the meaning of action of "going to office" or "going to school" can be estimated if the action time is a morning hour (for example, from 6 am to 10 am) and the meaning of action of "going home" can be estimated if the action time is an evening hour (for example, from 5 pm to 8 pm). Similarly, regarding an action of "meal", the meaning of action of "breakfast" can be estimated if the action time is a morning hour, "lunch" can be estimated if the action time is an hour around noon, "supper" can be estimated if the action time is an evening hour.

Thus, an action log including action segments as shown in FIG. 4 is generated by an action log including operation action data being analyzed by the living action recognition unit 321. An action segment is data representing an operation action to which operation content is added and is a chunk of consecutive operation actions having the same meaning and content. An action segment generated to match operation action data includes unit segments to which detailed operation content is added. Therefore, if an action log is represented by action segments, as shown in FIG. 4, the moving state while riding on a train can also be known.

Then, by acquiring hierarchical action meta information at an operation action level from the context level dictionary shown in FIG. 3 to hierarchically change the segmentation grain size as a parameter to determine the roughness of segmentation of the action segment, the display of the action segment can be changed. With an increasing segmentation grain size, a plurality of action segments that can be considered to be one action is combined to produce an action segment representing rough operation content. On the other hand, with a decreasing segmentation grain size, an action segment approaches the unit segment.

For example, as shown in FIG. 4, the segmentation grain size of an action log represented by unit segments is increased. In a state of a grain size 1-1 reached by increasing the segmentation grain size from the segmentation grain size of the unit segment, a series of operations of "got on a train", "train stopped", and "got on a train" are represented by one action segment of "got on a train on some line". In a state of a grain size 1-2 reached by further increasing the segmentation grain size, a series of operations of "got on a train on some line", "trains changed", and "got on a train on some line" are represented by one action segment of "movement by train". In a state of a grain size 1-3 reached by further increasing the segmentation grain size, a series of operations of "walked", "waited for a train", "movement by train" and "walked" are represented by one action segment of "moved".

By changing the segmentation grain size based on hierarchical action meta information at the operation action level in this manner, the action log can be displayed at an operation action level that is easy for the user to view.

An action segment concerning movement is described with reference to FIG. 4, but an action log can also be displayed similarly for other actions. Assume that, for example, as shown in FIG. 5, "action model X" representing a conspicuously unsteady motion appearing in a shopping action or the like and an operation action of "had a meal" are recognized by the operation action recognition unit 124 as operation action data. "Action model X" normally means the class of shopping, but the meaning thereof changes in accordance with a prior or subsequent determination result.

In the example shown in FIG. 5, "action model X" is present before and after "had a meal". In this case, the living action recognition unit 321 recognizes the action model X as "accepted" and "paid the bill" as operations performed before and after an operation of "have a meal" from operation action data before or after the action model X. Thus, an action log that is easy for the user to understand can be presented by the meaning and content being added to the user's unsteady motion from the prior or subsequent operation. Also in this case, a series of actions of "accepted", "had a meal", and "paid the bill" can be represented as one action segment of "had a meal" by increasing the segmentation grain size.

Figure 6:
FIG. 6 is an explanatory view showing a case when an action segment is generated from operation action data by combining the contextual analysis and a time width and the display of the action log is changed by changing the segmentation grain size of the action segment.

Example 2: Generation of an Action Segment by Combining the Contextual Analysis and the Time Width Next, a concrete example when an action segment is generated by considering, in addition to the contextual analysis, the time width will be described based on FIG. 6. FIG. 6 is an explanatory view showing a case when an action segment is generated from operation action data by combining the contextual analysis and the time width and the display of the action log is changed by changing the segmentation grain size of the action segment.

As shown in FIG. 6, it is assumed that an action log including operation action data is acquired by the operation action recognition unit 124. In the present example, an action log is represented by simple operation actions like "desk work", "walked", "advance arrangements", and "meal" as operation action data. The living action recognition unit 321 recognizes the meaning of each piece of operation action data or the relationship between operation action data using a dictionary as shown in FIG. 3 and also recognizes the meaning and content thereof by considering the time width of the operation action data.

FIG. 6 shows an example of the action log in a company. What kind of walking the operation action data of "walked" is about can be recognized from prior or subsequent operation action data, but can also be estimated based on a walking time. An operation action of short "walked" in a company normally does not have any special meaning. However, if the walking continues for a predetermined time or longer, the walking is estimated not to be simple movement on the floor, but to be movement between premises. Thus, action segments generated by combining the contextual analysis using a dictionary and the time width of operation action data are as shown in FIG. 6. The operation action data of "walked" is divided into "short walking" and "movement between premises" depending on the time width thereof.

When action segments are generated, like in the above case, the display of the action log including the action segments can easily be changed by changing the segmentation grain size. For example, in a state of a grain size 2-1 reached by increasing the segmentation grain size from the segmentation grain size of the unit segment, a series of operations of "desk work", "short walking", "advance arrangements", "short walking", and "desk work" are represented as one action segment of "worked". In this case, "short walking" is combined into one action segment of "worked" and thus, the action segment of "movement between premises" may be displayed simply as "movement".

In a state of a grain size 2-2 reached by further increasing the segmentation grain size, a series of operations of "worked", "meal", "worked", "movement", and "worked" are represented as one action segment of "was in company". By changing the segmentation grain size based on hierarchical action meta information at the operation action level in this manner, the action log can be displayed at an operation action level that is easy for the user to view.

Figure 7:
FIG. 7 is an explanatory view showing a case when an action segment is generated from operation action data by combining the contextual analysis, the time width, and position changes and the display of the action log is changed by changing the segmentation grain size of the action segment.

Example 3: Generation of an Action Segment by Combining the Contextual Analysis, the Time Width, and Position Changes Next, a concrete example when an action segment is generated by considering, in addition to the contextual analysis and time width, position changes will be described based on FIG. 7. FIG. 7 is an explanatory view showing a case when an action segment is generated from operation action data by combining the contextual analysis, the time width, and position changes and the display of the action log is changed by changing the segmentation grain size of the action segment.

As shown in FIG. 7, it is assumed that an action log including operation action data is acquired by the operation action recognition unit 124. In the present example, an action log is represented by simple operation actions like "did shopping", and "walked" as operation action data. The living action recognition unit 321 recognizes the meaning of each piece of operation action data or the relationship between operation action data using a dictionary as shown in FIG. 3 and also recognizes the meaning and content thereof by considering the time width of the operation action data and position changes of the action recording device 100 (that is, the user).

FIG. 7 shows an example of the action log in shopping. What kind of walking the operation action data of "walked" is about can be recognized from prior or subsequent operation action data, but can also be estimated in detail based on a walking time and position changes.

If, for example, the operation actions before and after the operation action data of "walked" are "did shopping" and a movement time t is t1 (for example, 35 s) or more and position changes of the action recording device 100 carried by the user are measured, the user is estimated to "move between shops". Also, if, for example, the operation actions before and after the operation action data of "walked" are "did shopping" and the movement time t is t2 (for example, 20 s) or more and shorter than t1, and no position change of the action recording device 100 is measured, the user is estimated to "move between floors" during shopping. Further, if, for example, the operation actions before and after the operation action data of "walked" are "did shopping" and the movement time t is t3 (for example, 5 s) or more and shorter than t2, and no position change of the action recording device 100 is measured, the user is estimated to "move in a shop" during shopping.

Thus, if the meaning and content of operation action data is recognized by combining the contextual analysis, time width, and position changes, as shown in FIG. 7, action segments including three action segments of "movement in a shop (SG1)", "movement on floors (SG2)", and "movement between shops (SG3)" are generated from operation action data of "walked".

When action segments are generated, like in the above case, the display of the action log including the action segments can easily be changed by changing the segmentation grain size. For example, in a state of a grain size 3-1 reached by increasing the segmentation grain size from the segmentation grain size of the unit segment, among action segments concerning walking, the action segment SG1 with the shortest walking time is combined with the action segments of "did shopping" preceding and succeeding the action segment SG1. These action segments are represented by an action segment as a series of operations of "did shopping". In this case, "movement in a shop" is combined into one action segment of "did shopping", other action segments concerning walking may be displayed simply as "movement".

In a state of a grain size 3-2 reached by further increasing the segmentation grain size, among action segments concerning walking, the action segment SG2 with the shortest walking time next to the action segment SG1 is combined with the action segments of "did shopping" preceding and succeeding the action segment SG2. Then, in a state of a grain size 3-3 reached by further increasing the segmentation grain size, among action segments concerning walking, the action segment SG3 with the longest walking time is also combined with the action segments of "did shopping" preceding and succeeding the action segment SG3. Accordingly, a series of operations of "did shopping" and "walked" are represented as one action segment. By changing the segmentation grain size based on hierarchical action meta information at the operation action level in this manner, the action log can be displayed at an operation action level that is easy for the user to view.

[3-3. Action Recognition Processing]

Figure 8:
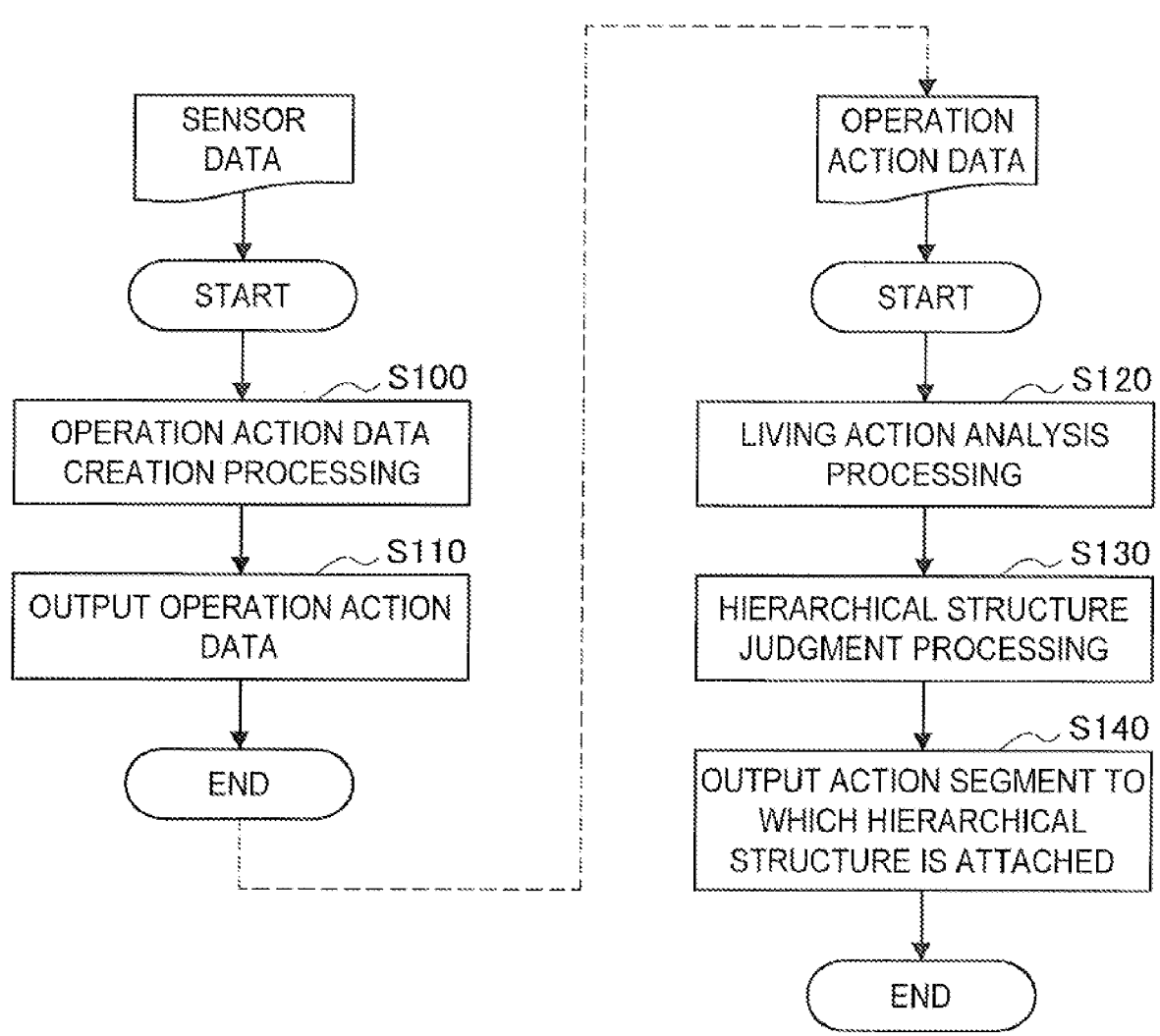
FIG. 8 is a flow chart showing the flow of overall processing of action recognition.
Figure 9:
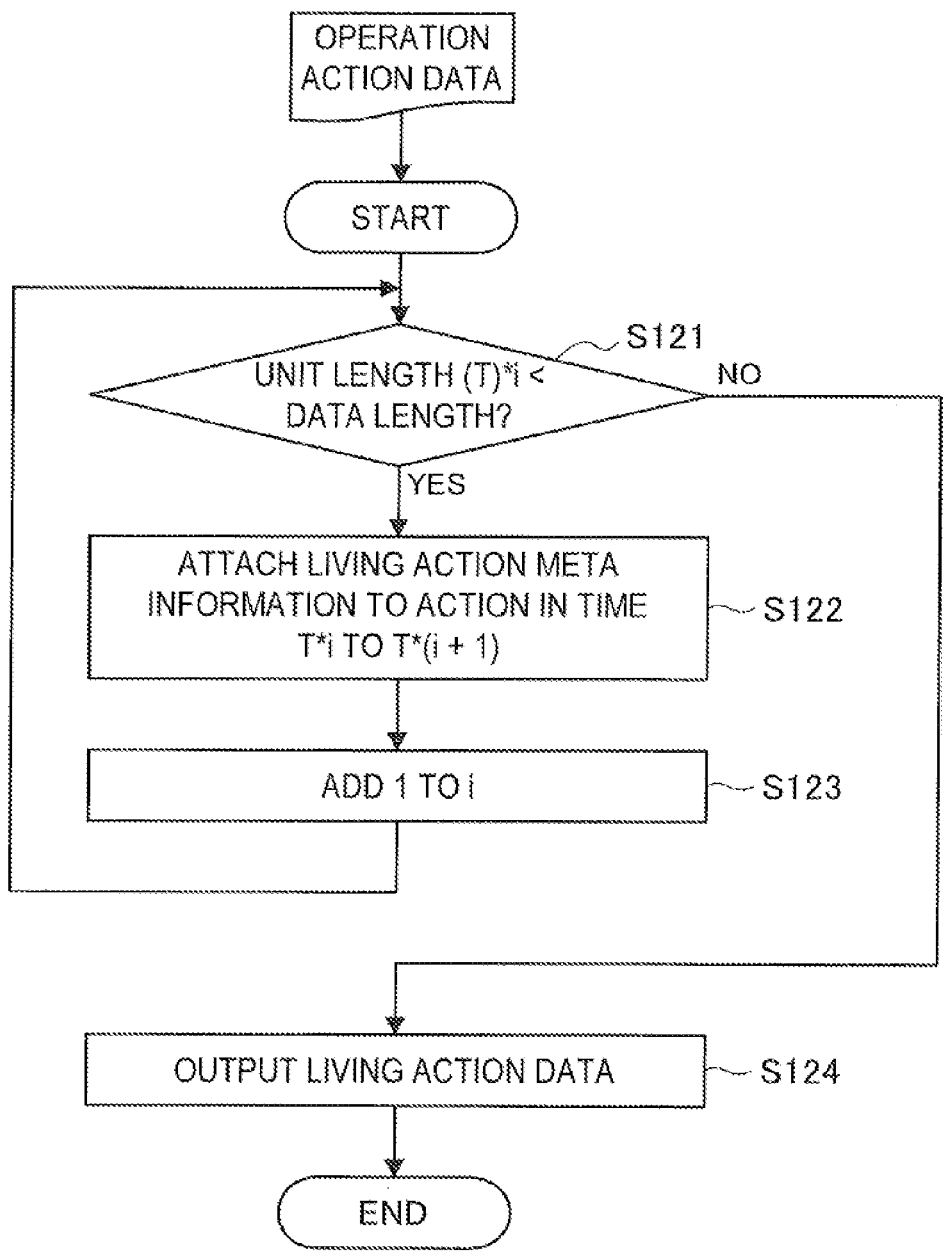
FIG. 9 is a flow chart showing processing by a living action recognition unit.
Figure 10:
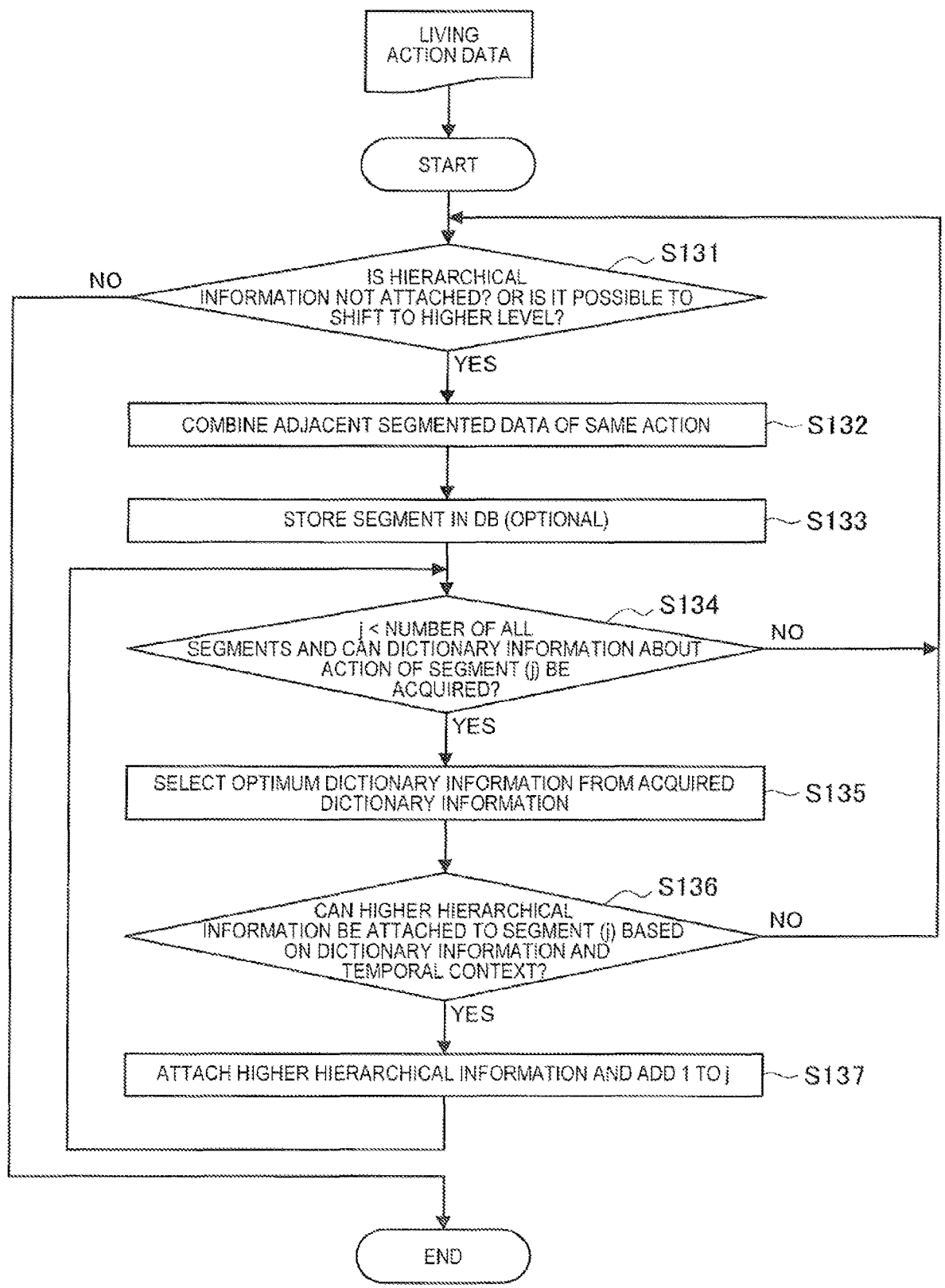
FIG. 10 is a flow chart showing processing by a hierarchical structure judgment unit.

Processing to generate an action segment from operation action data will be described in detail based on FIGS. 8 to 10. FIG. 8 is a flow chart showing the flow of overall processing of action recognition. FIG. 9 is a flow chart showing processing by the living action recognition unit 321. FIG. 10 is a flow chart showing processing by the hierarchical structure judgment unit 322.

Action recognition processing includes, as shown in FIG. 8, operation action data creation processing (S100, S110) performed by the action recognition unit 120 of the action recording device 100 and action segment generation processing (S120 to S140) performed by the action representation generation unit 320 and the data management unit 330 of the analysis server 300.

The operation action recognition unit 124 of the action recognition unit 120 having acquired sensor information from the sensors 110 starts creation processing of operation action data (S100). The operation action data creation processing can be performed by using an existing technique. After creating operation action data, the operation action recognition unit 124 outputs the operation action data to the action log server 200 (S110). In this manner, operation action data constituting an action log of the user is accumulated in the action log server 200. Incidentally, the action recognition unit 120 may generate, as operation action data, not only action information at the operation level, but also information including, for example, time information, location information, an operation history of devices and the like.

When operation action data is created, the action representation generation unit 320 of the analysis server 300 analyzes the meaning and content of the operation action data through the living action recognition unit 321 (S120). The living action recognition unit 321 segments the operation action data into data of a preset unit length and attaches living action meta information to each piece of segmented data. The unit length of the operation action data is defined by a predetermined time T (for example, T=1 min) The segmentation order of the operation action data is set as i (i=1 to N).

After segmenting the operation action data into the unit time T in chronological order, the living action recognition unit 321 first determines whether an integrated value of the unit length (T) and the parameter i is smaller than the length (time) of the operation action data (S121). If it is determined in step S121 that the integrated value of the unit length (T) and the parameter i is smaller than the length (time) of the operation action data, the living action recognition unit 321 attaches living action meta information to the segmented data between time T*i and time T*(i+1) (step S122). The symbol "*" indicates integration processing. In step S122, the meaning and content (living action meta information) applicable to the segmented data at the time can be attached by using, for example, ruled-based branching processing. Alternatively, living action meta information can also be attached the segmented data using machine learning such as the Hidden Markov Model (HMM) or Neural Network. The number of pieces of living action meta information attached to the segmented data is not limited to one and a plurality of pieces of living action meta information may be attached.

When living action meta information is attached to the segmented data of the operation action data in step S122, the living action recognition unit 321 adds 1 to the parameter i (S123) to repeat the processing from step S121. If it is determined in step S121 that the integrated value of the unit length (T) and the parameter i is equal to or greater than the length (time) of the operation action data, the living action recognition unit 321 outputs each piece of segmented data to which living action meta information is attached by the processing in step S122 as living action data (S124). An output result of the living action recognition unit 321 may be recorded in a predetermined storage unit (not shown) or may be output directly to the functional unit (in this case, the hierarchical structure judgment unit 322) that performs the next processing.

To return to the description of FIG. 8, when living action data as information in which living action meta information is attached to segmented data constituting operation action data by the living action recognition unit 321 is generated, the hierarchical structure judgment unit 322 attaches hierarchical information representing a hierarchical relationship about the meaning and content to the living action data. The processing will be described based on FIG. 10. The hierarchical structure judgment unit 322 first determines whether the input living action data satisfies at least one of conditions that no hierarchical information is attached and it is possible to further shift to a higher level from the attached hierarchical information (S131).

If none of these conditions is satisfied in step S131, that is, the highest hierarchical information is already attached, the hierarchical structure judgment unit 322 terminates the processing shown in FIG. 10. On the other hand, if one of the above conditions is satisfied in step S131, the hierarchical structure judgment unit 322 combines adjacent segmented data of the same action of each piece of segmented data arranged in chronological order (S132). In step S132, processing to regard data discretized in step S120 as one operation action when the same action continues is performed. A chunk (segment) generated by combining segmented data may be recorded in a predetermined storage unit (not shown) (S133).

Next, if the chronological arrangement order of segments generated in step S132 is set as j (j=1 to M), the hierarchical structure judgment unit 322 determines whether j is smaller than the number of segments generated in step S131 and dictionary information about the action of the j-th segment can be acquired (S134). If both of these conditions are satisfied in step S134, the hierarchical structure judgment unit 322 selects and attaches dictionary information optimum to the relevant segment of the acquired dictionary information (S135). Then, the hierarchical structure judgment unit 322 determines whether still higher hierarchical information can be attached to the segment (j) based on the selected dictionary information and temporal context (S136). If it is determined in step S136 that higher hierarchical information can be attached, the hierarchical structure judgment unit 322 attaches higher hierarchical information to the segment (j) and adds 1 to the parameter j (S137). Then, the processing in step S134 and thereafter is repeated.

On the other hand, if it is determined in step S134 that j is equal to or greater than the number of segments generated in step S132 or dictionary information about the action of the j-th segment cannot be acquired, the hierarchical structure judgment unit 322 repeats the processing in step S131 and thereafter. Also when it is determined in step S136 that higher hierarchical information cannot be attached to the segment (j), the hierarchical structure judgment unit 322 repeats the processing in step S131 and thereafter.

As shown in FIG. 10, the hierarchical structure judgment unit 322 segments segmented data generated in step S120 by piecing together segmented data as the same action that is temporally consecutive. Then, related dictionary information is acquired and attached to each segment and whether still higher hierarchical information can be added is judged. Thus, by performing the processing in steps S131 to S137, an action segment (unit segment) in the minimum unit to which hierarchical information is attached is generated.

Figure 11:
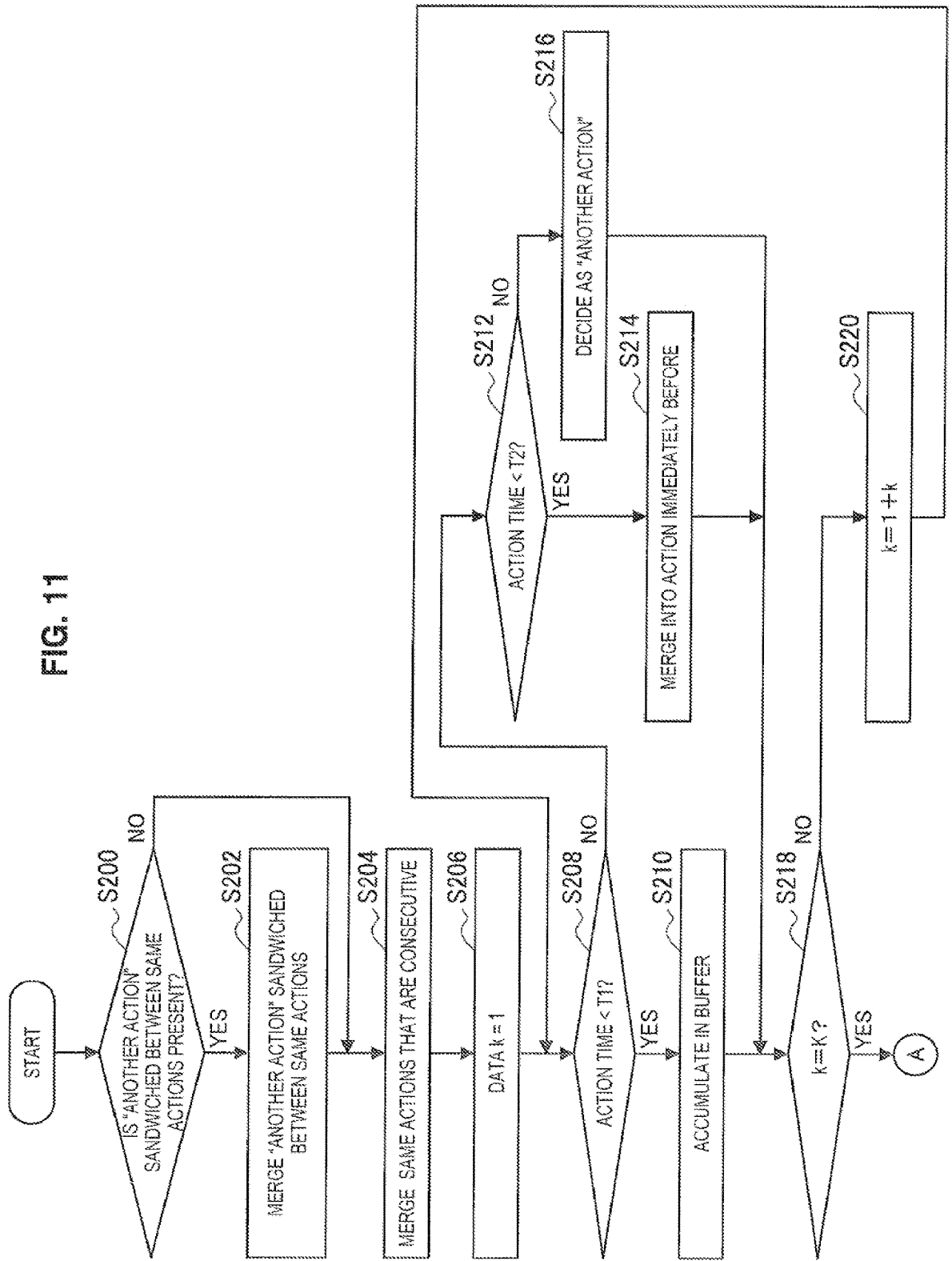
FIG. 11 is a flow chart showing action segment generation processing.
Figure 12:
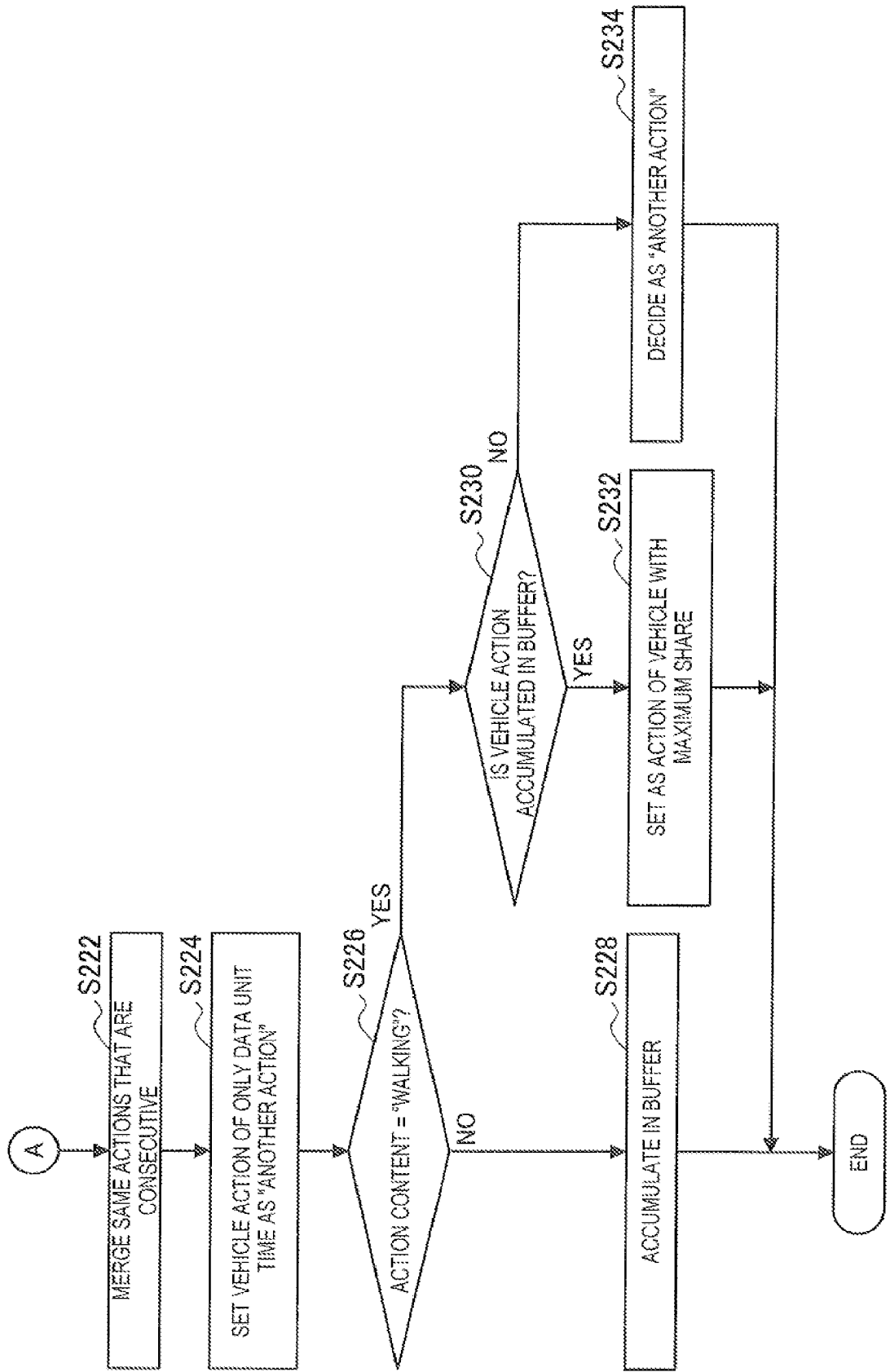
FIG. 12 is a flow chart showing the action segment generation processing.

FIGS. 11 and 12 show a flow chart showing an example of action segment generation processing. As shown in FIG. 11, the hierarchical structure judgment unit 322 determines whether "another action" sandwiched between the same action of segmented data is present (S200). If "another action" sandwiched between the same action is present, "another action" is merged into the action before and after "another action" (S202). However, merge processing of "another action" sandwiched between operation actions of "walking" whose precision is sufficiently high and which is likely to be a point of change is not performed. After "another action" is merged in step S202 or there is no "another action" sandwiched between the same action in step S200, the hierarchical structure judgment unit 322 merges the same actions that are consecutive (S204).

Then, the hierarchical structure judgment unit 322 sets the parameter k (k=1 to K) representing the chronological order of segments generated by merge processing to the initial value 1 (S206) and determines whether the action time of the segment (k) is shorter than a predetermined time T1 (for example, T1=3 min) (S208). If the action time of the segment (k) is shorter than the predetermined time T1 in step S208, the hierarchical structure judgment unit 322 accumulates the segment in a buffer (S210). On the other hand, if the action time of the segment (k) is determined to be equal to or longer than the predetermined time T1 in step S208, the hierarchical structure judgment unit 322 further determines whether the action time of the segment (k) is shorter a predetermined time T2 (T2>T1; for example, T2=10 min) (S212).

If the action time of the segment (k) is determined to be shorter than the predetermined time T2 in step S212, the hierarchical structure judgment unit 322 merges the segment (k) into the action immediately before (S214). On the other hand, if the action time of the segment (k) is equal to or longer than the predetermined time T2 in step S212, the hierarchical structure judgment unit 322 decides the operation action of the segment as "another action" (S216). Then, the hierarchical structure judgment unit 322 determines whether the processing of steps S208 to S216 has been performed for all segments (S218) and if there is any unprocessed segment, the hierarchical structure judgment unit 322 adds 1 to k (S220) and then repeats the processing in step S208 and thereafter, On the other hand, if the processing of steps S208 to S216 has been performed for all segments, as shown in FIG. 12, processing to merge consecutive segments of the same action is performed (S222). Then, if a vehicle action of only the data unit time (for example, only 1 min) is present, the action of the segment is set as "another action" (S224).

Next, the hierarchical structure judgment unit 322 determines whether action content of the segment is "walking" (S226) and, if the action content is other than "walking", accumulates the segment in the buffer (S228). On the other hand, if the action content of the segment is "walking", the hierarchical structure judgment unit 322 determines whether any vehicle action is accumulated in the buffer (S230). If a vehicle action is accumulated in the buffer, the hierarchical structure judgment unit 322 sets the operation action of the segment as an action of vehicle with the maximum share from "walking" (S232). On the other hand, if no vehicle action is accumulated in the buffer, If a vehicle action is accumulated in the buffer, the hierarchical structure judgment unit 322 sets the operation action of the segment as "another action" (S234).

Figure 13:
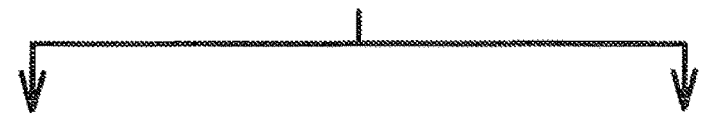
FIG. 13 is an explanatory view illustrating a method of attaching hierarchical information to the action segment.

Here, hierarchical information added to an action segment will be described based on FIG. 13. As shown in FIG. 13, it is assumed that the operation content of six unit segments (SG01 to SG06) is "train", "train", "walking", "walking", "train", and "train". The unit segment SG01 and the unit segment SG02 are merged into an action segment SG07, the unit segment SG03 and the unit segment SG04 are merged into an action segment SG08, and the unit segment SG05 and the unit segment SG06 are merged into an action segment SG09 by the processing shown in FIG. 10. The state is set as the grain size 1-0. The action segments SG07 to SG09 in the grain size 1-0 becomes an action segment SG17 of "got on a train on some line (action B)", an action segment SG18 of "trains changed (action C)", and an action segment SG19 of "got on a train on some line (action C)" respectively. The grain size at this point is set as 1-1. If the action segments SG17 to SG19 are further merged from the grain size 1-1, one action segment SG10 of "got on a train (action A)" is obtained. The grain size at this point is set as 1-2.

An action segment holds hierarchical information by being attached to the action segment combining unit segments or by being attached to the unit segments. When hierarchical information is attached to an action segment combining unit segments, it is assumed that, for example, an action segment SG17 of the action B in FIG. 13 is focused on. The action segment SG17 is considered to be an action segment newly generated by combining the unit segments SG01 and SG02. In this case, the facts that the action segment has the grain size 1-1 and the action content is "got on a train on some line", and the start time and the end time of the action are attached to the action segment SG17 as hierarchical information. Alternatively, the fact that the action segment SG17 includes the unit segments SG01 and SG02 may be attached to the action segment SG17 as hierarchical information.

On the other hand, when hierarchical information is attached to unit segments as action segments of the minimum unit, it is assumed that, for example, an action segment SG01 in FIG. 13 is focused on. In this case, the facts that the action segment is a unit segment and is contained in the action segment SG07 in the grain size 1-0, in the action segment SG17 in the grain size 1-1, and in the action segment SG10 in the grain size 1-2 is attached to the action segment SG01 as hierarchical information. More specifically, information in which operation content is associated in the order of hierarchy like, for example, [train, action B, action A] can be represented as hierarchical information.

Hierarchical information may be attached in any form and can also be attached in other forms. The case of attaching hierarchical information to an action segment combining unit segments is superior in terms of the amount of data and the case of attaching hierarchical information to unit segments is superior in terms of a database search.

Returning to the description of FIG. 8, when action segments to which hierarchical information is attached from living action data are generated in step S130, the living action recognition unit 321 outputs each action segment to the data management unit 330 (S140). The data management unit 330 records the acquired action segment in a storage unit (the unit data storage DB 334 or the hierarchical information attached data storage DB 335).

[3-4. Processing Content of Action Representation Generation Unit]

Figure 14:
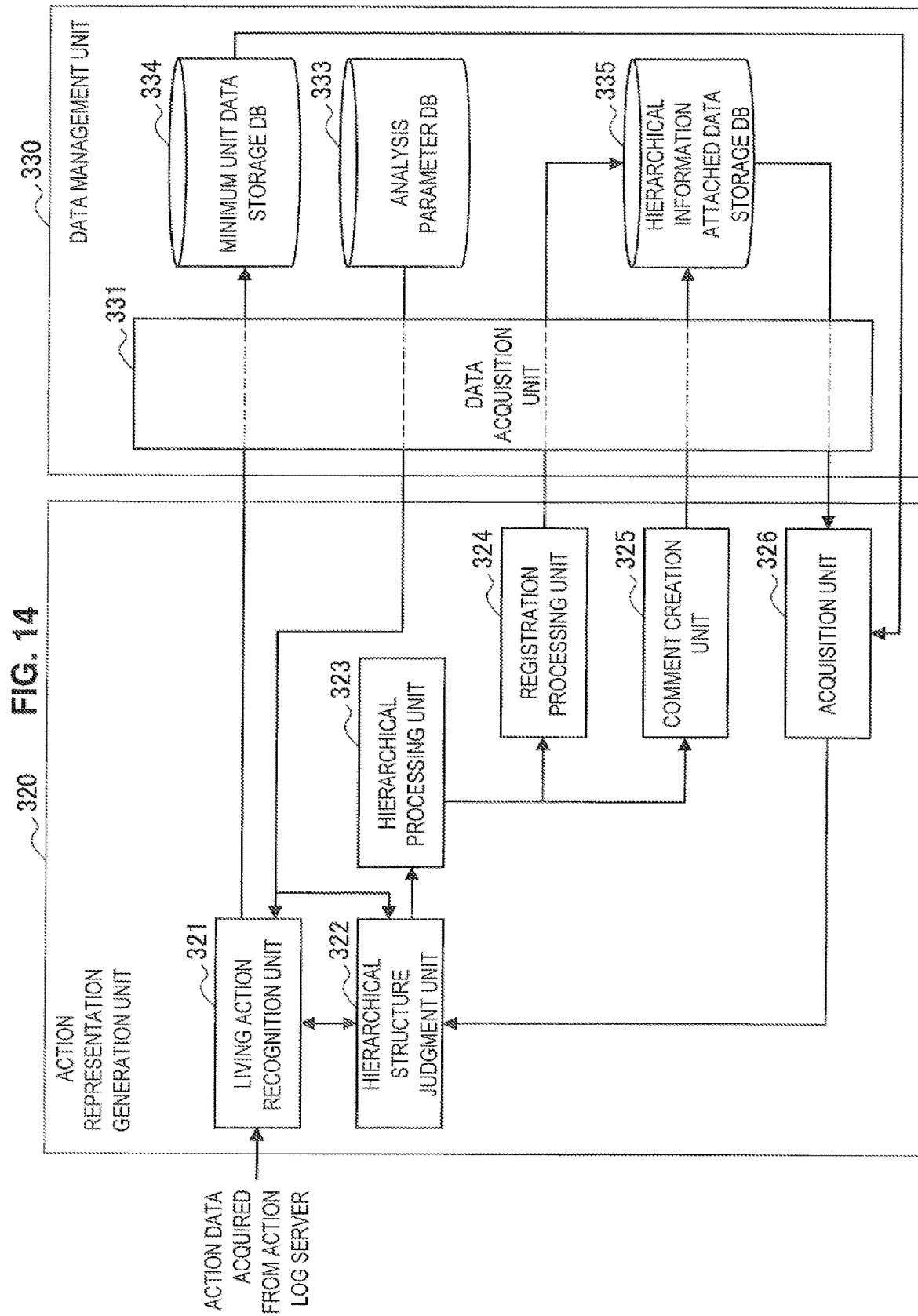
FIG. 14 is functional block diagram showing the functional configuration of an analysis server.

The analysis server 300 can accumulate an action log by action segments in real time and at the same time, can generate an action representation based on the meaning and content of an operation action. The analysis server 300 can also generate an action representation from a past action history. A detailed configuration of the action representation generation unit 320 and the data management unit 330 of the analysis server 300 is shown in FIG. 14. FIG. 14 is functional block diagram showing the functional configuration of the analysis server 300.

As shown in FIG. 14, the action representation generation unit 320 can include, in addition to the living action recognition unit 321 and the hierarchical structure judgment unit 322 described above, a hierarchical processing unit 323, a registration processing unit 324, a comment creation unit 325, and an acquisition unit 326.

The hierarchical processing unit 323 performs subsequent processing of a judgment result of the hierarchical structure judgment unit 322. The hierarchical processing unit 323 functions based on a hierarchical structure when only a portion of data to be attached to action segments is recorded in the storage unit for slimming down or speedup of data or hierarchical information of the specified action segment is delivered to an application.

As described above, hierarchical information may be attached to an action segment combining unit segments or to the unit segments. When hierarchical information is attached to a combined action segment, the hierarchical processing unit 323 processes the action segment of the hierarchical information selected by the user via the input unit 160. On the other hand, when hierarchical information is attached to unit segments, the hierarchical processing unit 323 generates an action segment by combining unit segments based on the hierarchical information selected by the user via the input unit 160. The hierarchical processing unit 323 a processing result of information to the registration processing unit 324 and the comment creation unit 325.

The registration processing unit 324 records the action segment generated by the hierarchical processing unit 323 in the data management unit 330. The registration processing unit 324 outputs an action segment to the data acquisition unit 331 to record the action segment in the hierarchical information attached data storage DB 335.

The comment creation unit 325 creates and attaches a comment such as the meaning and content of an action to a generated action segment. A comment created by the comment creation unit 325 is output to the data acquisition unit 331. The data acquisition unit 331 associates the comment with the corresponding action segment and records the comment in, for example, the hierarchical information attached data storage DB 335.

The acquisition unit 326 acquires a predetermined action segment from the unit data storage DB 334 or the hierarchical information attached data storage DB 335. When, for example, processing that needs to use a past action log is performed by the action representation generation unit 320, the acquisition unit 326 past data recorded in the unit data storage DB 334 or the hierarchical information attached data storage DB 335. Data to be acquired is decided based on instructions from the user.

<4. Action Recording and Display Application>

As described above, by analyzing operation action data acquired by the action recording device 100 by the analysis server 300, an action segment to which the meaning and content of an operation action is attached is generated. An application function to represent an action log of the user using action segments will be described below.

[4-1. Representation of Action Log Based on Action Segment]

Figure 15:
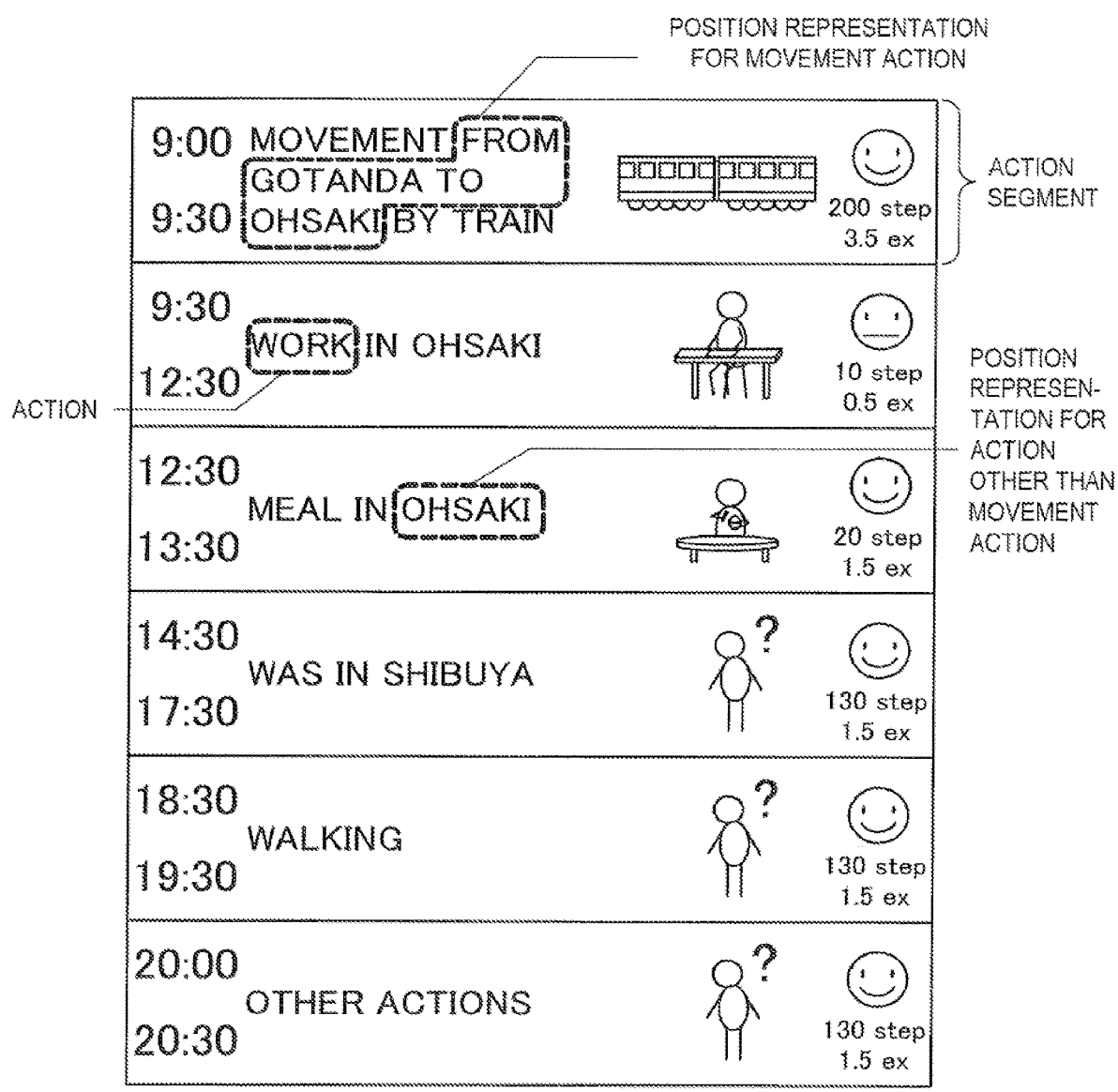
FIG. 15 is an explanatory view showing an example of the representation of the action log.

First, the representation of an action log using action segments will be described. An example of the action log is shown in FIG. 15. The action log in FIG. 15 can be displayed, for example, in the display unit 150 of the action recording device 100.

An action log includes action segments arranged in chronological order. For each action segment, for example, the start time and the end time of the operation action and operation content are displayed. When the operation content is a movement action like "movement by train", a position representation like, for example, from the start location to the goal (for example, "from Gotanda to Ohsaki") is added to the operation content. When the operation content is other than a movement action like "work" and "meal", the location (for example, "in Ohsaki") where the operation is performed is added to operation content.

Further, to notify the user of the operation of such an action segment in an easy-to-understand manner, an object of operation content may be displayed or an object showing the feeling of the user when performing the operation may also be displayed. Also, the number of steps (step value) for the user to perform the operation or a value (exercise value) indicating energy consumption by the operation may be displayed. The content displayed in each action segment constituting an action log is not limited to the example of FIG. 15 and information obtained from sensor information acquired by sensors may further be displayed in each action segment.

In the action log shown in FIG. 15, there are locations where times if adjacent action segments are not continuous. For example, there is a gap between the action of "meal at Ohsaki" started at 12:30 and the action of "was in Shibuya" started at 14:30. In this manner, the action log may be prevented from displaying all action segments. The non-display of an action segment may be caused by, for example, editing/deletion of the action segment by the user or by setting a non-display filter to prevent a portion of action segments from being displayed.

As the non-display filter, for example, a filter that prevents the display when the action time is short or a filter that prevents the display of an action segment judged to be unimportant to the use can be considered. Also, a filter that prevents the display when the precision of recognition is low or a filter that allows the display of an action or location specified by the user may be set.

[4-2. Browsing Action]

Figure 16:
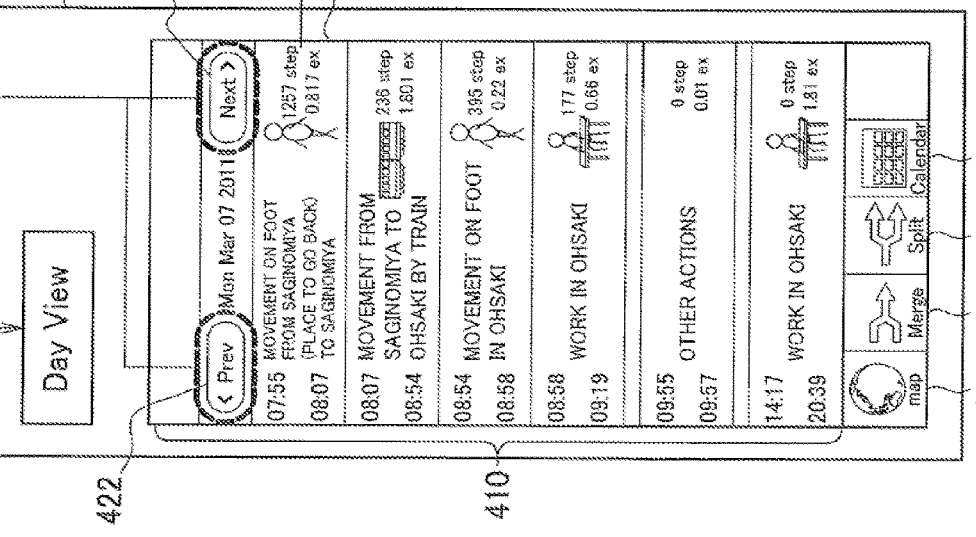
FIG. 16 is an explanatory view showing a display example of the action log when an action log display application is activated.

When an action log display application is activated in a browsing terminal (for example, the action recording device 100), for example, the user can browse the action log of the user in predetermined units, for example, in units of days. FIG. 16 shows a display example of the action log when the action log display application is activated. FIG. 16 shows a state in which an action log 410 in units of days is displayed in the display unit 150 of the action recording device 100.

The action log 410 includes action segments 412 arranged in chronological order, for example, from the upper end of the screen toward the lower end. In each of the action segments 412, as described in FIG. 15, the location where an operation is performed, description of the location, type of the action, number of steps by the user for the operation, exercise value and the like are displayed. If the action log for one day cannot be displayed in the screen of display, the display unit 150 can be caused to display an action segment that is not displayed by performing a screen scroll operation.

By touching a Prev button 422 to display the action log of the previous day of the action log currently displayed or a Next button 424 to display the action log of the next day of the action log currently displayed, the display unit 150 can be caused to display an action log of another day. If the action log of the previous day is not present when the Prev button 422 is pressed, the display unit 150 may be caused to display an action log of the day when an action log is acquired next by further going back to the past. Similarly, if the action log of the next day is not present when the Next button 424 is pressed, the display unit 150 may be caused to display an action log of the day when an action log is acquired next by further moving to the present. Operation buttons 430 for browsing, editing and other operations of the action log 410 are displayed in the display unit 150 and the user can touch the button corresponding to desired processing to perform the processing.

Figure 17:
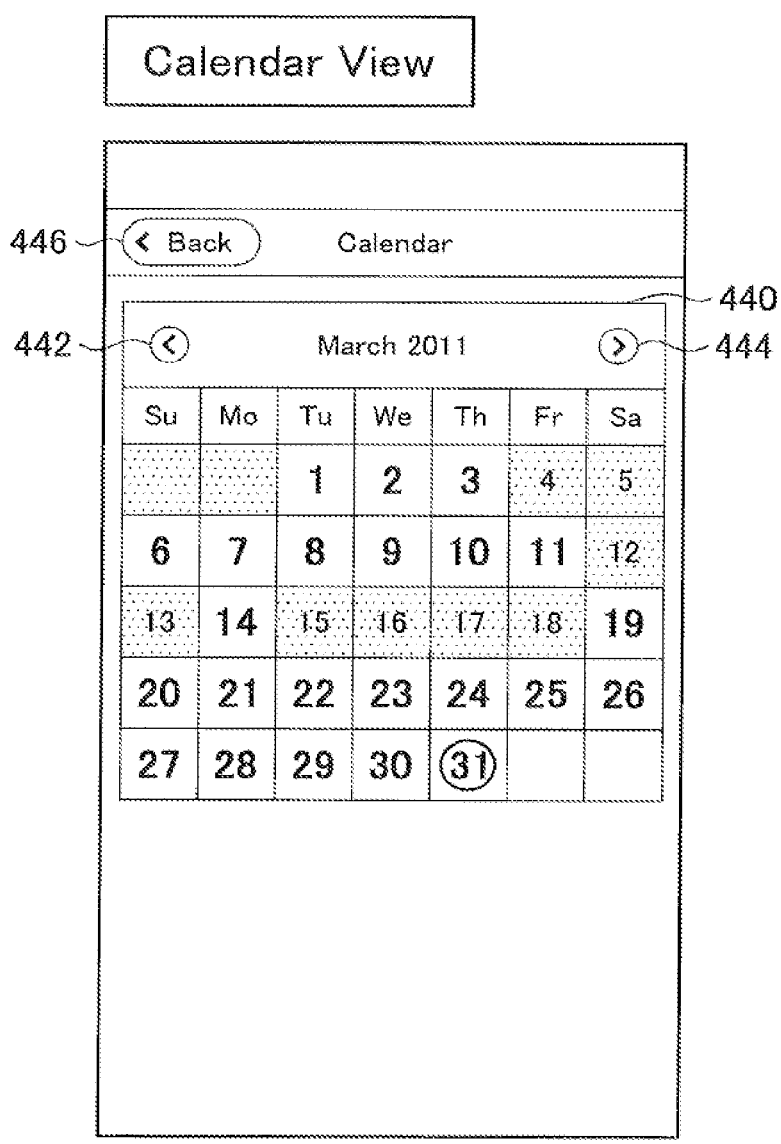
FIG. 17 is an explanatory view showing a display example of a calendar.

If, for example, a calendar button 434 is touched, as shown in FIG. 17, a calendar 440 is displayed in the display unit 150. The calendar 440 displayed first in the display unit 150 after the screen transition may be the current month or the month corresponding to the action log 410 displayed before the screen transition. In the calendar 440, a day for which the action log 410 can be displayed, that is, a day for which the action log 410 is accumulated as data can be selected by, for example, a touch operation. When some day is selected from the calendar 440, the action log 410 of the day is displayed in the display unit 150.

The display of the calendar 440 is changed by a previous (<) button 442 or a next (>) button 444. If the previous (<) button 442 is operated, the calendar of the previous month is displayed and if the next (>) button 444 is operated, the calendar of the next month is displayed. If no action log of the previous month is present when the previous (<) button 442 is pressed, the calendar 440 of a month when any action log is acquired next may be displayed by further going back to the past. Similarly, if no action log of the next month is present when the next (>) button 444 is pressed, the calendar 440 of a month when any action log is acquired next may be displayed by further moving to the present.

FIG. 17 shows an example in which the calendar 440 in units of months is displayed, but the present technology is not limited to such an example and can display a calendar, for example, in units of weeks, two weeks, or years. In addition, an icon indicating a representative operation action for the day may be displayed for all days for which an action log can be displayed in the calendar 440. Accordingly, the user can recognize the action of the day at a glance. By using such a calendar function, the action log 410 desired to browse can easily be searched for and the display unit 150 can be caused to display the action log. To cause a transition from the display screen of the calendar 440 to the previous screen, a Back button 446 may be operated.

Figure 18:
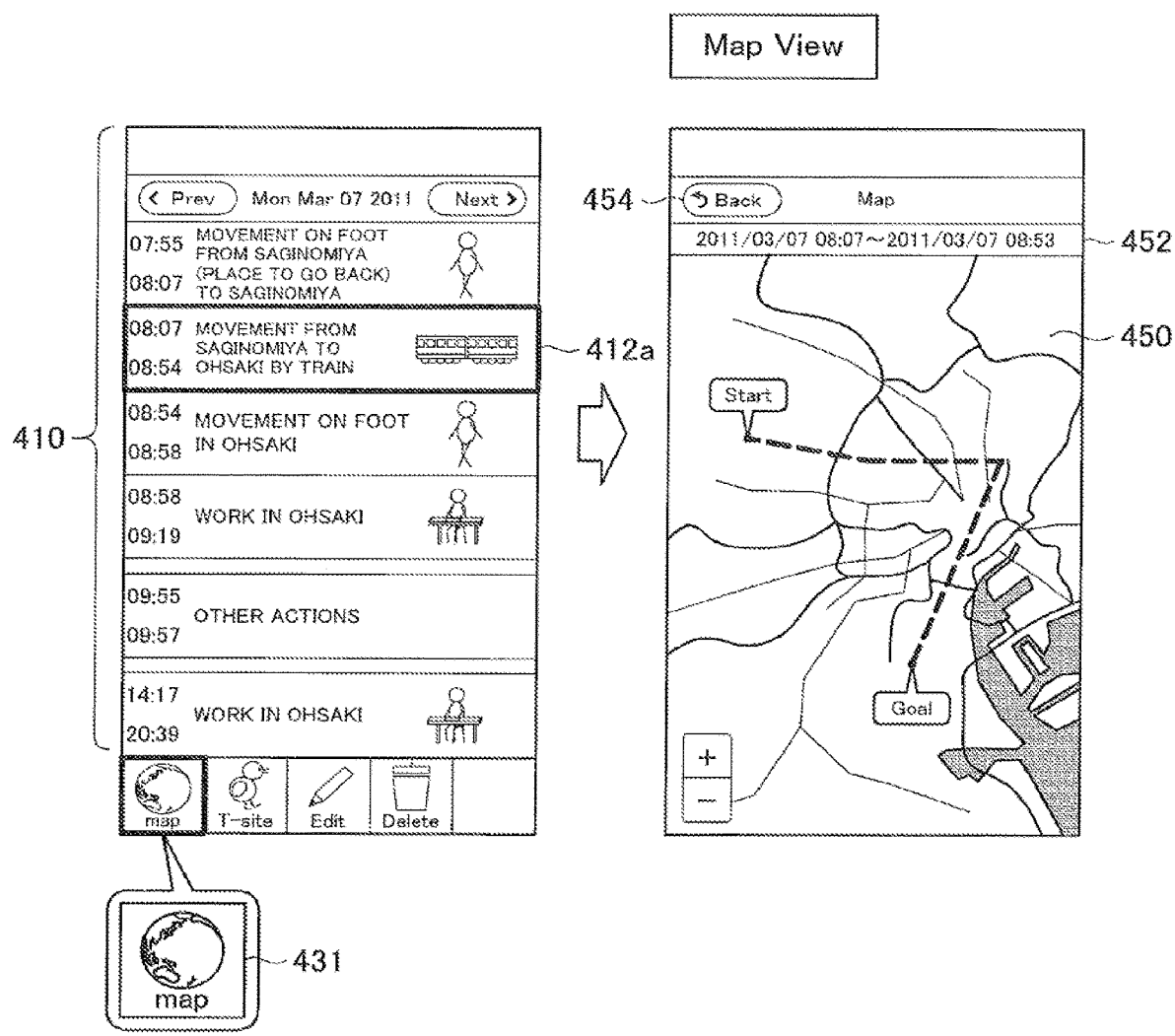
FIG. 18 is an explanatory view showing a display example when a map is caused to display position information corresponding to the action log by operating a map button.

If, for example, a map button 431 of the operation buttons 430 is touched, the action log display application activates a map 450 to display position information corresponding to the action log 410 in the map 450. FIG. 18 shows a display example when the map 450 is caused to display position information corresponding to the action log 410 by operating the map button 431.

If, when the action log 410 is displayed, the map button 431 is touched while none of the action segments 412 constituting the action log 410 is selected, for example, a history of all position information of the action log 410 of the day is displayed on the map 450. If the user is on the move, a movement locus thereof is displayed on the screen.

On the other hand, if, when the action log 410 is displayed, the map button 431 is touched while one action segment 412a is selected from the action log 410, a history of position information of the action segment 412a is displayed on the map 450. If, for example, as shown on the left of FIG. 18, the action segment 412a of "movement from Saginomiya to Ohsaki by train" is selected and the map button 431 is touched, as shown on the right of FIG. 18, a movement locus by train from the start location (Saginomiya) to the goal (Ohsaki) is displayed on the map 450. Accordingly, on which line the user moved can be presented in an easy-to-understand manner. While position information is displayed in the map 450, time information 452 of the position information may be displayed in the display unit 150.

If the user is not on the move, an icon or the like may be displayed in a location where the operation is performed. In FIG. 18, a case when the one action segment 412 is selected is described, but the present technology is not limited to such an example and a plurality of the action segments 412 can be selected and position information of all the selected action segments 412 can be displayed on the map 450. In this case, the position information on the map 450 may be distinguished by color-coding or the like for each action segment and displayed. To cause a transition from the display screen of the map 450 to the previous screen, a Back button 454 may be operated.

[4-3. Correcting Action]

Figure 19:
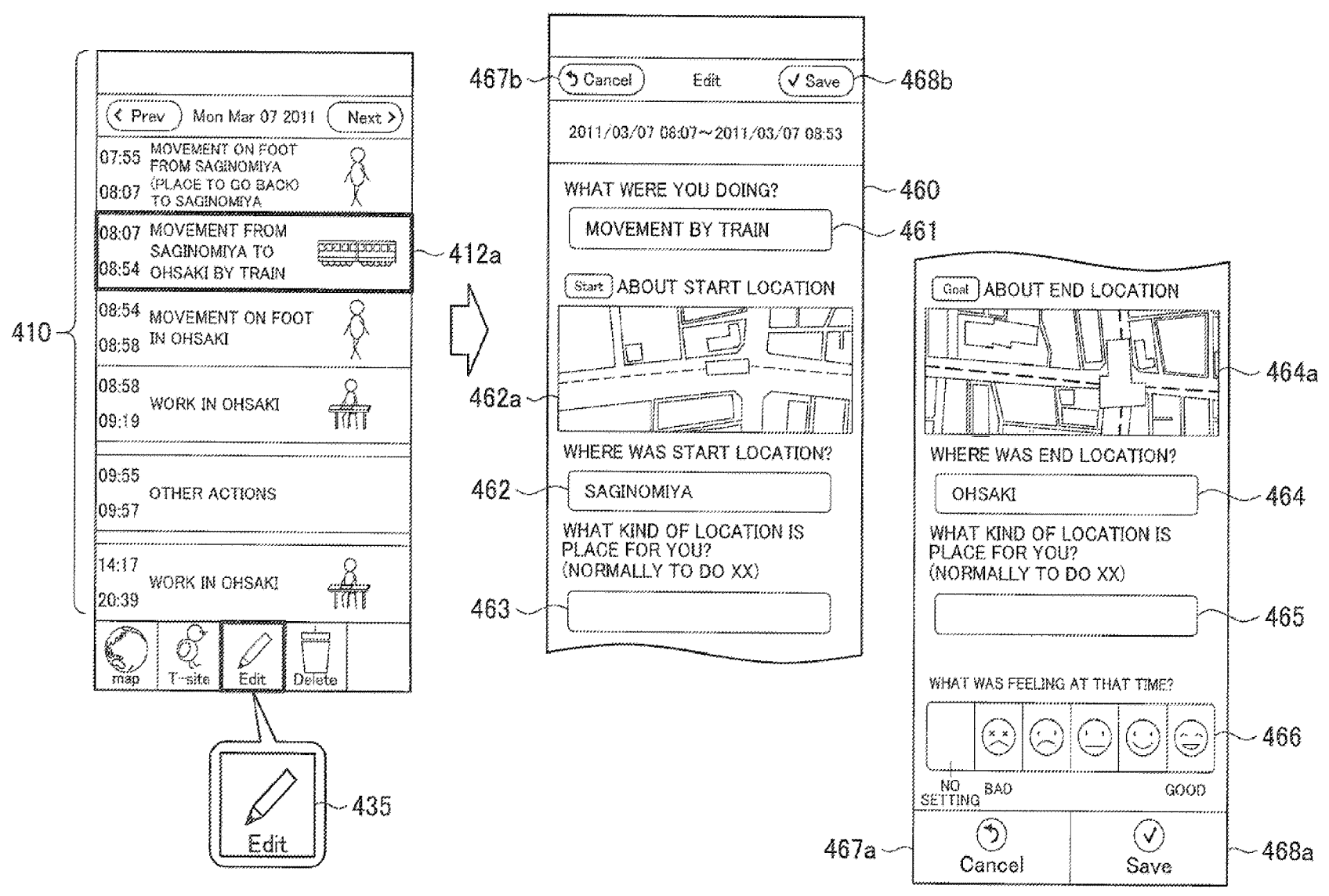
Figure 20:
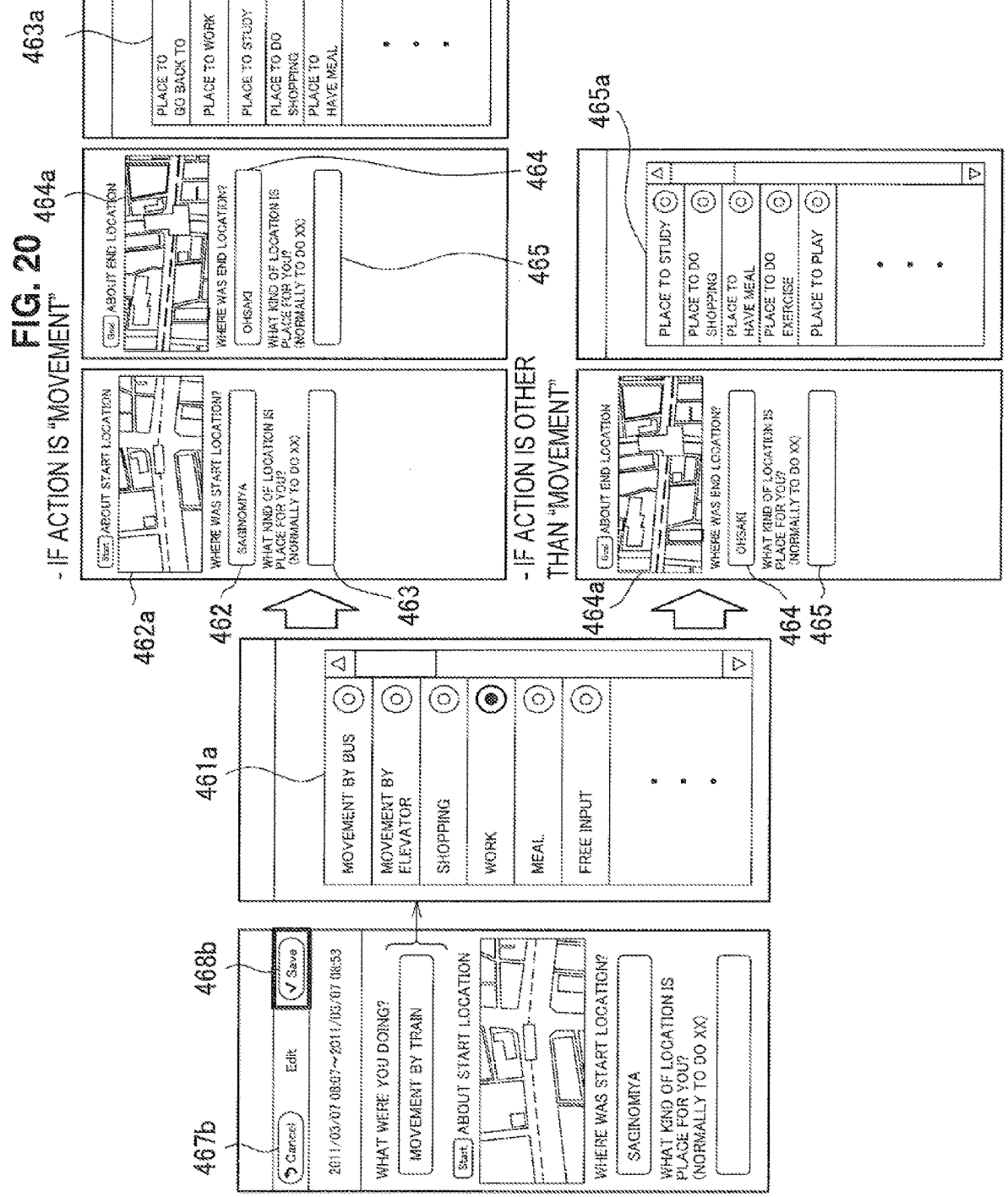
FIG. 20 is an explanatory view showing an example of the correction screen to correct an operation action.

In the foregoing, the method of displaying the action log 410 in the display unit 150 using the action segments 412 analyzed and generated by the analysis server 300 has been described. However, display content of the generated action log 410 may be erroneous. In such a case, the user can correct content of the action log 410. The correction feedback is reflected in action recognition determination processing. First, the method of correcting the action log 410 will be described based on FIGS. 19 and 20. FIG. 19 is an explanatory view showing a state in which a correction screen to correct the action segment to be corrected is displayed. FIG. 20 is an explanatory view showing an example of the correction screen to correct an operation action.

To correct content of the action segment 412, the user selects the action segment 412a to be corrected from the action log 410 displayed in the display unit 150 and touches an edit button 435. Then, as shown on the right of FIG. 19, a correction screen 460 to correct the action segment 412a to be corrected is displayed. If, for example, the correction of the action segment 412a of "movement from Saginomiya to Ohsaki by train" is selected, a screen transition occurs from the display screen of the action log 410 to the correction screen 460 in which the operation content, start location and end location of the operation, and feeling during operation can be edited.

The operation content can be corrected in an operation content correction area 461 of the correction screen 460. If, for example, the operation content correction area 461 is selected, as shown in FIG. 20, an operation content candidate list 461a in which operation content candidates for correction are listed is displayed. The user can correct the operation content by selecting the correct operation content from the operation content candidate list 461a. When "Free input" is selected from the operation content candidate list 461a, an input field into which the user can freely input operation content is displayed and the correct operation content can be input.

After selecting operation content from the operation content candidate list 461a, the user continues to correct the start location and end location of the operation. At this point, if the selected operation content is a movement action like, for example, "movement by bus", corrections of a start location correction area 462, a start location description correction area 463, an end location correction area 464, or an end location description correction area 465 can be made.

A location name list may be displayed for the start location correction area 462 and the end location correction area 464 so that the user can select and input the location name or the user may be enabled to directly input the location name. In the location name list, for example, location names to be a landmark such as a building name, station name, or shop name may be displayed. If there is no location to be a landmark, place names (addresses) may be displayed in the location name list.

In addition the display unit 150 may be caused to display a start location map 462a and an end location map 464a that display a map by being linked to input content of the start location correction area 462 and the end location correction area 464. The start location map 462a and the end location map 464a can be caused to display a map of any location by a scroll operation on the map. When a touch operation is performed on a map displayed on the start location map 462a or the end location map 464a, the location name corresponding to the position where the touch operation is performed may automatically be input into the start location correction area 462 or the end location correction area 464.

The start location description correction area 463 and the end location description correction area 465 are areas where what kind of location the location input into the start location correction area 462 and the end location correction area 464 is for the user is input respectively. When the start location description correction area 463 or the end location description correction area 465 is touched, for example, as shown in FIG. 20, a description candidate list 463a or 465a is displayed. The user can input a location description by selecting the correct description from the description candidate list 463a or 465a.

As the description content of a location, for example, "location to go back to" like the home, "location to work" like a company, and "location to learn" like a school can be cited. By inputting the description of such a location, what king of meaning the location has for the user can be grasped and a contribution can be made to improve the precision of action recognition for the user. If no correct description is found in the description candidate list 463a or 465a, a description may directly be input into the start location description correction area 463 or the end location description correction area 465.

When the operation content selected from the operation content candidate list 461a in FIG. 20 is an action other than a movement action like, for example, "shopping" or "work", the end location correction area 464 and the end location description correction area 465 can be corrected. The correction method is as described above.

An object indicating the feeling of the user when an operation is performed can be corrected by, for example, as shown in FIG. 19, a feeling correction area 466. The feeling correction area 466 includes a "no feeling setting" button and a feeling selection button that stepwise selects good or bad of feelings. The feeling selection button can be configured so that, for example, five levels of feeling of "very bad (irritated or depressed)", "bad (somewhat irritated)", "not bad (no problem)", "good (a bit fine)", and "very good (refreshing, bracing, full)" are selectable. The user can select the feeling when an operation is performed from the feeling correction area 466.

When all corrections are completed, correction content can be reflected in the action segment 412a by pressing a save button 468a at the bottom or a save button 468b at the top of the correction screen 460. When the save button 468a or 468b is pressed, a transition to the screen before the transition to the correction screen 460 occurs. When a transition to the screen before the transition to the correction screen 460 should occur without reflecting input content in the correction screen 460, a cancel button 467a at the bottom or a cancel button 467b at the top of the correction screen 460 may be pressed.

[4-4. Combining Actions]

According to the present technology, the display of the action log 410 can easily be changed not only by correcting content of each of the action segments 412, but also by correcting relationships between the action segments 412. For example, a plurality of the action segments 412 may be combined to display the resultant segment as the one action segment 412. The combination of the action segments 412 is a function to combine the plurality of the action segments 412 that are temporally consecutive into the one action segment 412. The time range of the combined action segment 412 extends from the start time of the oldest action segment 412 to the end time of the newest action segment 412.

FIG. 21 shows an example of the method of combining the action segments 412. First, if a merge button 432 is pressed while the action log 410 is displayed, a state (action combination mode) in which the action segments 412 can be combined is entered. The selected action segments 412 can be combined by selecting the action segment 412 to be combined in action combination mode.

The action of an action segment 412b selected first among the action segments 412 to be combined can be set as operation content after the combination. In FIG. 21, the operation content of "work in Ohsaki" becomes the operation content after the combination. Then, the other action segments 412 to be combined are selected. The selection of the action segment 412 can be made by a touch operation or a drag operation. In FIG. 21, action segments surrounded by a reference sign 412c are selected for combination. Then, if the save button 468a is pressed after the action segments 412 to be combined are selected, the action segments 412 to be combined are displayed by being combined. The combined action segment 412 represents the action of "work in Ohsaki" is done between 9:55 and 22:42. To cancel the combination mode, the cancel button 467a may be pressed.

Figure 22:
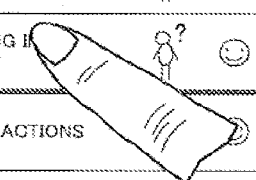
FIG. 22 is an explanatory view showing an example of another method of deciding operation content of the action segment after combination.

In the example of FIG. 21, the operation content of the action segment 412 after the combination is decided in favor of the action segment 412 selected first, but the present technology is not limited to such an example. An example of another method of deciding operation content of the action segment 412 after combination is shown in FIG. 22. In FIG. 22, an action segment to be combined is selected by a drag operation. That is, the first action segment (start segment) to be combined is first selected by contact with a finger and the finger is moved while in contact until the last action segment (end segment) to be combined is selected. In this manner, the action segments (action segments surrounded by the reference sign 412c) to be combined are decided. Then, when the save button 468a (see FIG. 21) is pressed, the action segment after the combination is displayed.

For example, the operation content of any action segment to be combined may be set as the operation content of the action segment after the combination. If, for example, the operation content of "walked in Ohsaki" is selected, the operation content of an action segment 412d1 after the combination becomes "walked in Ohsaki".

The operation content of the action segment after the combination may be decided, for example, by majority of action segments to be combined. In the example of FIG. 22, for example, among the four action segments 412 to be combined, the operation content of the two action segments 412 is "work in Ohsaki", the operation content of the one action segment is "meal in Ohsaki", and the operation content of the other one action segment is "walked in Ohsaki". Therefore, the operation content of "work in Ohsaki" of the most action segments is decided as the operation content of the action segment 412d2 after the combination.

Alternatively, the operation content of the action segment after the combination may be decided, for example, by reanalyzing action segments to be combined. In the example of FIG. 22, for example, the operation content of the four action segments 412 to be combined includes "work in Ohsaki", "meal in Ohsaki", and "walked in Ohsaki". Accordingly, the meaning and content of user's actions are reanalyzed and, for example, the operation content of "was in Ohsaki" can be decided as the operation content of an action segment 412d3 after the combination.

Therefore, the action segments 412 can easily be combined by selecting the action segments to be combined.

[4-5. Dividing Action]

Also according to the present technology, for example, a plurality of the action segments 412 can be divided and displayed as a plurality of the action segments 412 as a correction of the relationship between the action segments 412. The division of the action segment 412 is a function to segment the one action segment 412 into a plurality of the action segments 412. As the division method of the action segment 412, for example, a method of setting the time to divide the action segment 412 and a division method using hierarchical information are known.

Figure 23:
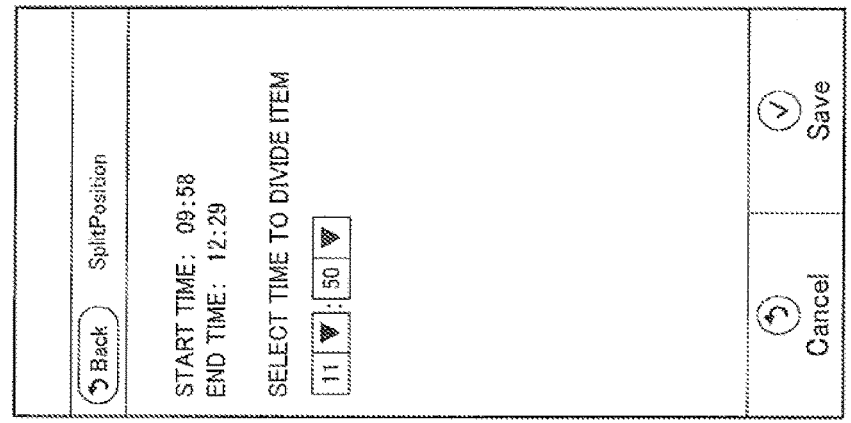
FIG. 23 is an explanatory view showing an example of a division method by time settings of the action segment.

For example, FIG. 23 shows an example of a division method by time settings of the action segment 412. First, if a division 433 is pressed while the action log 410 is displayed, a state (action division mode) in which the action segment 412 can be divided is entered. The selected action segment 412 can be divided at a specified time by selecting the action segment 412 to be divided in action division mode.

For example, it is assumed that an action segment 412e is selected for division in FIG. 23. Then, a division time setting screen to input the division time of the action segment 412e to be divided is displayed. In the division time setting screen, ant time between the start time and the end time of the action segment to be divided can be set. Then, pressing the save button 468a divides action segment 412 to be divided and displays the divided action segments 412. If, for example, the division time is set to 11:50, the action segment 412 is divided into a first action segment of "work in Ohsaki" between 9:58 and 11:50 and a second action segment of "work in Ohsaki" between 11:50 and 12:29. To cancel the division mode, the cancel button 467a may be pressed.

Figure 24:
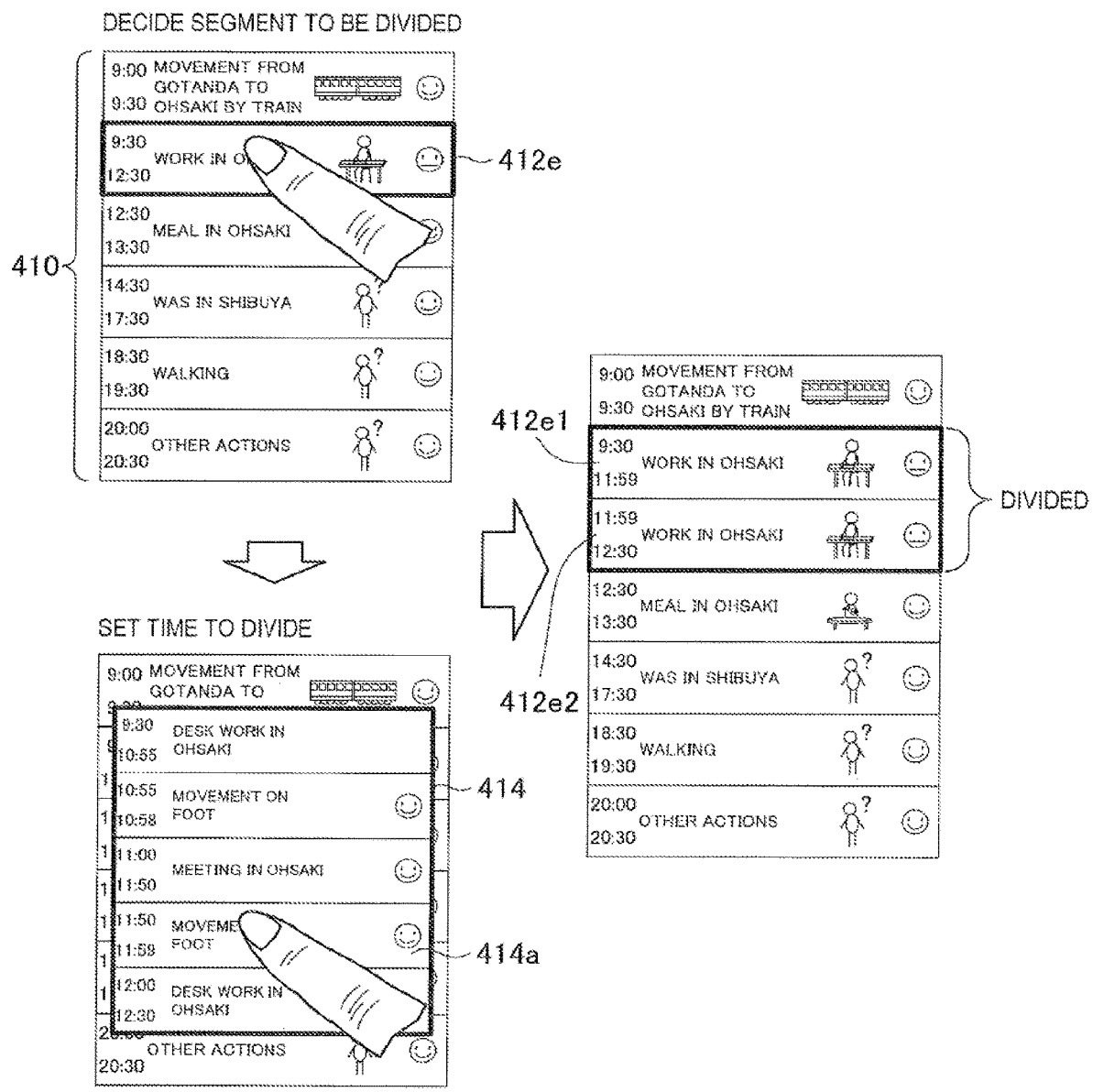
FIG. 24 is an explanatory view showing an example of the division method based on hierarchical information of the action segment.

Also, for example, FIG. 24 shows an example of a division method based on hierarchical information of the action segment 412. It is assumed that the action division mode is already set in FIG. 24. If the user selects the action segment 412e to be divided while the action log 410 is displayed, as shown in FIG. 24, a hierarchical list 414 representing the action segment 412e to be divided by more detailed action segments is displayed. When the hierarchical list 414 is displayed, the user selects the action segment to be the division point.

If, for example, an action segment 414a is selected in FIG. 24, for example, the end time of the action segment 414a is decided as the division time and, as shown on the right of FIG. 24, the action segment is divided into a first action segment 412e1 of "work in Ohsaki" between 9:30 and 11:59 and a second action segment 412e2 of "work in Ohsaki" between 11:59 and 12:30.

[4-6. Representation of Action Segment Based on Segmentation Grain Size]

In the present technology, the action segments 412 constituting the action log 410 hold a hierarchical relationship based on the meaning and content thereof as hierarchical information. The display roughness of the displayed action log 410 can be changed by changing the segmentation grain size using the hierarchical information. The display roughness can be changed by using, for example, a slider or a zoom button.

FIG. 25 shows a case when display roughness is changed by using a slider 471. A knob 472 to set the display roughness (grain size) is displayed in the slider 471 and the display roughness can be changed by changing the position of the knob 472. When, for example, as shown on the left of FIG. 25, the knob 472 is positioned on the side of small grain size of the slider 471, the action log 410 is displayed by the detailed action segments 412. As the knob 472 is moved toward the side of large grain size of the slider 471 from the above state, a plurality of the action segments 412 are displayed by being combined based on the segmentation grain size attached to the action segments 412 in advance.

FIG. 26 shows a case when the display roughness is changed by using a zoom button 473. A plurality of buttons 474 to set the display roughness (grain size) is displayed in a row in the zoom button 473. By checking one of the plurality of buttons 474, the action log 410 can be made to be displayed in the display roughness corresponding to the button 474. When, for example, as shown on the left of FIG. 26, the button 474 on the side of small grain size in the zoom button 473 is checked, the action log 410 is displayed by the detailed action segments 412. As the button 474 on the side of large grain size is checked from the above state, a plurality of the action segments 412 are displayed by being combined based on the segmentation grain size attached to the action segments 412 in advance.

Thus, the display roughness of the action log 410 can easily be changed based on the segmentation grain size attached to the action segment 412 so that the user can view the action log 410 in the desired display roughness.

The display roughness of the action log 410 is changed in FIGS. 25 and 26, but in the present technology, the display roughness of the action segment 412 can also be changed depending on the purpose. That is, the display roughness of the action segment 412 is changed independently of the type of action. Work, shopping, movement and the like can be considered as the types of action and, for example, by checking a button 476 of the corresponding action from an action type selection list 475 as shown in FIG. 27, the display roughness of only the action can be changed.

Figure 27:
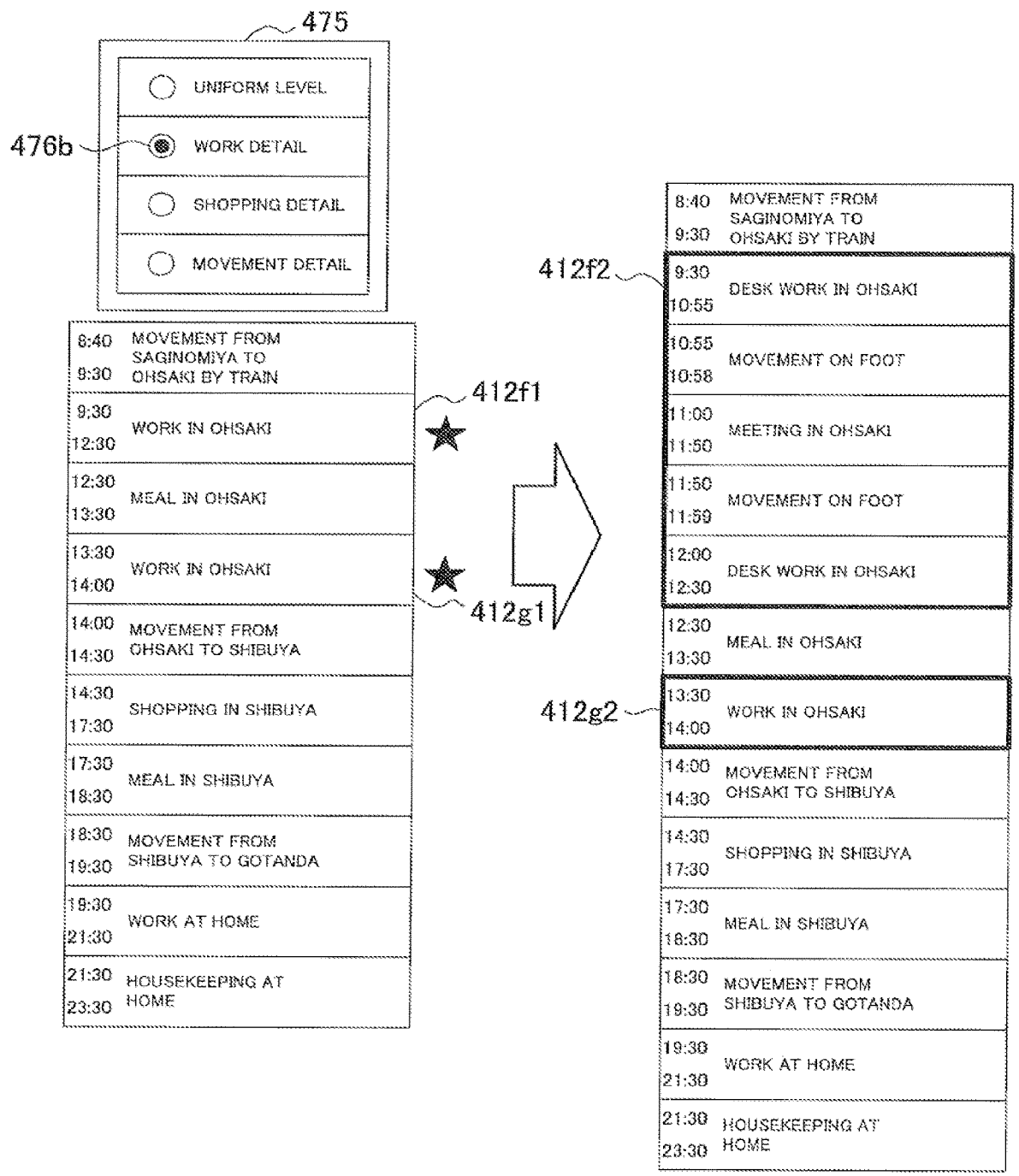
FIG. 27 is an explanatory view showing a display change of the action segment when a button of "work details" is checked in an action type selection list.

When, for example, as shown in FIG. 27, a button 476b of "work detail" is checked in the action type selection list 475, action segments 412f1, 412g1 related to work are displayed in detail. For example, the operation content of "work in Ohsaki" for the action segment 412f1 is displayed by five action segments 412*f*2 of "desk work in Ohsaki", "movement on foot", "meeting in Ohsaki", "movement on foot", and "desk work in Ohsaki". Incidentally, the operation content of the action segment 412*g*1 is the most detailed and thus, the same content is displayed after the display roughness is changed (action segment 412*g*2).

Figure 28:
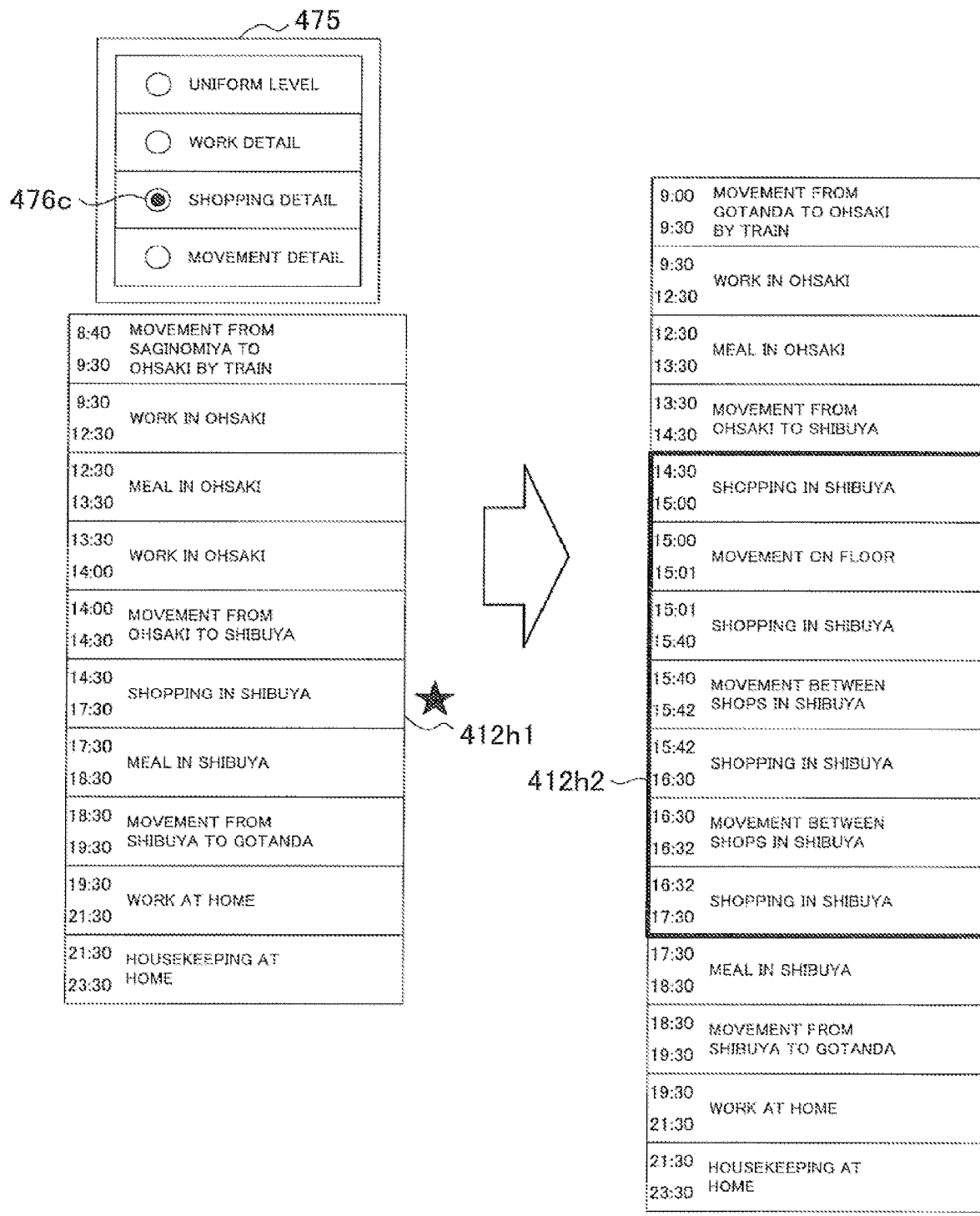
FIG. 28 is an explanatory view showing a display change of the action segment when a button of "shopping details" is checked in the action type selection list.

When, for example, as shown in FIG. 28, a button 476*c* of "shopping detail" is checked in the action type selection list 475, an action segment 412*h*1 related to shopping is displayed in detail. For example, the operation content of "shopping in Shibuya" for the action segment 412*h*1 is displayed by seven action segments 412*h*2 of "shopping in Shibuya", "movement on floor", "shopping in Shibuya", "movement between shops in Shibuya", "shopping in Shibuya", "moving between shops in Shibuya", and "shopping in Shibuya".

Figure 29:
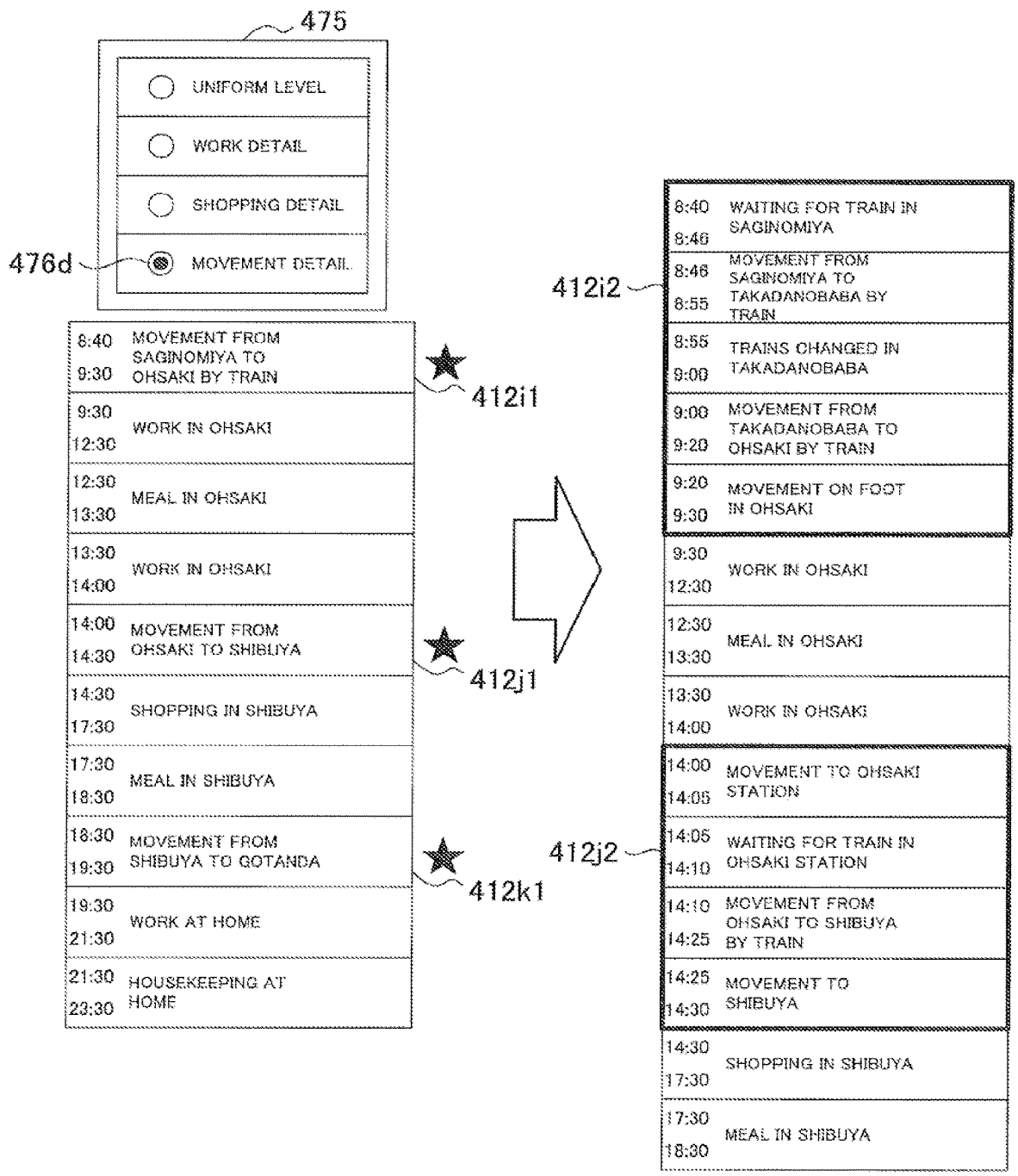
FIG. 29 is an explanatory view showing a display change of the action segment when a button of "movement details" is checked in the action type selection list.

Further, when, for example, as shown in FIG. 29, a button 476*d* of "movement detail" is checked in the action type selection list 475, action segments 412*i*1, 412*j*1, 412*k*1 related to movement are displayed in detail. For example, the operation content of "movement from Saginomiya to Ohsaki by train" for the action segment 412*i*1 is displayed by five action segments 412*i*2 of "waiting for train in Saginomiya", "movement from Saginomiya to Takadanobaba by train", "trains changed in Takadanobaba", "movement from Takadanobaba to Ohsaki by train", and "movement in Ohsaki on foot". Similarly, the operation content of "moving from Ohsaki to Shibuya by train" for the action segment 412*j*1 is displayed by four action segments 412*j*2 of "movement to Ohsaki station", "waiting for train in Ohsaki station", "movement from Ohsaki to Shibuya by train", and "movement to Shibuya". For the action segment 412*k*1, similarly detailed content is displayed.

Figure 30:
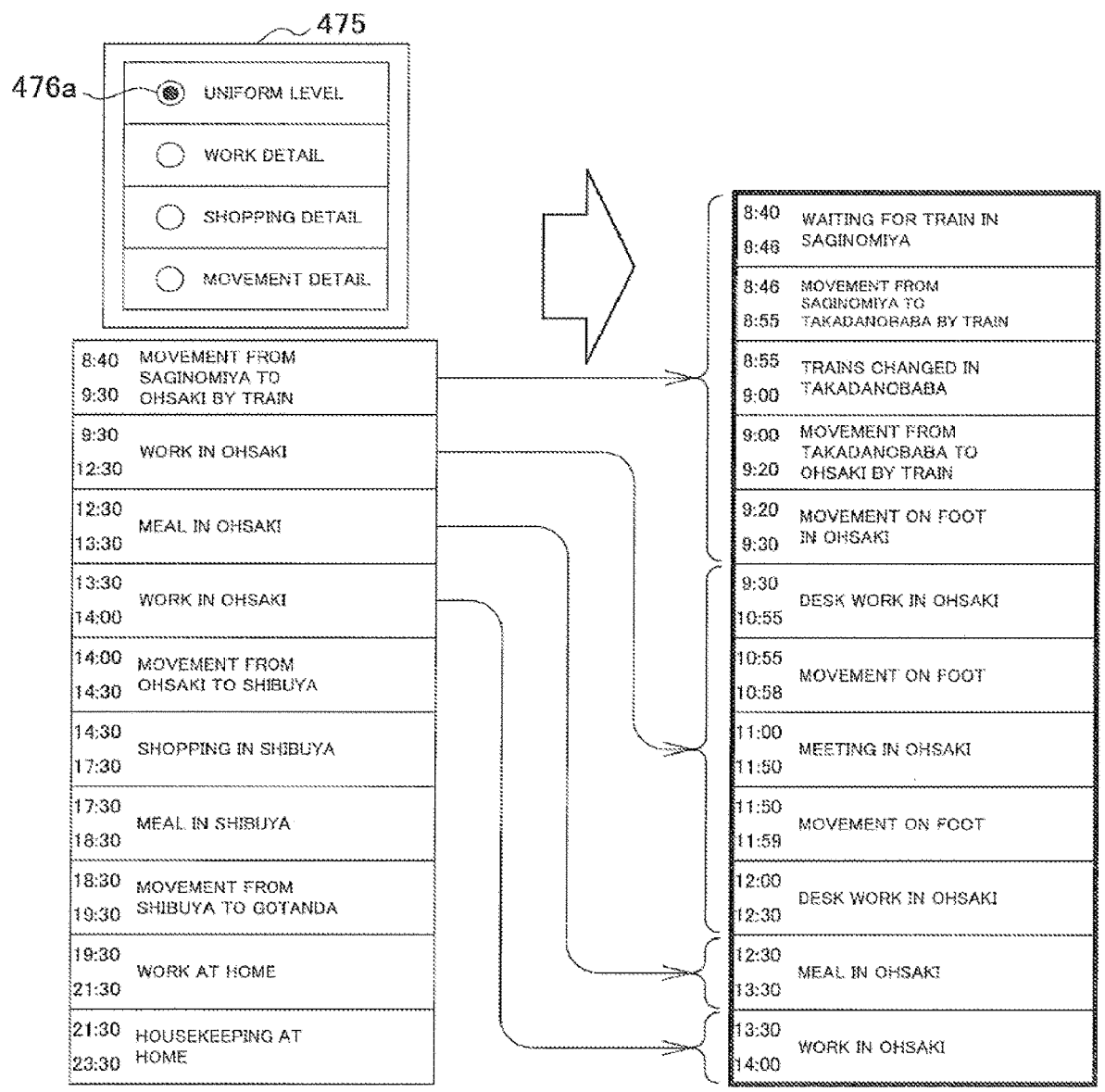
FIG. 30 is an explanatory view showing a display change of the action segment when a button of "uniform details" is checked in the action type selection list.

When the action segments 412 should be displayed in the same display grain size regardless of the action, for example, as shown in FIG. 30, a button 476*a* of "uniform detail" may be checked in the action type selection list 475. Accordingly, all the action segments 412 of the action log 410 are displayed in detail in the same grain size.

Thus, because the display roughness of the action segments 412 can be changed independently in accordance with the type of action, only the action the user wants to check in detail can be displayed in detail.

Figure 31:
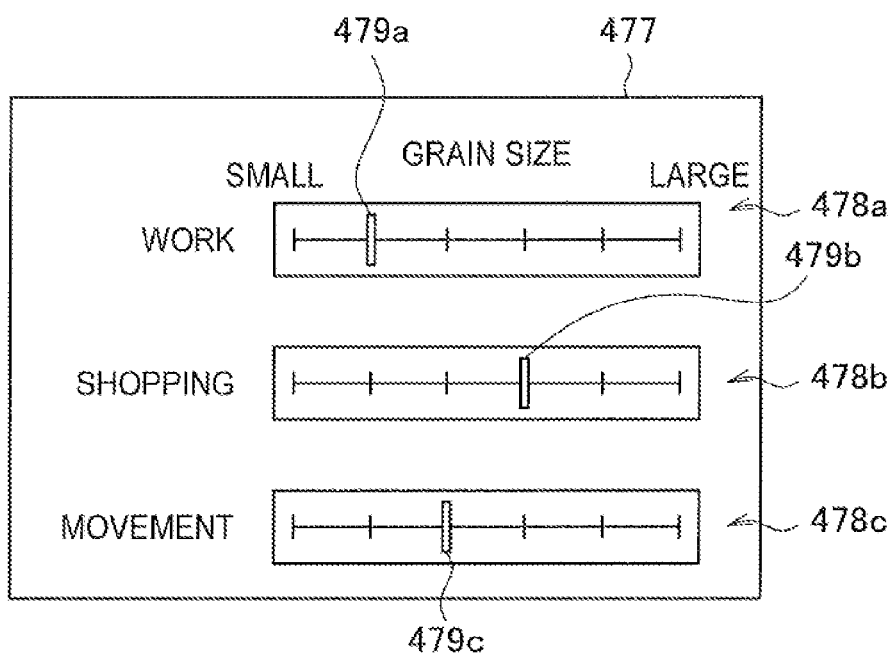
FIG. 31 is an explanatory view showing a positional configuration example of a display grain size setting unit provided with a slider that sets the display roughness of the action segment for each type of action.

Incidentally, the method of changing the display roughness shown in FIGS. 25 and 26 and the method of changing the display roughness in accordance with the type of action shown in FIGS. 27 to 30 may be combined. For example, as shown in FIG. 31, a slider may be provided for each type of action so that the display roughness of each type of action can be adjusted. FIG. 31 is shows a display grain size setting unit 477 provided with a slider 478*a* to set the display roughness of an action segment related to "work", a slider 478*b* to set the display roughness of an action segment related to "shopping", and a slider 478*c* to set the display roughness of an action segment related to "movement". By moving respective knobs 479*a*, 479*b*, 479*c* of the sliders 478*a*, 478*b*, 478*c* of the display grain size setting unit 477, the display roughness can be adjusted for each type of action.

[4-7. Deleting Action]

Figure 32:
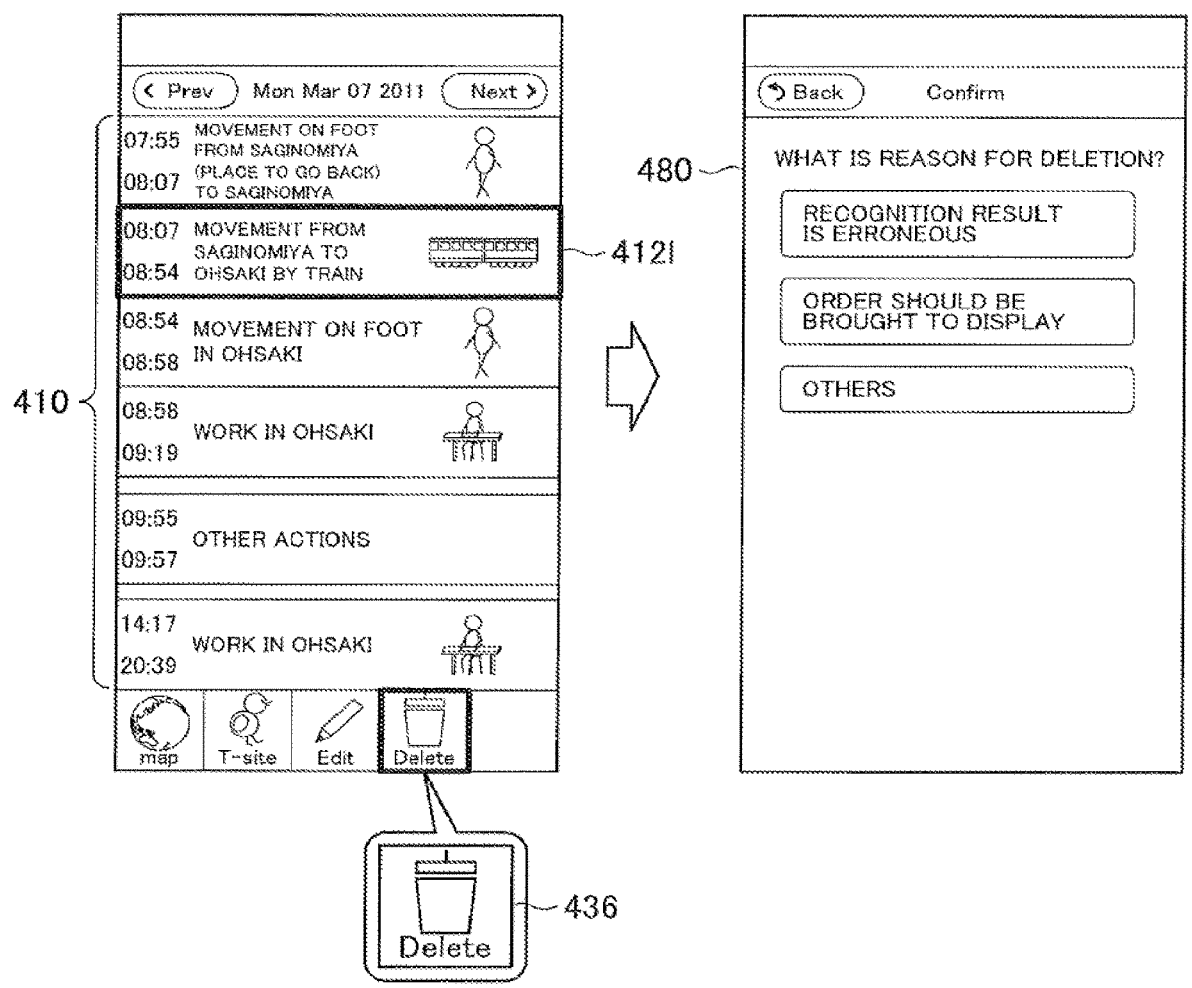
FIG. 32 is an explanatory view showing a method of deleting an action segment from the action log.

According to the present technology, the action segment 412 can be deleted from the action log 410. If, for example, as shown in FIG. 32, an action segment 412*l* to be deleted is selected and a deletion button 436 is pressed while the action log 410 is displayed, as shown on the right of FIG. 32, a deletion confirmation screen 480 is displayed. In the deletion confirmation screen 480, the user can be caused to enter the reason for deleting the action segment 412*l* to be deleted. When the user presses a button on which the reason for deletion is written, the action segment 412*l* to be deleted is deleted from the action log 410. Depending on the reason selected by the user, the deletion of the action segment may be fed back as an action correction.

[4-8. Posting Action]

Figure 33:
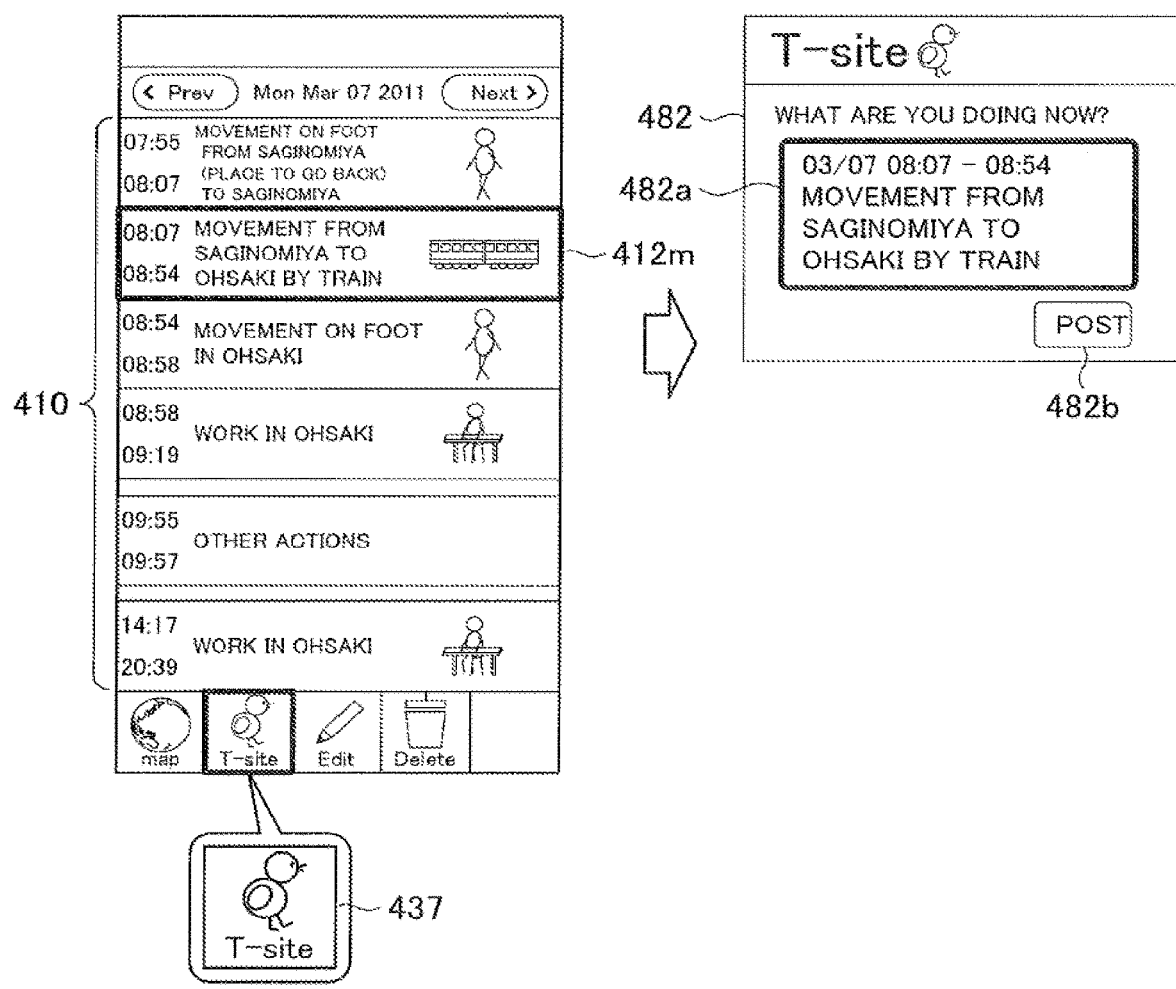
FIG. 33 is an explanatory view showing a method of posting content of the action segment of the action log to a posting site.

According to the present technology, content of the action segment 412 of the action log 410 can be posted. If, for example, as shown in FIG. 33, an action segment 412*m* to be posted is selected and a post button 437 is pressed while the action log 410 is displayed, as shown on the right of FIG. 33, a posting screen 482 is displayed. In the posting screen 482, the operation content of the action segment 412*m* to be posted is automatically pasted to a posting content input area 482*a*. When the user presses a posting button 482*b*, the description content in the posting content input area 482*a* is posted to a posting site.

[4-9. Action Log Acquisition Stop Processing]

Figure 34:
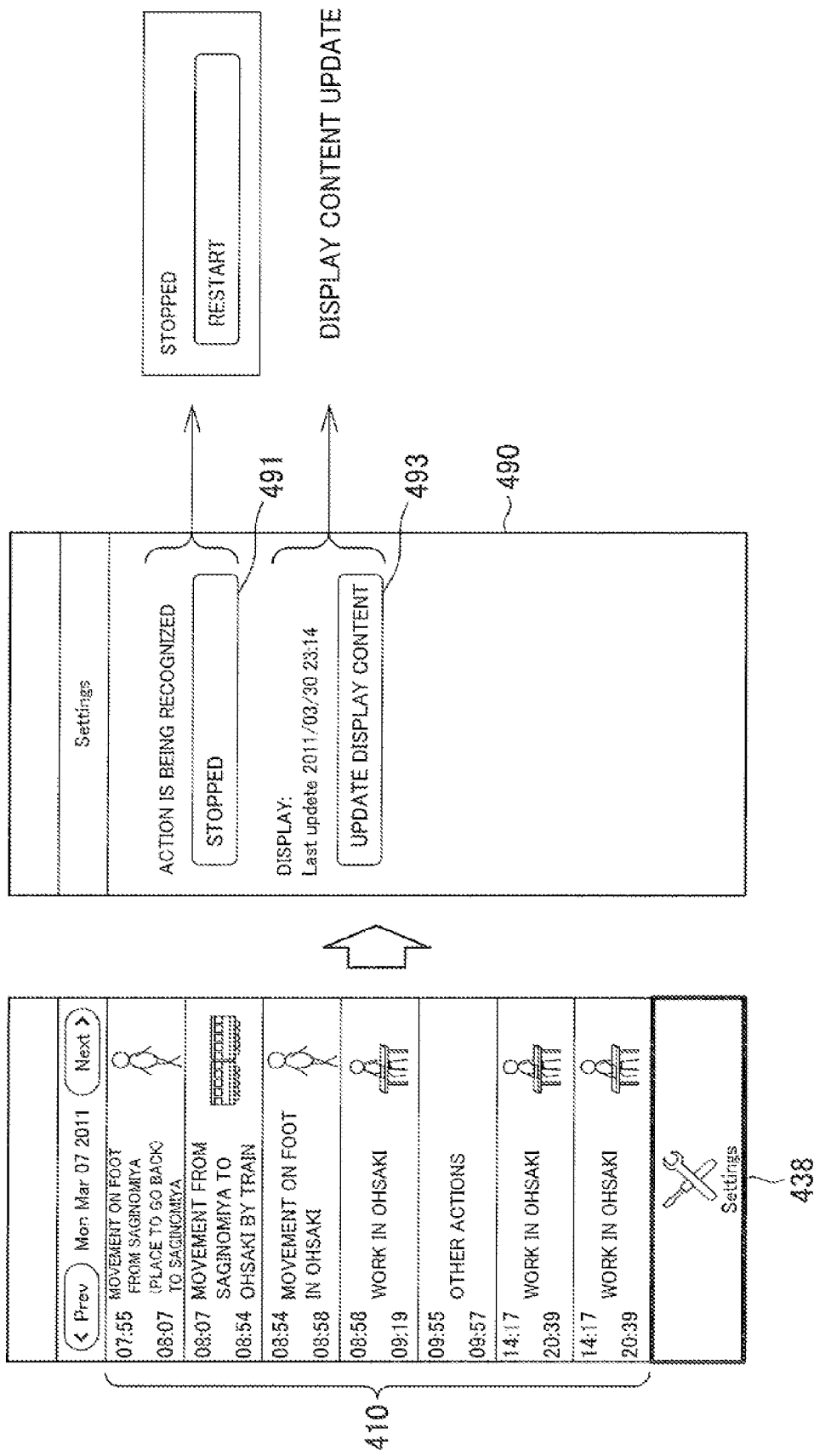
FIG. 34 is an explanatory view showing a positional configuration example of a setting screen to make various settings about the action log display application.

According to the present technology, when the acquisition of an action log should be stopped for some reason, for example, as shown in FIG. 34, a settings screen 490 is made to display by pressing a settings button 438. In the settings screen 490, various settings about the action log display application can be made. When, for example, the acquisition of the action log 410 should be stopped, "stop" of an acquisition function setting unit 491 that sets the operation of the action log acquisition function is selected. Accordingly, the action log display application stops the action log acquisition function. To restart the stopped action log acquisition function, "restart" of the acquisition function setting unit 491 may be selected.

[4-10. Updating Display Content]

The action log display application in the present technology automatically uploads operation action data acquired by the action recording device 100 to the action log server 200 in predetermined timing (for example, twice per day). Also, the analysis server 300 automatically generates an action segment in predetermined timing (for example, twice per day). While an action log is displayed based on generated action segments, an action log displayed in accordance with the system function or circumstances may not correspond to the latest results. Thus, by pressing an update button 493 that updates the action log displayed in the settings screen 490 of FIG. 34 to the latest results, the action log can be updated to the latest results. When a transition to the action log display screen occurs after the update button 493 being pressed, the display unit 150 can be caused to display the latest results.

<5. Reflection Processing of Correction Feedback>

In an action log display system in the present technology, the meaning and content of an action is analyzed by the analysis server 300 and an action log is displayed by action segments. However, as described above, content of the displayed action log may not all correct. Thus, according to the present technology, the user can make corrections to correct content by using the action log display application. In the present technology, correction feedback of the user is reflected in the next analysis processing by the analysis server 300 and used to improve the precision of the next and subsequent analysis results. The reflection processing of correction feedback will be described below based on FIGS. 35 to 42.

[5-1. Properties of Correction Feedback]

In the present technology, the precision of analysis results is improved by reflecting correction feedback of the user in analysis processing, but the user may not correct all errors of analysis results by the analysis server 300. That is, content of an action log that is not corrected may not necessarily be correct. Thus, in the present technology, it is necessary to assume a system capable of collecting substantially biased information only. In addition, analysis results before corrections by the user do not necessarily match the latest analysis results. Thus, by reflecting information showing which action segment is corrected in what way in analysis processing for each user, the action specific to each user can be learned, which is considered to effectively work to improve the precision of analysis results.

[5-2. Action Recognition Processing]

In consideration of the above points, according to the present embodiment, an action pattern is decided based on characteristic amount analysis results in recognition processing of an operation action and acquires a plurality of probability distributions corresponding to the action pattern, time, and position information (location). In this case, a weight of a histogram is assigned and an operation action is recognized based on results of assigning weights depending on the location. If position information cannot be acquired or there is no need to acquire position information, uniform weights may be assigned or specific weights like "no location can be acquired" or "there is no need for location" may be assigned.

Figure 35:
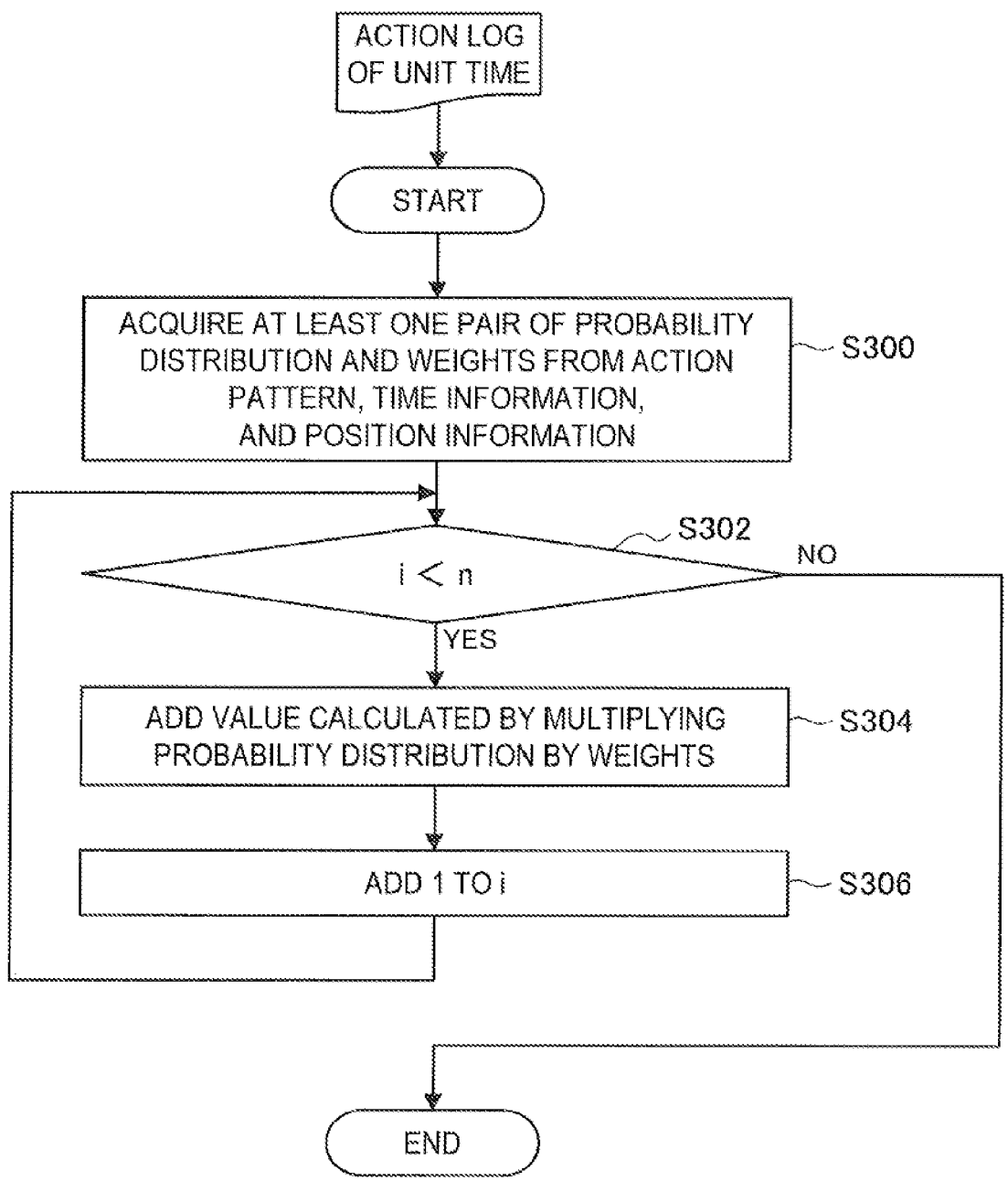
FIG. 35 is a flow chart showing an example of action recognition processing by the living action recognition unit.

FIG. 35 shows an example of action recognition processing by the living action recognition unit 321. FIG. 36 shows operation action estimation information that decides an operation action. The operation action estimation information is, for example, information showing the relation between a weighting factor depending on the location and the probability distribution of each action and, as shown in FIG. 36, a plurality (four in FIG. 36) of probability distributions of actions of, for example, "shopping", "work", "meal", and "others" is acquired. Then, the weighting factor depending on the location is set to each probability distribution. The operation action estimation information is preset and recorded in, for example, the analysis parameter DB 333.

After an action log in the unit time is acquired, the living action recognition unit 321 starts processing to recognize the action of the action log. First, as shown in FIG. 35, at least one pair of the probability distribution and the weighting factor depending on the location is acquired based on the action pattern, time information, and position information (S300).

Next, in steps S302 to S306, the living action recognition unit 321 performs processing to decide operation content of the action log in the unit time. First, it is assumed that the number of pairs of the probability distribution and the weighting factor acquired in step S300 is n and the parameter representing the processing number is i (i=0 to n) (S302). Then, the living action recognition unit 321 multiplies the probability distribution by the weighting factor of each action for the first (i=0) pair of the probability distribution and the weighting factor (S304). If, for example, in FIG. 36, the first pair is the pair of the probability distribution and the weighting factor in the first row, the probability of 50 is multiplied by the weighting factor of 1 for "shopping" and the probability of 10 is multiplied by the weighting factor of 1 for "work". Then, the probability of 10 is multiplied by the weighting factor of 1 for "meal" and the probability of 30 is multiplied by the weighting factor of 1 for "others". Accordingly, the integrated values ("shopping": 50, "work": 10, "meal": 10, "others": 30) of actions are acquired.

When the processing in step S304 is completed, the living action recognition unit 321 adds 1 to the parameter i (S306) and repeats the processing in step S302 and thereafter. In the example of FIG. 36, the living action recognition unit 321 multiplies the probability distribution by the weighting factor of each action for the next (i=1) pair of the probability distribution and the weighting factor, that is the pair of the probability distribution and the weighting factor in the second row (S304). For the pair in the second row, first the probability of 10 is multiplied by the weighting factor of 6 for "shopping" and the probability of 50 is multiplied by the weighting factor of 6 for "work". Then, the probability of 10 is multiplied by the weighting factor of 6 for "meal" and the probability of 30 is multiplied by the weighting factor of 6 for "others". Accordingly, the integrated values ("shopping": 60, "work": 300, "meal": 60, "others": 180) of actions are acquired.

Then, the living action recognition unit 321 adds the integrated value in the second row to the integrated value in the first row for each action. This results in integrated values of "shopping": 110, "work": 310, "meal": 70, "others": 210. Similarly, integrated values are calculated for the pairs of the probability distribution and the weighting factor in the third and fourth rows and these integrated values are added to the above integrated values of each action to finally obtain added values of "shopping": 260, "work": 460, "meal": 420, "others": 460.

The living action recognition unit 321 decides the action of the maximum final added value as the operation content of the action log. In the example of FIG. 36, both "work" and "others" have the maximum added value of 460, but in this case, the operation content is decided by giving priority to actions other than "others". Therefore, in the example of FIG. 36, "work" is recognized as the operation content.

[5-3. Reflection Processing of Correction Feedback]

(5-3-1. Overview of Reflection Processing of Correction Feedback)

As described based on FIGS. 35 and 36, recognition processing results of operation content changes considerably depending on operation action estimation information showing the relation between the weighting factor depending on the location and the probability distribution. Thus, the action log is corrected by the user, correction content is reflected in operation action estimation information recorded in the analysis parameter DB 333 by the feedback adjustment unit 332 of the analysis server 300. Accordingly, the precision of recognition processing of operation content can be enhanced.

An overview of reflection processing of correction feedback will be provided based on FIG. 37. It is assumed that the relation between the weighting factor depending on the location and the probability distribution of each action shown in FIG. 36 is held as operation action estimation information before correction. As a result of generating an action segment from operation action data based on such operation action estimation information, the user is assumed to input correction information (correction feedback) of the action segment from the input unit 160. The correction feedback is converted into data in a format that can be transmitted to the analysis server 300 by the input information processing unit 144 before being transmitted to the analysis server 300 via the client interface unit 130.

The analysis server 300 having received the correction feedback from the action recording device 100 through the analysis server interface unit 310 reflects content of the correction feedback in the operation action estimation information through the feedback adjustment unit 332. At this point, the feedback adjustment unit 332 corrects the probability distribution of the operation action estimation information if the content of the correction feedback concerns an action and corrects the weighting factor depending on the location if the content of the correction feedback concerns position information (location).

It is assumed that, for example, as shown in FIG. 37, the operation content of "work" is acquired as an analysis result, but correction feedback to change the operation content to "shopping" by the user is received. In this case, the feedback adjustment unit 332 corrects, among a plurality of probability distributions, the probability distribution having the maximum probability of "work". For example, the feedback adjustment unit 332 makes a correction to set the probability of "work" as an analysis result and the probability of "shopping" as a correction result to the average value of these two probabilities for the probability distribution in the second row with the maximum probability of "work".

It is assumed, on the other hand, that an analysis result of "location to work" is acquired, but correction feedback to change the location description to "location to do shopping frequently" by the user is received. In this case, the feedback adjustment unit 332 corrects, among a plurality of probability distributions, the weighting factor of the probability distribution having the maximum probability of "shopping". For example, the feedback adjustment unit 332 makes a correction of increasing the weighting factor in the first row with the maximum probability of "shopping" by a factor of a predetermined number (for example, 10).

By correcting the operation action estimation information in this manner, correction feedback is reflected in analysis results of action segments so that the precision of analysis results of the operation content can be expected. The reflection processing of correction feedback will be described in more detail below based on FIGS. 38 to 42.

(5-3-2. Reflection Processing of Correction Feedback of an Action)

Figure 38:
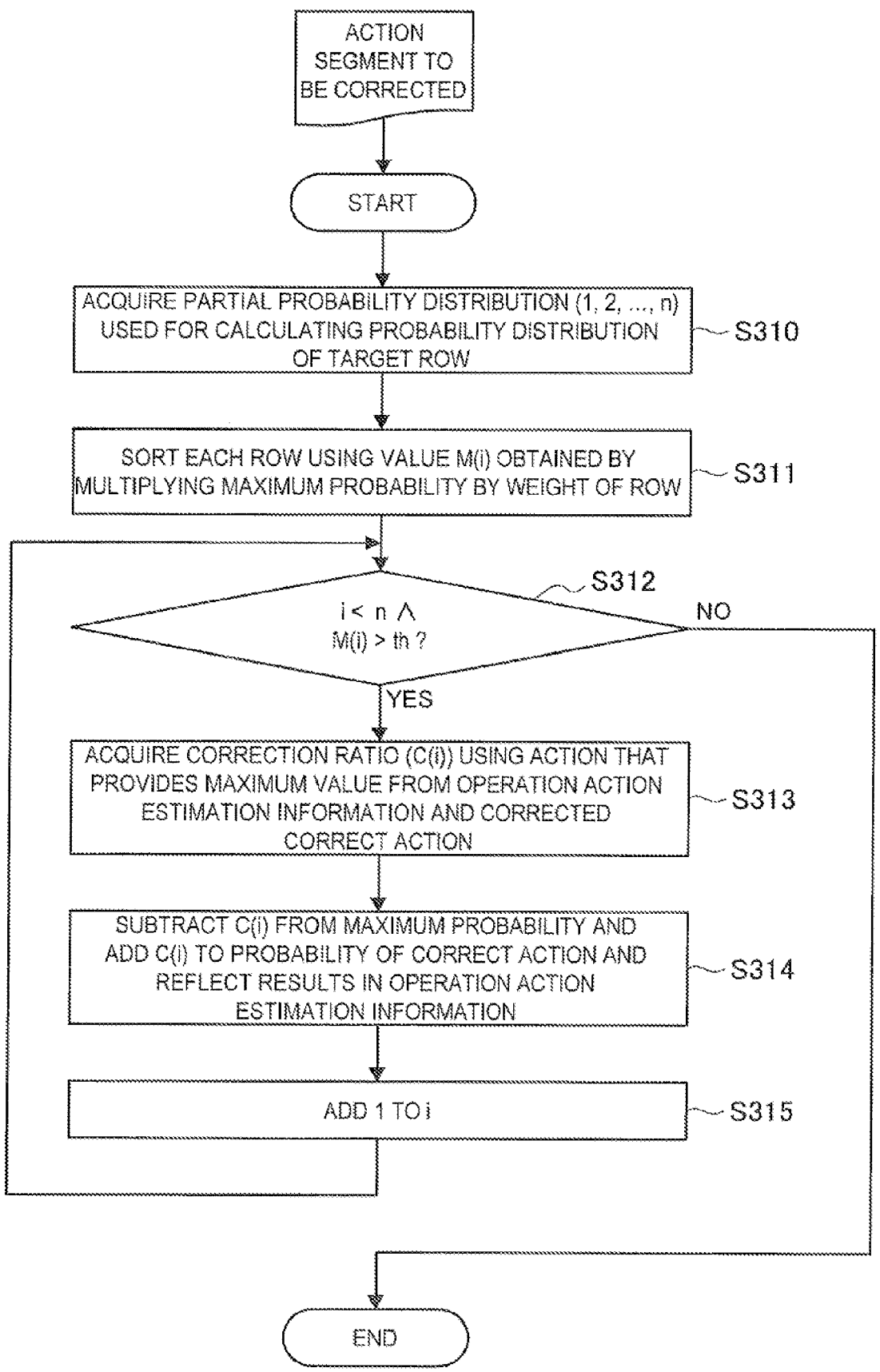
FIG. 38 is a flow chart showing the reflection processing of correction feedback of an action.
Figure 40:
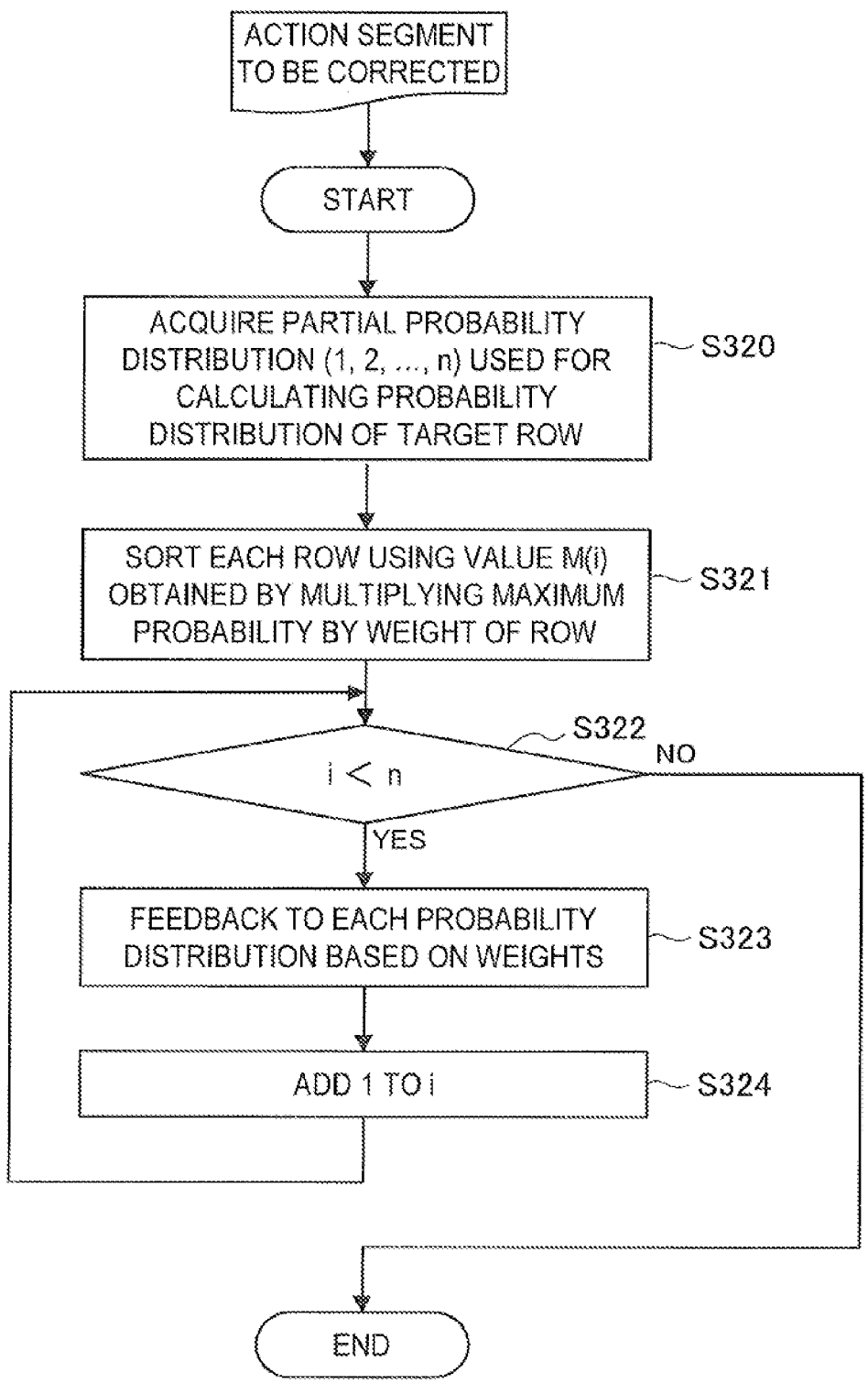
FIG. 40 is a flow chart showing other reflection processing of correction feedback of the action.

First, the reflection processing of correction feedback of an action will be described based on FIGS. 38 to 40. FIG. 38 is a flow chart showing the reflection processing of correction feedback of an action. FIG. 39 is an explanatory view illustrating corrections of the operation action estimation information based on the processing in FIG. 38. FIG. 40 is a flow chart showing other reflection processing of correction feedback of the action. "001", "002", and "003" shown in the top row of each column in FIG. 39 are IDs representing respective actions. It is assumed in the description below that the analysis result by the living action recognition unit 321 is "action 002" and the correct action by user's correction feedback is "action 003".

When correction feedback is received from the action recording device 100, the feedback adjustment unit 332 first recognizes correction content. It is assumed here that operation content of an action segment is corrected. The feedback adjustment unit 332 acquires the action segment to be corrected from the unit data storage DB 334 or the hierarchical information attached data storage DB 335 and starts processing shown in FIG. 38.

The feedback adjustment unit 332 first acquires the probability distribution (partial probability distribution) used to recognize the operation content of the action segment to be corrected from operation action estimation information stored in the analysis parameter DB 333 (S310). Next, the feedback adjustment unit 332 calculates a value M(i) obtained by multiplying the maximum probability of each probability distribution by the weighting factor of the row for the partial probability distribution and sorts these probability distributions (S311).

The parameter indicating the order of sorted probability distributions is set as i (i=0 to n) and the number of probability distributions constituting the partial probability distribution is set as n. Then, the feedback adjustment unit 332 determines whether the parameter i is smaller than n and the multiplied value M(i) is larger than a predetermined threshold th (S312). If the conditions in step S312 are not satisfied, the processing shown in FIG. 38 is terminated. If, for example, the operation action estimation information on the left of FIG. 39 is provided, only probability distributions of the fourth to sixth rows are corrected. On the other hand, if the conditions in step S312 are satisfied, the feedback adjustment unit 332 acquires a correction ratio C(i) from a loss ratio calculation function using an action having the maximum value of probability distribution of each action of target rows from operation action estimation information and the correct action obtained from correction feedback (S313).

The loss ratio calculation function is assumed to be a single comprehensive measure representing losses caused when some available decision is made. In the present embodiment, the loss ratio calculation function is used to set, for example, a correction ratio table representing a correction ratio C between the action of analysis results and the correct action as shown in the lower portion of FIG. 39. The correction ratio table can be preset and can be stored in the analysis parameter DB 333. The feedback adjustment unit 332 acquires the correction ratio C(i) between the action having the maximum value of probability distribution and the correct action "action 003" from the correction ratio table. If, for example, the processing in step S313 is performed for the probability distribution in the fourth row of the operation action estimation information on the left of FIG. 39 is performed, the correction ratio C(0)=0 between "action 003" having the maximum value of probability distribution and the correct action "action 003" is obtained.

Then, the feedback adjustment unit 332 subtracts the correction ratio C(i) acquired in step S313 from the value of the probability distribution of the action of the maximum value of probability distribution, adds the correction ratio C(i) to the value of the probability distribution of the correct action, and reflects these corrections in the operation action estimation information (S314). If, for example, the processing in step S314 is performed for the probability distribution in the fourth row of the operation action estimation information on the left of FIG. 39 is performed, the probability distribution of the row is not changed because the correction ratio C(0)=0. Then, the feedback adjustment unit 332 adds 1 to the parameter i (S315) and repeats the processing in step S312 and thereafter.

If, for example, the processing in step S313 is performed for the probability distribution in the fifth row of the operation action estimation information on the left of FIG. 39 is performed, the correction ratio C(1)=5 between "action 002" having the maximum value of probability distribution and the correct action "action 003" is obtained. Then, if the processing in step S314 is performed, the value of the probability distribution of "action 002" is corrected from 50 to 45 and the value of the probability distribution of "action 003" is corrected from 10 to 15 based on the correction ratio C(1)=5.

Similarly, if the processing in step S313 is performed for the probability distribution in the sixth row of the operation action estimation information on the left of FIG. 39 is performed, the correction ratio C(1)=10 between "action 001" having the maximum value of probability distribution and the correct action "action 003" is obtained. Then, if the processing in step S314 is performed, the value of the probability distribution of "action 001" is corrected from 40 to 30 and the value of the probability distribution of "action 003" is corrected from 10 to 20 based on the correction ratio C(1)=10. By performing the above processing, the operation action estimation information after the correction feedback being reflected as shown on the right of FIG. 39 can be obtained.

In this manner, the operation content of correction feedback is reflected in the operation action estimation information. The reflection processing shown in FIG. 38 is effective in being able to control the reflection speed or divergence. That is, a more impermissible error can be reflected earlier and a value can be made to converge if the value is handled as a ratio to the maximum value. In the reflection processing shown in FIG. 38, the correction ratio C(i) is added to or subtracted from the value of the probability distribution, but the present technology is not limited to such an example and, for example, correction feedback may be reflected in operation action estimation information by multiplying the value of the probability distribution by the correction ratio.

In the reflection processing of correction feedback shown in FIG. 38, content of the correction feedback is reflected in operation action estimation information by using a correction ratio table, but the present technology is not limited to such an example. For example, as shown in FIG. 40, a feedback system using a neural network technique may be configured. It is assumed that operation content of an action segment is corrected also in FIG. 40.

The feedback adjustment unit 332 first acquires the probability distribution (partial probability distribution) used to recognize the operation content of the action segment to be corrected from operation action estimation information stored in the analysis parameter DB 333 (S320). Next, the feedback adjustment unit 332 calculates a value M(i) obtained by multiplying the maximum probability of each probability distribution by the weighting factor of the row for the partial probability distribution and sorts these probability distributions (S321). The processing in steps S320, S321 can be made the same as the processing in steps S310, S311 in FIG. 38.

If the parameter showing the order of sorted probability distributions is set as i(i=0 to n), the feedback adjustment unit 332 determines whether the parameter i is smaller than n (S322). If the condition in step S322 is not satisfied, the processing shown in FIG. 40 is terminated. On the other hand, if the condition in step S322 is satisfied, the feedback adjustment unit 332 uses the neural network technique to reflect correction content of correction feedback in each probability distribution of operation action estimation information based on the weighting factor (S323). Then, the feedback adjustment unit 332 adds 1 to the parameter i (S324) and repeats the processing in step S322 and thereafter.

Thus, by using, instead of the correction ratio table, learning processing such as the neural network technique, content of correction feedback can be reflected in each value of operation action estimation information without the need to set the correction ratio table in advance.

(5-3-3. Reflection Processing of Correction Feedback of an Action and Position Information)

Figure 41:
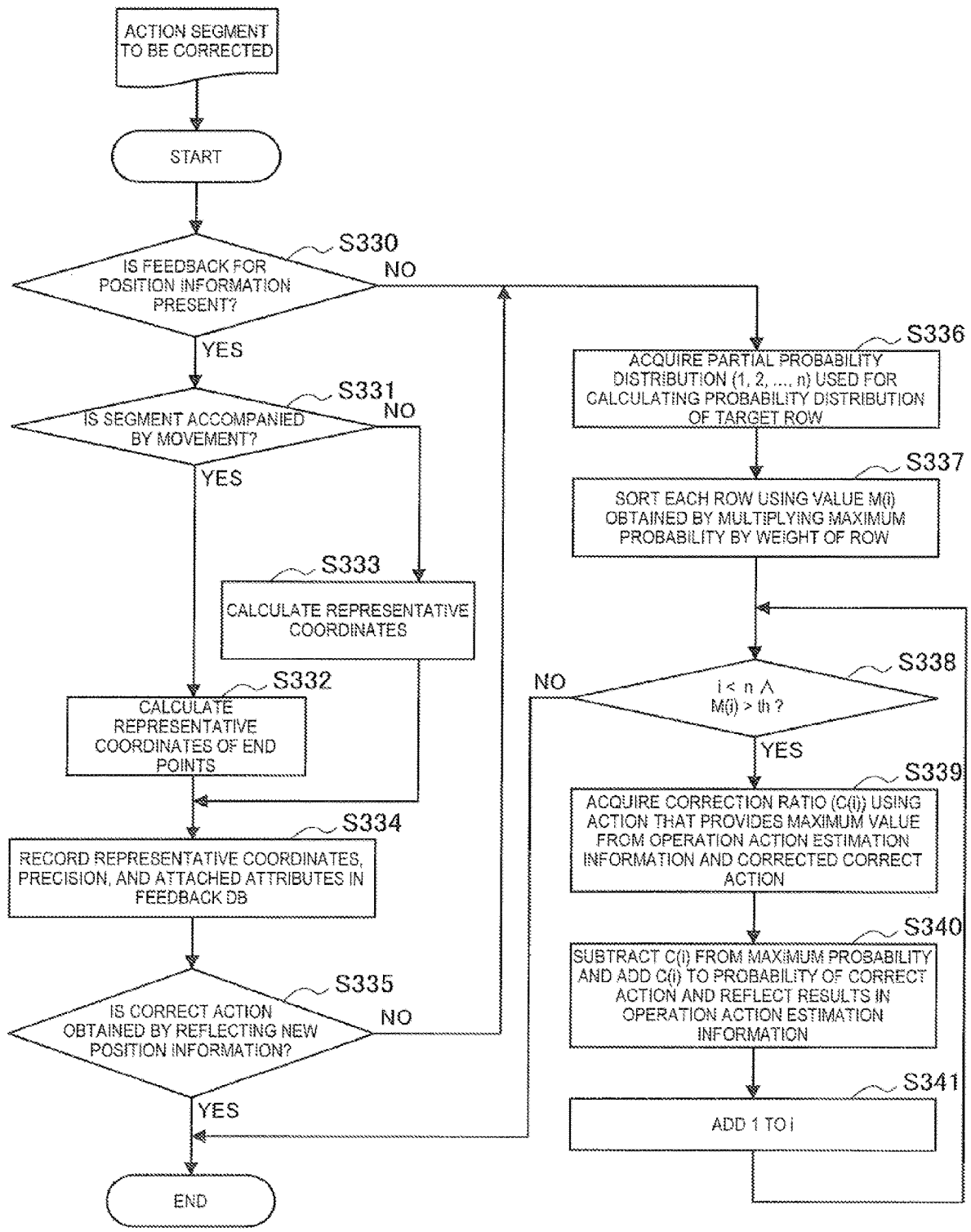
FIG. 41 is a flow chart showing the reflection processing of correction feedback of the action and position information.

Next, the reflection processing of correction feedback of an action and position information will be described based on FIG. 41. FIG. 41 is a flow chart showing the reflection processing of correction feedback of the action and position information.

The feedback adjustment unit 332 acquires the action segment to be corrected from the unit data storage DB 334 or the hierarchical information attached data storage DB 335 and starts processing shown in FIG. 41. The feedback adjustment unit 332 first determines whether correction feedback contains position information (S330). If the correction feedback contains position information in step S330, processing in step S331 and thereafter is performed to reflect corrected position information in operation action estimation information.

In step S331, whether any correction related to position information is made on action segments accompanied by movement is determined. If a correction related to position information is made on action segments accompanied by movement, representative coordinates of end points (two representative coordinates like position X to position Y) are calculated (S332). On the other hand, if no correction related to position information is made on action segments accompanied by movement, representative coordinates of the movement are calculated (S333). Incidentally, representative coordinates can be calculated by using the center, center of gravity, most frequent point and the like.

Next, the feedback adjustment unit 332 records representative coordinates calculated in step S332 or S333, the precision, and attached attributes in a feedback DB (not shown) (S334). The feedback DB is a storage unit provided in the analysis server 300. Then, the feedback adjustment unit 332 analyses operation content using new position information recorded in the feedback DV in step S334 and determines whether the analysis result matches the correct action input by the correction feedback (S335). If it is determined in step S335 that the operation content analyzed by using new position information matches the correct action, a judgment can be made that correction feedback about position information is correctly reflected and also there is no error in the action content. Therefore, the feedback adjustment unit 332 judges that the reflection processing of correction feedback is completed and terminates the processing in FIG. 41.

On the other hand, if it is determined in step S335 that the operation content analyzed by using new position information does not match the correct action, a judgment can be made that with corrections of position information alone, correction feedback is not correctly determined. In this case, processing in steps S336 to S341 is performed to reflect operation content of the correction feedback in operation action estimation information. The processing in steps S336 to S341 can be made the same as the processing in FIG. 38.

That is, the feedback adjustment unit 332 first acquires the probability distribution (partial probability distribution) used to recognize the operation content of the action segment to be corrected from operation action estimation information stored in the analysis parameter DB 333 (S336). Next, the feedback adjustment unit 332 calculates a value M(i) obtained by multiplying the maximum probability of each probability distribution by the weighting factor of the row for the partial probability distribution and sorts these probability distributions (S337).

The parameter indicating the order of sorted probability distributions is set as i (i=0 to n) and the number of probability distributions constituting the partial probability distribution is set as n. Then, the feedback adjustment unit 332 determines whether the parameter i is smaller than n and the multiplied value M(i) is larger than a predetermined threshold th (S338). If the conditions in step S338 are not satisfied, the processing shown in FIG. 41 is terminated. On the other hand, if the conditions in step S338 are satisfied, the feedback adjustment unit 332 acquires a correction ratio C(i) from a loss ratio calculation function using an action having the maximum value of probability distribution of each action of target rows from operation action estimation information and the correct action obtained from correction feedback (S339).

Then, the feedback adjustment unit 332 subtracts the correction ratio C(i) acquired in step S339 from the value of the probability distribution of the action of the maximum value of probability distribution, adds the correction ratio C(i) to the value of the probability distribution of the correct action, and reflects these corrections in the operation action estimation information (S340). Then, the feedback adjustment unit 332 adds 1 to the parameter i (S341) and repeats the processing in step S338 and thereafter. By performing the above processing, the operation action estimation information after the correction feedback being reflected can be obtained.

Incidentally, instead of the processing in steps S336 to S341, the processing shown in FIG. 40 may be performed. Also in this case, the operation action estimation information after the correction feedback being reflected can similarly be obtained.

The correction feedback of position information may be reflected by, as shown on the lower left of FIG. 37, changing the weighting factor of the probability distribution of operation action estimation information. Alternatively, a corrected attribute dependence section, a specified attribute dependence section, and an ID dependence section may be set to reflect the correction feedback of position information in each weighting factor. For example, the specified attribute dependence section is strengthened for the position information of "house" and a peripheral attribute dependence section is strengthened for the position information of "location to do shopping". For the position information of, for example, "company", a plurality of pieces of position information like different offices may be present. In this case, the position information of the same meaning can correctly be selected by giving differences like business content and scale to each piece of position information as respective features.

The added amount of weighting factor for position information may be decided based on, for example, original position information or changed for each attribute type of position information. Further, a probability distribution specific to position information may randomly be generated and added to operation action estimation information. Accordingly, over-learning can be prevented.

<6. Others>

[6-1. Personal Modeling of Action Pattern]

In an action log display system according to the present embodiment, an action log is displayed by using action segments to which the meaning and content is attached. By performing, for example, autocorrelation processing or filter processing using these action segments, temporal or action errors can be absorbed. Then, a user's typical action pattern can be extracted from a small amount of data.

Figure 42:
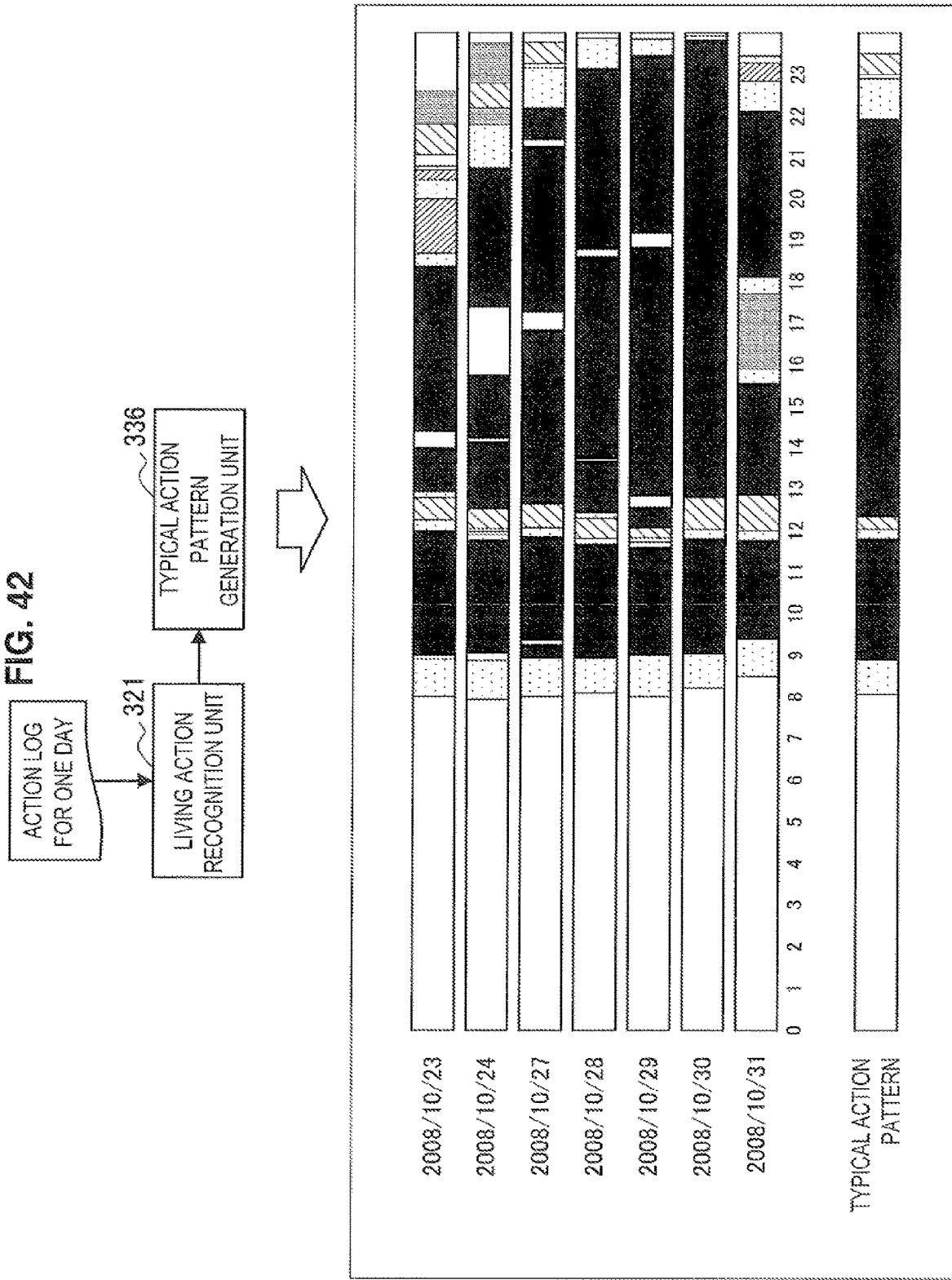
FIG. 42 is an explanatory view illustrating personal modeling of an action pattern by a typical action pattern generation unit.

As a functional unit to extract a user's typical action pattern, as shown in FIG. 42, a typical action pattern generation unit 336 is provided in the analysis server 300. To extract a typical action pattern, an action log for a predetermined period (for example, for one day) acquired by the living action recognition unit 321 from the action log server 200 is first smoothed and then output to the typical action pattern generation unit 336. The typical action pattern generation unit 336 generates a typical action pattern using a statistical technique, for example, cross correlation processing on action segments of the smoothed action log.

In the example of FIG. 42, the typical action pattern generation unit 336 acquires a typical action pattern of the user as a result of analyzing, based on action logs of seven days, correlations of action segments of these action logs. Thus, by analyzing action segments to which hierarchical information represented by the meaning and content of actions and showing relations between action segments is attached, a user's probable typical action pattern can be generated even from a small amount of data.

[6-2. Position Display Technique by Moving Medium/Means Determination]

Figure 43:
FIG. 43 is an explanatory view illustrating a position display technique by determining a medium/means of transport.

If an action is recognized as a movement action when an action segment is generated, the living action recognition unit 321 identifies position information of the user based on which medium of transport the user uses to move or which means of transport the user uses to move (FIG. 43). More specifically, when a movement action is recognized from operation action data, the living action recognition unit 321 analyzes how to display position information thereof. In this case, the living action recognition unit 321 first acquires nearest station candidates as an easy-to-use landmark, the last position information and information related thereto. Nearest station candidates can be identified by using the line name, station name, distance to the station and the like. As the last position information and information related thereto, the medium of transport or means of transport, time difference, distance from the last latitude/longitude and the like are acquired.

The living action recognition unit 321 assigns weights to the lines and stations using the above information to identify the nearest station. Weights may be assigned to lines and stations by, for example, increasing weights of nearest station candidates with a decreasing distance or assigning weights preferentially to lines and stations that are continuously acquired in action logs. Alternatively, weights may be assigned in consideration of distance differences or time differences that can be acquired from information up to the last time. Accordingly, if the fact of being a predetermined distance apart or that a predetermined time has passed is recognized from the information up to the last time and information this time, the possibility of having changed trains to another line can be considered.

(6-2-1. Line Estimation Processing)

The estimation of line can be determined from, for example, the number of passed stations recognized from an action log. In addition, the movement locus of the user can be estimated by considering the possibility of changing trains at a station identified from position information or whether a direct service between a plurality of lines is available. If a plurality of lines runs between the same stations, which line is used can be identified by estimating a more likely line from the user's past movement locus or acquiring more detailed position information from a position information acquisition sensor.

Figure 44:
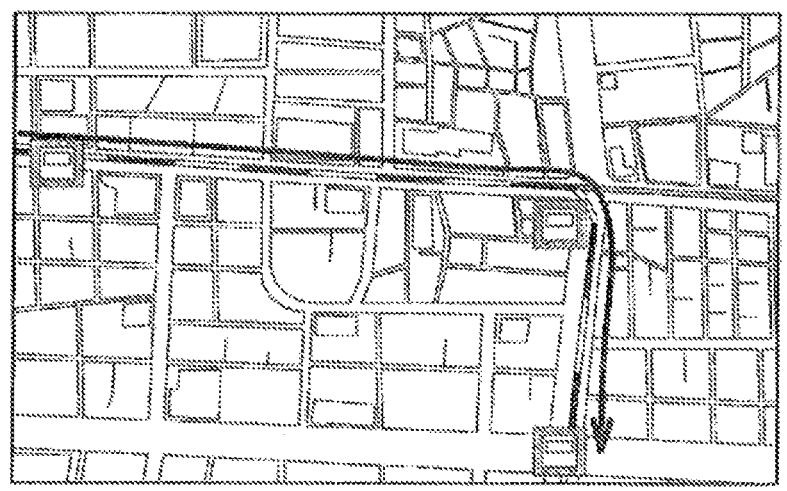
FIG. 44 is an explanatory view illustrating line estimation processing.

As a result of performing the above line estimation processing, for example, as shown in FIG. 44, movement of the user can be displayed, for example, on a map. Incidentally, the line may be displayed on a map only when the precision of line estimation processing of a predetermined value or more is secured.

(6-2-2. Station Name Selection Processing)

The station name is selected by, as described above, identifying the nearest station. In this case, even if the user does not actually move, changes in latitude/longitude may erroneously be recognized due to an error of radio field intensity of a sensor. Thus, for example, as shown in FIG. 45, the expression may be changed in accordance with the position precision of the station name of the nearest station. If, for example, the Ohsaki station is identified as the nearest station, the expression is changed like "work in the Ohsaki station", "work near the Ohsaki station", or "work in Ohsaki" based on the distance difference between the position of the nearest station and the position information. Accordingly, the location where work is done can be expressed more appropriately.

If the medium/means of transport is not movement by train, for example, priority may be given to the identified nearest station as a landmark to represent the location of operation by the station name (excluding "station"). For example, it is assumed that, as a result of analyzing an action log, movement by car is recognized and the "Higash-Koganei station" and the "Shin-Koganei station" are identified as landmarks. In this case, it is not natural to move between stations by car and thus, action content can naturally be expressed by representing the start location and the goal as the "Higash-Koganei station" and the "Shin-Koganei station".

<7. Exemplary Hardware Configuration>

Figure 46:
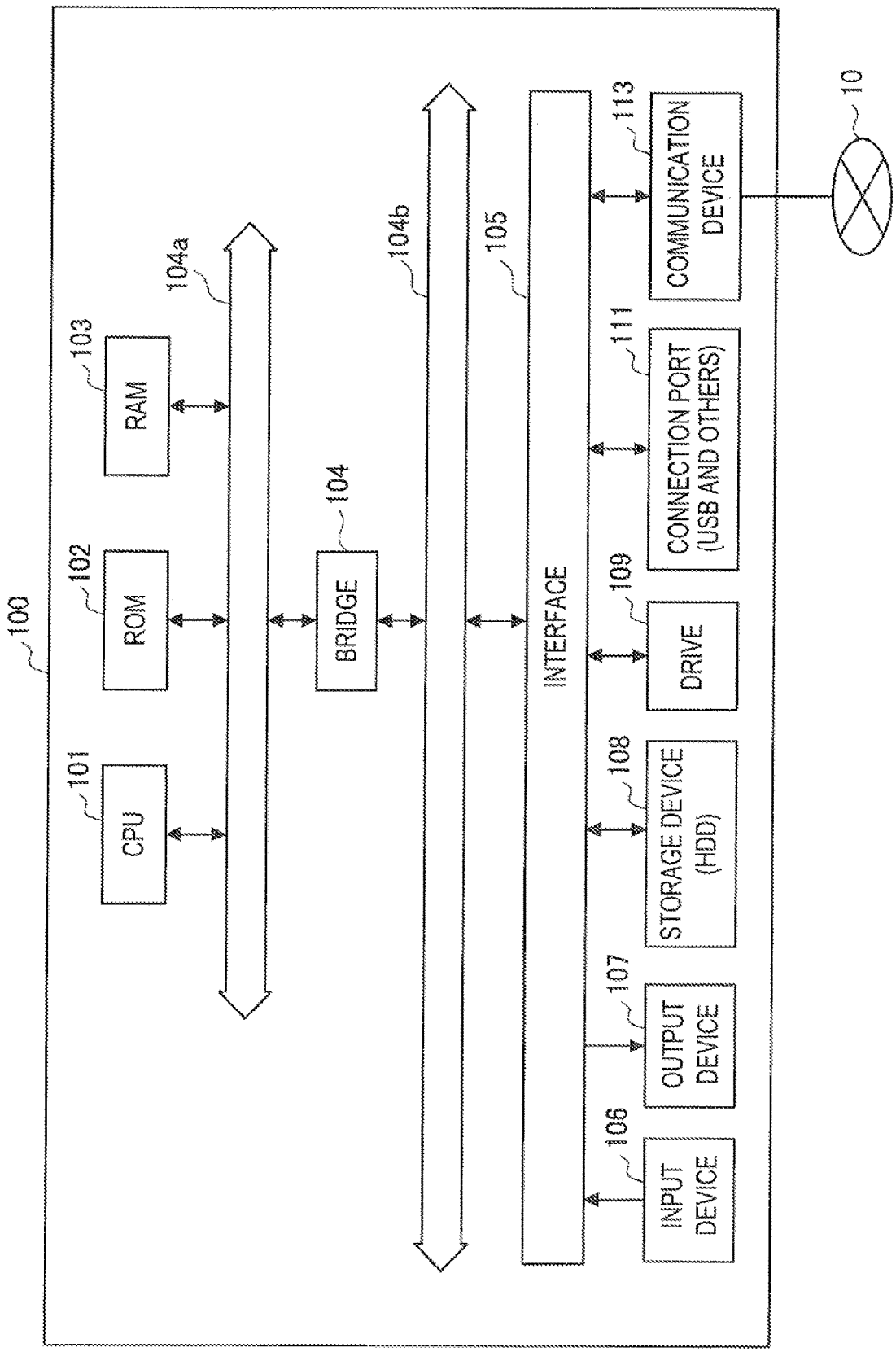
FIG. 46 is a block diagram showing a hardware configuration example of an action recording device according to the embodiment.

A process of the action recording device 100 in accordance with this embodiment can be executed either by hardware or software. In this case, the action recording device 100 can be configured as shown in FIG. 46. Hereinafter, an exemplary hardware configuration of the action recording device 100 in accordance with this embodiment will be described with reference to FIG. 46.

The action recording device 100 in accordance with this embodiment can be implemented by a processing device such as a computer as described above. As shown in FIG. 46, the action recording device 100 includes a CPU (Central Processing Unit) 101, ROM (Read Only Memory) 102, RAM (Random Access Memory) 103, and a host bus 104a. In addition, the action recording device 100 also includes a bridge 104, an external bus 104b, an interface 105, an input device 106, an output device 107, a storage device (HDD) 108, a drive 109, a connection port 111, and a communication device 113.

The CPU 101 functions as an arithmetic processing unit and a control unit, and controls the entire operation within the action recording device 100 in accordance with various programs. The CPU 101 may also be a microprocessor. The ROM 102 stores programs, operation parameters, and the like used by the CPU 101. The RAM 103 temporarily stores programs used in the execution of the CPU 101, parameters that change as appropriate during the execution, and the like. These units are mutually connected via the host bus 104a including a CPU bus or the like.

The host bus 104a is connected to the external bus 104b such as a PCI (Peripheral Component Interconnect/Interface) bus via the bridge 104. Note that the host bus 104a, the bridge 104, and the external bus 104b need not necessarily be arranged separately, and the functions of such components may be integrated into a single bus.

The input device 106 includes an input means for a user to input information, such as a mouse, a keyboard, a touch panel, a button, a microphone, a switch, or a lever; an input control circuit that generates an input signal on the basis of a user input and outputs the signal to the CPU 101; and the like. The output device 107 includes a display device such as, for example, a liquid crystal display (LCD) device, an OLED (Organic Light Emitting Diode) device, or a lamp; and an audio output device such as a speaker.

The storage device 108 is a device for storing data, constructed as an example of a storage unit of the action recording device 100. The storage device 108 can include a storage medium, a recording device that records data on the storage medium, a reading device that reads data from the storage medium, a deletion device that deletes data recorded on the storage medium, and the like. The storage device 108 includes, for example, a HDD (Hard Disk Drive). The storage device 108 stores programs and various data for driving the hard disk and executed by the CPU 101.

The drive 109 is a reader/writer for a storage medium, and is incorporated in or externally attached to the action recording device 100. The drive 109 reads information recorded on a removable storage medium such as a magnetic disk, an optical disc, a magnetooptical disk, or semiconductor memory that is mounted, and outputs the information to the RAM 103.

The connection port 111 is an interface for connection to an external device, and is, for example, a connection port for connection to an external device that can transmit data via a USB (Universal Serial Bus). The communication device 113 is, for example, a communication interface including a communication device and the like for connection to the communication network 10. The communication device 113 may be any of a communication device supporting a wireless LAN (Local Area Network), a communication device supporting a wireless USB, or a wire communication device that performs wire communication.

In the foregoing, a preferred embodiment of the present disclosure has been described in detail with reference to the appended drawings, but the technical scope of the present disclosure is not limited to the above examples. A person skilled in the art may find various alterations and modifications within the scope of the appended claims, and it should be understood that they will naturally come under the technical scope of the present disclosure.

In the above embodiment, for example, the action representation generation unit 320 and the data management unit 330 are provided in the analysis server 300 and the action representation generation unit 140 is provided in the action recording device 100, but the present disclosure is not limited to such an example. For example, these functional units may all be provided in the analysis server 300 or in the action recording device 100.

Additionally, the present technology may also be configured as below.

(1) An information processing device including:
   an action recognition unit that recognizes an operation action of a user based on sensor information; and
   an action representation generation unit that analyzes operation action data showing the operation action of the user recognized by the action recognition unit to generate an action segment represented by a meaning and content of the operation action from the operation action data.

(2) The information processing device according to (1),
   wherein dictionary data defining a relation of the higher meaning and content for the operation action is held, and
   wherein the action representation generation unit estimates the meaning and content of the operation action from relations before and after the operation action data arranged chronologically based on the dictionary data to generate the action segment.

(3) The information processing device according to (1) or (2), wherein the action representation generation unit estimates the meaning and content of the operation action in accordance with a time period and a time of the operation action data to be analyzed to generate the action segment.
(4) The information processing device according to any one of (1) to (3),
wherein the action representation generation unit estimates the meaning and content of the operation action in accordance with positions of the operation action data before and after the operation action data to be analyzed to generate the action segment.
(5) The information processing device according to any one of (1) to (4),
wherein hierarchical information showing a hierarchical relationship about the meaning and content is attached to the action segment.
(6) The information processing device according to (5),
wherein the action representation generation unit displays the action segments based on a segmentation grain size deciding roughness of segmentation of the action segments and the hierarchical information.
(7) The information processing device according to (6),
wherein the action representation generation unit combines or divides the action segments based on a size of the segmentation grain size and displays the combined or divided action segments.
(8) The information processing device according to any one of (1) to (7), further including:
a typical action pattern generation unit that extracts one action pattern from a plurality of action segment groups including the action segments of a predetermined unit based on a correlation between the action segments.
(9) The information processing device according to any one of (1) to (8),
wherein the action representation generation unit displays, in a display unit, the action segments represented at least by a start time, an end time, position information, and operation content of the operation action by chronologically arranging the action segments.
(10) The information processing device according to any one of (1) to (9), further including:
a feedback adjustment unit that corrects operation action estimation information that decides the operation action based on correction feedback from the user to the action segment generated by the action representation generation unit,
wherein the action representation generation unit generates the action segment constituting an action log from the operation action data based on the operation action estimation data, and
wherein the feedback adjustment unit corrects the operation action estimation information based on the correction feedback.
(11) An information processing device including:
an action recognition unit that recognizes an operation action of a user based on sensor information;
an action representation generation unit that generates an action segment constituting an action log from operation action data showing the operation action of the user recognized by the action recognition unit based on operation action estimation information that decides the operation action; and
a feedback adjustment unit that corrects the operation action estimation information based on correction feedback from the user to the action segment generated by the action representation generation unit.
(12) The information processing device according to (11),
wherein the operation action estimation information includes a plurality of combinations of a probability distribution and a weighting factor depending on a location for a plurality of the operation actions, and
wherein the feedback adjustment unit corrects the probability distribution or the weighting factor for each of the operation actions based on the correction feedback.
(13) The information processing device according to (12),
wherein, when the correction feedback concerns action content, the feedback adjustment unit corrects the probability distribution of the operation action estimation information in accordance with content of the correction feedback.
(14) The information processing device according to (11) or (12),
wherein, when the correction feedback concerns the location, the feedback adjustment unit corrects the weighting factor of the operation action estimation information in accordance with content of the correction feedback.

REFERENCE SIGN LIST 100 action recording device
110 sensors
120 action recognition unit
122 sensor controller
124 operation action recognition unit
130 client interface unit
140 action representation processing unit
142 display processing unit
144 input information processing unit
150 display unit
160 input unit
200 action log server
210 log server interface unit
220 action log db
300 analysis server
310 analysis server interface unit
320 action representation generation unit
321 living action recognition unit
322 hierarchical structure judgment unit
330 data management unit
331 data acquisition unit
332 feedback adjustment unit
333 analysis parameter db
334 unit data storage db
335 hierarchical information attached data storage db

The invention claimed is:

1. A non-transitory storage medium configured to store a computer program for causing a computer to function as an information processing device operable to display representations of a user's actions, the program comprising:
presenting, on a display, an action log including at least one action segment represented based on an operation action of a user by referring to sensor information, wherein the action segment is presented on the display with each of corresponding to an action image representing an action type, at least one of a step value or an exercise value, and both a starting time and an ending time, wherein each of the action type and at least one of the step value or the exercise value is derived from the sensor information;
in response to user selection of the action segment and user selection of a specified time occurring between the starting time and the ending time, splitting the selected action segment at the specified time into first and second split action segments; and updating the display to present the action log including the first and second split action segments on the display, wherein the first action segment is presented on the display with each of the starting time and an updated ending time corresponding to the specified time, and wherein the second action segment is presented on the display each of an updated starting time corresponding to the specified time and the ending time.

2. The non-transitory storage medium according to claim 1, the program further comprising:
causing the display to display a split time setting screen to input the specified time.

3. The non-transitory storage medium according to claim 2, the program further comprising:
causing the display to display a save button in the split time setting screen.

4. The non-transitory storage medium according to claim 2, the program further comprising:
causing the display to display a cancel button in the split time setting screen.

5. The non-transitory storage medium according to claim 2, the program further comprising:
causing the display to display the specified time to be input by the user in the split time setting screen.

6. The non-transitory storage medium according to claim 1, the program further comprising:
updating an action segment acquired by an action recording device of the user.

7. The non-transitory storage medium according to claim 6, the program further comprising:
updating the action segment acquired by the action recording device based on the user pressing an update button.

8. The non-transitory storage medium according to claim 1, the program further comprising:
causing the display to display a feeling object for the action segment.

9. The non-transitory storage medium according to claim 8, wherein the feeling object is based on selection from a feeling selection area.

10. The non-transitory storage medium according to claim 1, the program further comprising:
causing the display to display the action image indicating action taken by the user.

11. The non-transitory storage medium according to claim 10, wherein the action image is displayed based on user selection from an action candidate list.

12. The non-transitory storage medium according to claim 1, the program further comprising:
causing the display to display a hierarchical list representing the action segment.

13. The non-transitory storage medium according to claim 12, wherein the hierarchical list includes a plurality of second action segments, and wherein the specified time is based upon selection by the user of one the second action segments.

14. The non-transitory storage medium according to claim 1, wherein the sensor information includes at least one of time information or position information.

15. The non-transitory storage medium according to claim 14, wherein the position information is obtained from at least one of a Global Positioning System (GPS), WiFi or another communication network.

16. The non-transitory storage medium according to claim 1, the program further comprising:
causing the display to display deletion of the action segment.

17. The non-transitory storage medium according to claim 1, the program further comprising:
causing the display to display each of the at least two split action segments with the time information corresponding to the specified time.

18. An information processing method for displaying representations of a user's actions comprising:
presenting, on a display, an action log including at least one action segment represented based on an operation action of a user by referring to sensor information, wherein the action segment is presented on the display with each of corresponding to an action image representing an action type, at least one of a step value or an exercise value, and both a starting time and an ending time, wherein each of the action type and at least one of the step value or the exercise value derived from the sensor information;

in response to user selection of the action segment and user selection of a specified time occurring between the starting time and the ending time, splitting the selected action segment at the specified time into first and second split action segments; and updating the display to present the action log including the first and second split action segments on the display, wherein the first action segment is presented on the display with each of the starting time and an updated ending time corresponding to the specified time, and wherein the second action segment is presented on the display each of an updated starting time corresponding to the specified time and the ending time.

19. An information processing device operable to display representations of a user's actions, the device comprising:
circuitry configured to control:
presenting, on a display, an action log including at least one action segment represented based on an operation action of a user by referring to sensor information, wherein the action segment is presented on the display with each of corresponding to an action image representing an action type, at least one of a step value or an exercise value, and both a starting time and an ending time, wherein each of the action type and at least one of the step value or the exercise value is derived from the sensor information;

in response to user selection of the action segment and user selection of a specified time occurring between the starting time and the ending time, splitting the selected action segment at the specified time into first and second split action segments; and updating the display to present the action log including the first and second split action segments on the display, wherein the first action segment is presented on the display with each of the starting time and an updated ending time corresponding to the specified time, and wherein the second action segment is presented on the display each of an updated starting time corresponding to the specified time and the ending time.

20. The information processing device according to claim 19,
wherein the circuitry is configured to control causing the display to display a split time setting screen to input the specified time.

21. The information processing device according to claim 20, wherein the circuitry is configured to control causing the display to display a save button in the split time setting screen.

22. The information processing device according to claim 20, wherein the circuitry is configured to control causing the display to display a cancel button in the split time setting screen.

23. The information processing device according to claim 20, wherein the circuitry is configured to control causing the display to display the specified time to be input by the user in the split time setting screen.

24. The information processing device according to claim 20, wherein the circuitry is configured to control causing the display to display a feeling object for the action segment.

25. The information processing device according to claim 24, wherein the feeling object is based on selection from a feeling selection area.

26. The information processing device according to claim 20, wherein the circuitry is configured to control causing the display to display the action image indicating action taken by the user.

27. The information processing device according to claim 26, wherein the action image is displayed based on user selection from an action candidate list.

28. The information processing device according to claim 20, wherein the circuitry is configured to control causing the display to display a hierarchical list representing the action segment.

29. The information processing device according to claim 28, wherein the hierarchical list includes a plurality of second action segments, and wherein the specified time is based upon selection by the user of one the second action segments.

30. The information processing device according to claim 20, wherein the sensor information includes at least one of time information or position information.

31. The information processing device according to claim 30, wherein the position information is obtained from at least one of a Global Positioning System (GPS), WiFi or another communication network.

32. The information processing device according to claim 20, wherein the circuitry is configured to control causing the display to display deletion of the action segment.

33. The information processing device according to claim 19, wherein the circuitry is configured to control updating an action segment acquired by an action recording device of the user.

34. The information processing device according to claim 33, wherein the circuitry is configured to control updating the action segment acquired by the action recording device based on the user pressing an update button.

* * * * *